(12) United States Patent
Kim et al.

(10) Patent No.: US 8,556,444 B2
(45) Date of Patent: Oct. 15, 2013

(54) BACKLIGHT UNIT AND DISPLAY DEVICE

(75) Inventors: Sungwoo Kim, Seoul (KR); Buwan Seo, Seoul (KR); Hoon Hur, Seoul (KR); Soonhyung Kwon, Seoul (KR); Seungchoon Bae, Seoul (KR); Minho Kim, Seoul (KR); Hyunho Lee, Seoul (KR); Sangsoo Hwang, Seoul (KR); Sangtae Park, Seoul (KR); Bupsung Jung, Seoul (KR)

(73) Assignee: LG Electronics Inc., Seoul (KR)

( * ) Notice: Subject to any disclaimer, the term of this patent is extended or adjusted under 35 U.S.C. 154(b) by 320 days.

(21) Appl. No.: 12/860,690

(22) Filed: Aug. 20, 2010

(65) Prior Publication Data
US 2011/0051411 A1    Mar. 3, 2011

Related U.S. Application Data

(60) Provisional application No. 61/305,600, filed on Feb. 18, 2010, provisional application No. 61/325,288, filed on Apr. 17, 2010, provisional application No. 61/237,587, filed on Aug. 27, 2009.

(30) Foreign Application Priority Data

| Aug. 27, 2009 | (KR) | 10-2009-0079700 |
| Aug. 27, 2009 | (KR) | 10-2009-0079710 |
| Aug. 28, 2009 | (KR) | 10-2009-0080249 |
| Nov. 24, 2009 | (KR) | 10-2009-0114225 |
| Nov. 24, 2009 | (KR) | 10-2009-0114226 |
| Nov. 24, 2009 | (KR) | 10-2009-0114227 |
| Feb. 17, 2010 | (KR) | 10-2010-0014028 |
| Mar. 17, 2010 | (KR) | 10-2010-0023957 |
| Apr. 16, 2010 | (KR) | 10-2010-0035239 |

(51) Int. Cl.
G02F 1/13357    (2006.01)
G09F 13/04    (2006.01)
F21V 7/00    (2006.01)

(52) U.S. Cl.
USPC ......... 362/97.3; 362/97.1; 362/236; 362/246; 349/62

(58) Field of Classification Search
USPC ............... 362/97.1–97.3, 235, 236, 239, 246; 349/62
See application file for complete search history.

(56) References Cited

U.S. PATENT DOCUMENTS

| 2006/0203513 A1 | 9/2006 | Aoki |
| 2008/0145960 A1* | 6/2008 | Kolodin et al. ................. 438/28 |

(Continued)

FOREIGN PATENT DOCUMENTS

| JP | 2006/164625 A | 6/2006 |
| JP | 2006/251075 A | 9/2006 |

(Continued)

*Primary Examiner* — Karabi Guharay
(74) *Attorney, Agent, or Firm* — Birch, Stewart, Kolasch & Birch, LLP

(57) ABSTRACT

A backlight unit and display device are discussed. According to an embodiment, a light generating device includes an array of light source devices disposed on a substrate and including first and second light source devices forming a first line, the first and second light source devices spaced apart from each other with a first distance and configured to emit light in a first direction; another array of light source devices disposed on the substrate and including third and fourth light source devices forming a second line, the third and fourth light source devices spaced apart from each other with a third distance and configured to emit light in a second direction which is different from the first direction, the second line being spaced apart from the first line so that the first light source device is spaced apart from the third light source device with a second distance therebetween.

17 Claims, 47 Drawing Sheets

(56) References Cited

U.S. PATENT DOCUMENTS

2010/0110330 A1* 5/2010 Ajichi et al. .................. 349/62
2011/0038141 A1* 2/2011 Tillin .......................... 362/97.3

FOREIGN PATENT DOCUMENTS

| JP | 2006-286217 A | 10/2006 |
| JP | 2007/42320 A | 2/2007 |

* cited by examiner (a)  (b)

Lead type

SMD type

Flip chip type (a)

(b)

BACKLIGHT UNIT AND DISPLAY DEVICE

This application claims the benefit priority benefit of Korean Patent Application Nos. 10-2009-0079700 filed on Aug. 27, 2009, 10-2009-0079710 filed on Aug. 27, 2009, 10-2009-0080249 filed on Aug. 28, 2009, 10-2009-0114226 filed on Nov. 24, 2009, 10-2009-0114227 filed on Nov. 24, 2009, 10-2009-0114225 filed on Nov. 24, 2009, 10-2010-0014028 filed on Feb. 17, 2010, 10-2010-0023957 filed on Mar. 17, 2010, and 10-2010-0035239 filed on Apr. 16, 2010, U.S. Provisional Application Nos. 61/305,600 filed on Feb. 18, 2010, 61/325,288 filed on Apr. 17, 2010, and 61/237,587 filed on Aug. 27, 2009, all of which are incorporated herein by reference for all purposes as if fully set forth herein.

BACKGROUND OF THE INVENTION

1. Field of the Invention

Exemplary embodiments of the invention relate to a backlight unit and a display device.

2. Discussion of the Related Art

With the development of the information society, various demands for display devices have been increasing. Various display devices, such as a liquid crystal display (LCD), a plasma display panel (PDP), an electroluminescent display (ELD), and a vacuum fluorescent display (VFD), have been recently studied and used, so as to meet the various demands for the display devices.

Among the display devices, a liquid crystal display panel of the liquid crystal display includes a liquid crystal layer, and a thin film transistor (TFT) substrate and a color filter substrate that are positioned opposite each other with the liquid crystal layer interposed therebetween. The liquid crystal display panel displays an image using light provided by a backlight unit of the liquid crystal display.

SUMMARY OF THE INVENTION

Exemplary embodiments of the invention provide a backlight unit and a display device.

Embodiments of the invention provide a light generating device including one or more light source devices each including a light emitting unit such as an LED, which can be used in a backlight unit or other device and which address the limitations and disadvantages associated with the background art.

According to an embodiment, the invention provides a light generating device comprising: an array of light source devices disposed on a substrate and including first and second light source devices forming a first line, the first and second light source devices spaced apart from each other with a first distance and configured to emit light in a first direction; another array of light source devices disposed on the substrate and including third and fourth light source devices forming a second line, the third and fourth light source devices spaced apart from each other with a third distance and configured to emit light in a second direction which is different from the first direction, the second line being spaced apart from the first line so that the first light source device is spaced apart from the third light source device with a second distance therebetween, the second distance being equal to or greater then the first distance; and a reflection layer configured to reflect the light emitted from the first and second light source devices.

According to an embodiment, the invention provides a light generating device comprising: first light source devices disposed on a substrate and spaced apart from each other with a first distance therebetween, the first light source devices forming a first line and configured to emit light in a first direction; second light source devices disposed on the substrate and spaced apart from each other with a second distance therebetween, the second light source devices forming a second line and configured to emit light in a second direction which is different from the first direction, a width 't' of at least one of the first and second light source devices having the following relationship: $2t \le d \le 10t$, where 'd' is a distance between a line extending along a first side of one of the first light source devices and a line extending along a second side of one of the second light source devices; and a reflection layer configured to reflect the light emitted from the first and second light source devices.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE EMBODIMENTS

Figure 1:
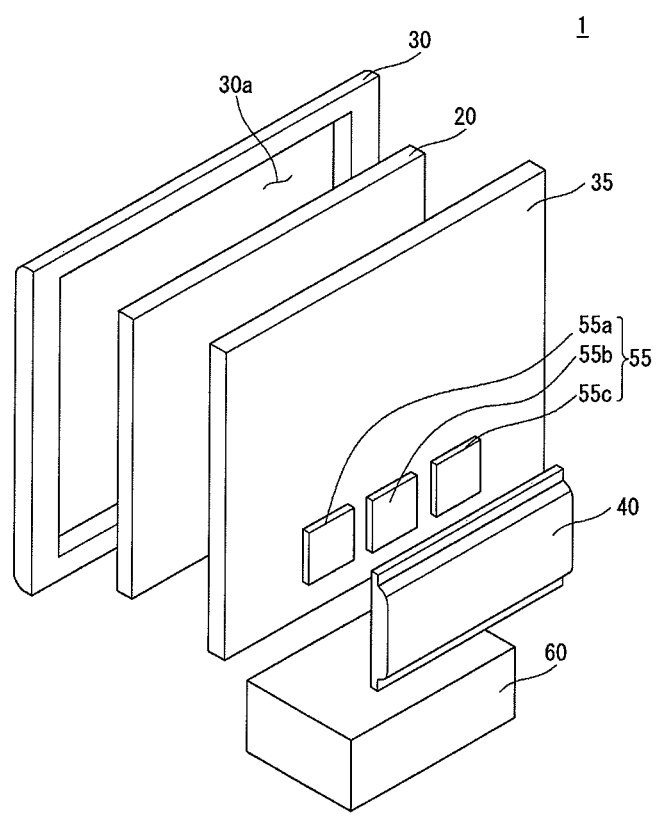
FIGS. 1 and 2 illustrate a display device according to an exemplary embodiment of the invention.

Since the present invention may be modified in various ways and may have various forms, specific embodiments are illustrated in the drawings and are described in detail in the present specification. However, it should be understood that the present invention is not limited to specific disclosed embodiments, but include all modifications, equivalents and substitutes included within the spirit and technical scope of the present invention. In the description of each drawing, the same reference characters are used to designate the same or similar components.

The terms 'first', 'second', etc. may be used to describe various components, but the components are not limited by such terms. The terms are used only for the purpose of distinguishing one component from other components. For example, a first component may be designated as a second component without departing from the scope of the present invention. In the same manner, the second component may be designated as the first component.

The term "and/or" encompasses both combinations of the plurality of related items disclosed and any item from among the plurality of related items disclosed.

When an arbitrary component is described as "being connected to" or "being linked to" another component, this should be understood to mean that still another component(s) may exist between them, although the arbitrary component may be directly connected to, or linked to, the second component. In contrast, when an arbitrary component is described as "being directly connected to" or "being directly linked to" another component, this should be understood to mean that no component exists between them.

The terms used in the present application are used to describe only specific embodiments or examples, and are not intended to limit the present invention. A singular expression can include a plural expression as long as it does not have an apparently different meaning in context.

In the present application, the terms "include" and "have" should be understood to be intended to designate that illustrated features, numbers, steps, operations, components, parts or combinations thereof exist and not to preclude the existence of one or more different features, numbers, steps, operations, components, parts or combinations thereof, or the possibility of the addition thereof.

Unless otherwise specified, all of the terms which are used herein, including the technical or scientific terms, have the same meanings as those that are generally understood by a person having ordinary knowledge in the art to which the present invention pertains. The terms defined in a generally used dictionary must be understood to have meanings identical to those used in the context of a related art, and are not to be construed to have ideal or excessively formal meanings unless they are obviously specified in the present application.

The following exemplary embodiments of the present invention are provided to those skilled in the art in order to describe the present invention more completely. Accordingly, shapes and sizes of elements shown in the drawings may be exaggerated for clarity.

Reference will now be made in detail embodiments of the invention examples of which are illustrated in the accompanying drawings. In this regard, each of all display devices, backlight units, light source devices, and any device that includes such backlight unit or light source device discussed below is operatively coupled and configured. Further, a backlight unit according to embodiments of the invention preferably is fixed to a back of a display panel and has a same or similar size as the display panel to correspond to the entire display region of the display panel. Furthermore, such a backlight unit preferably includes a plurality of light sources which are disposed in arrays, lines, patterns, etc. throughout the entire area of the backlight unit that corresponds to the entire display region of the display panel. As such, the light sources are not just located at one side of the display panel, but are preferably dispersed below throughout the entire display region of the display panel. In these figures, arrows indicate a general light emitting direction of the light source, e.g., a general direction in which the light from a light emitting surface of the light source is emitted, but the light from the light source may emit not necessarily in a single line but through an area in the indicated direction.

According to various embodiments of the invention, any one or more features from one embodiment/example/variation of the invention can be applied to (e.g., added, substituted, modified, etc.) any one or more other embodiments/examples/variations discussed below according to the invention. Further any operations/methods discussed below can be implemented in any of these devices/units or other suitable devices/units.

Figure 2:
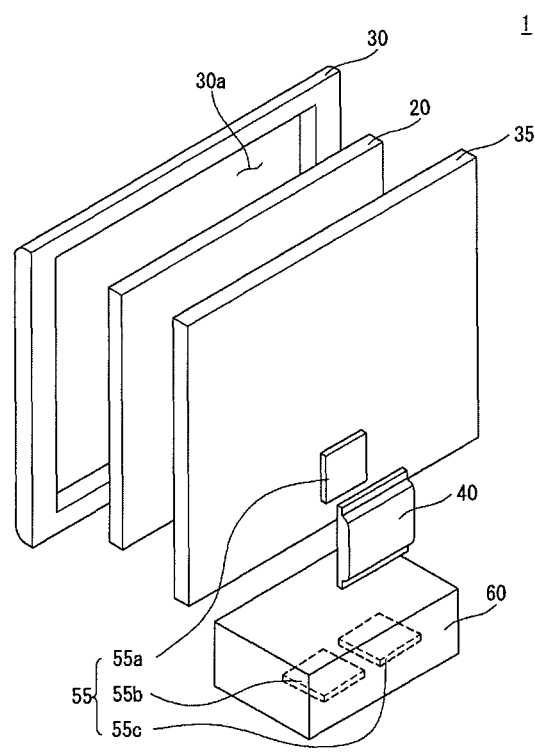

FIGS. 1 and 2 illustrate a display device according to an exemplary embodiment of the invention.

As shown in FIG. 1, a display device 1 according to an exemplary embodiment of the invention includes a display module 20, a front cover 30 and a back cover 35 covering the display module 20, a driver 55 positioned on the back cover 35, and a driver cover 40 covering the driver 55.

The front cover 30 may include a front panel formed of a transparent material capable of transmitting light. The front panel is separated from the display module 20 by a predetermined distance and protects the display module 20. The front panel transmits light emitted from the display module 20, so that a user can see an image displayed on the display module 20.

The front cover 30 may be formed using a flat plate not having a window 30a. In this case, the front cover 30 is formed of a transparent material capable of transmitting light, for example, injection-molded plastic. As above, if the front cover 30 is formed of the flat plate, a frame may be omitted from the front cover 30. The back cover 35 is combined with the front cover 30 to thereby protect the display module 20.

The driver 55 may be positioned on one surface of the back cover 35. The driver 55 may include a driving controller 55a, a main board 55b, and a power supply unit 55c. The driving controller 55a may be a timing controller and controls operation timing of each of driver integrated circuits (ICs) of the display module 20. The main board 55b transfers a vertical synchronous signal, a horizontal synchronous signal, and a RGB resolution signal to the driving controller 55a. The power supply unit 55c applies a power to the display module 20. The driver 55 is included in the back cover 35 and may be covered by the driver cover 40.

The back cover 35 has a plurality of holes, thereby connecting the display module 20 to the driver 55. The display device 1 may further include a stand 60 for supporting the display device 1.

On the other hand, as shown in FIG. 2, the driving controller 55a of the driver 55 is included in the back cover 35, and the main board 55b and the power supply board 55c corresponding to the power supply unit may be included in the stand 60. The driver cover 40 may cover only the driving controller 55a of the back cover 35.

In the embodiment of the invention, the main board 55b and the power supply board 55c are separately configured. However, the main board 55b and the power supply board 55c may be integrated into one integrated board. Other configurations may be used for the main board 55b and the power supply board 55c.

Figure 3:
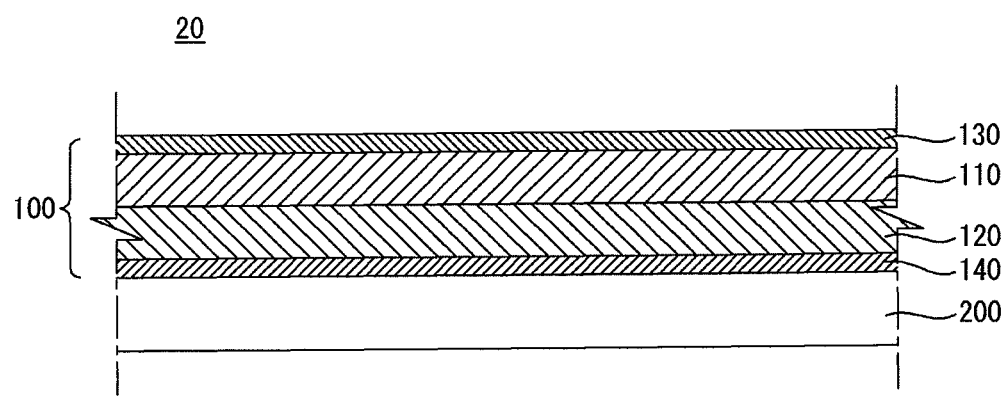
FIG. 3 illustrates a display module according to an exemplary embodiment of the invention.

FIG. 3 illustrates an example of the display module 20. As shown in FIG. 3, the display module 20 may include a display panel 100 and a backlight unit 200.

The display panel 100 includes a color filter substrate 110 and a thin film transistor (TFT) substrate 120 that are positioned opposite each other and are attached to each other with a uniform cell gap therebetween. A liquid crystal layer may be interposed between the two substrates 110 and 120.

The color filter substrate 110 includes a plurality of color filters each including red (R), green (G), and blue (B) color filters and may generate a red, green, or blue image when light is applied to the display device 1. In the embodiment of the invention, each of the color filters can include the red, green, and blue sub-color filters. Other structures may be used for a color filter corresponding to a pixel. For example, each pixel may include red, green, blue, and white (W) sub-pixels.

The TFT substrate 120 is a substrate, on which a plurality of switching elements are formed, and may switch on and off selectively corresponding pixel electrode. For example, a common electrode and the pixel electrode may change an arrangement of liquid crystal molecules of the liquid crystal layer depending on a predetermined voltage supplied thereto.

The liquid crystal layer is comprised of the liquid crystal molecules. The arrangement of the liquid crystal molecules varies depending on a voltage difference between the pixel electrode and the common electrode. Hence, light provided by the backlight unit 200 may be incident on the color filter substrate 110 based on changes in the arrangement of the liquid crystal molecules of the liquid crystal layer.

An upper polarizing plate 130 and a lower polarizing plate 140 may be respectively positioned on and under the display panel 100. More particularly, the upper polarizing plate 130 may be positioned on the color filter substrate 110, and the lower polarizing plate 140 may be positioned under the TFT substrate 120.

A gate driver and a data driver, each of which generates a driving signal for driving the gate and data lines of the display panel 100, may be provided on the side of the display panel 100.

As shown in FIG. 3, the display module 20 according to the embodiment of the invention may be configured so that the backlight unit 200 adheres closely to the display panel 100. For example, the backlight unit 200 may be attached and fixed to the bottom of the display panel 100, more particularly, the lower polarizing plate 140. For this, an adhesive layer may be formed between the lower polarizing plate 140 and the backlight unit 200.

As described above, the entire thickness of the display device 1 may be reduced by attaching the backlight unit 200 close to the display panel 100, and thus an external appearance of the display device 1 may be improved. Further, because a separate structure for fixing the backlight unit 200 is removed, the structure and the manufacturing process of the display device 1 may be simplified.

Further, because a space between the backlight unit 200 and the display panel 100 is removed, foreign substances may be prevented from penetrating into the space. Hence, a malfunction of the display device 1 or a reduction in the image quality of an image displayed on the display device 1 resulting from the foreign substances may be prevented.

The backlight unit 200 according to the embodiment of the invention may have the structure in which a plurality of function layers are sequentially laminated, and at least one layer of the plurality of function layers may include a plurality of light sources.

Each of the plurality of function layers constituting the backlight unit 200 may be formed of a flexible material, so that the backlight unit 200 is closely attached and fixed to bottom of the display panel 100.

The display panel 100 according to the embodiment of the invention may be divided into a plurality of regions. A brightness of light emitted from a region of the backlight unit 200 corresponding to each of the divided regions (i.e., a brightness of the corresponding light source) is adjusted based on a gray peak value or a color coordinate signal of each divided region. Hence, a luminance of the display panel 100 may be adjusted. For this, the backlight unit 200 may operate, so that regions of the backlight unit 200 respectively corresponding to the divided regions of the display panel 100 are dividedly driven.

Figure 4:
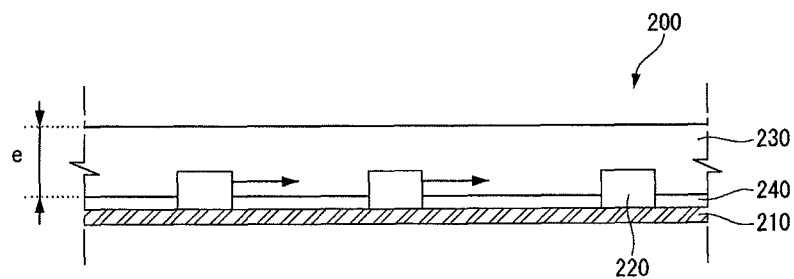
FIGS. 4 to 6 illustrate a first exemplary configuration of a backlight unit according to an exemplary embodiment of the invention.
Figure 5:
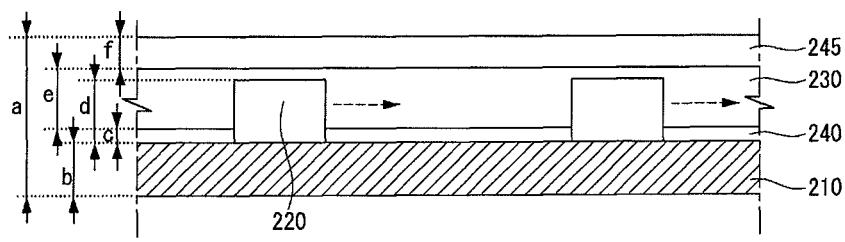

FIGS. 4 and 5 illustrate a first exemplary configuration of the backlight unit according to the exemplary embodiment of the invention. As shown in FIG. 4, the backlight unit 200 according to the first exemplary configuration may include a substrate 210, a plurality of light sources 220, a resin layer 230, and a reflection layer 240. As mentioned above, the backlight unit 200 in this or other embodiments may have a same or similar size as the display panel 100 so that it covers the entire display area of the display panel 100. Thus the light sources 220 in this or other embodiments are provided throughout the entire area of the backlight unit 200 so that these light sources 220 are dispersed below the entire display area of the display panel 100.

The plurality of light sources 220 may be formed on the substrate 210, and the resin layer 230 may be formed on the substrate 210 so as to cover the light sources 220. For instance, the second layer 230 encapsulates (covers entirely) the light sources 220 on the first layer 210.

The plurality of light sources 220 and an electrode pattern for connecting the light sources 220 to an adapter for a power supply may be formed on the substrate 210. For example, a carbon nanotube electrode pattern for connecting the light sources 220 to the adapter may be formed on an upper surface of the substrate 210.

The substrate 210 may be formed of polyethylene terephthalate (PET), glass, polycarbonate (PC), or silicon. The substrate 210 may be a printed circuit board (PCB) substrate, on which the plurality of light sources 220 are mounted, and may be formed in a film form.

The light source 220 may be one of a light emitting diode (LED) chip and a light emitting diode package having at least one light emitting diode chip. In the embodiment of the invention, the light emitting diode package is described as an example of the light source 220.

The LED package constituting the light source 220 may be classified into a top view type LED package and a side view type LED package based on a facing direction of a light emitting part (or a light emitting surface) of the LED package. In the embodiment of the invention, the light source 220 may be configured using at least one of the top view type LED package, in which the light emitting part is upward formed, and the side view type LED package in which the light emitting part is formed toward the side.

If the side view type LED package is used as the light source 220 in the embodiment of the invention, each of the light sources 220 may have a light emitting part at the side thereof and may emit light in a lateral direction, i.e., in an extension direction of the substrate 210 or the reflection layer 240. Thus, a thin profile of the backlight unit 200 may be achieved by reducing a thickness "e" of the resin layer 230 formed on the light sources 220. As a result, a thin profile of the display device 1 may be achieved.

The light source 220 may be configured by a colored LED emitting at least one of red light, green light, blue light, etc. or a white LED emitting white light. In addition, the colored LED may include at least one of a red LED, a blue LED, and a green LED. The disposition and emitting light of the light emitting diode may be variously changed within a technical scope of the embodiment.

The resin layer 230 transmits light emitted by the light sources 220, and at the same time diffuses the light emitted by the light sources 220, thereby allowing the light sources 220 to uniformly provide the light to the display panel 100.

The reflection layer 240 is positioned on the substrate 210 and reflects light emitted from the light sources 220. The reflection layer 240 may be formed in an area excluding a formation area of the light sources 220 from the substrate 210. The reflection layer 240 reflects light emitted from the light sources 220 and again reflects light totally reflected from a boundary between the resin layer 230 and the reflection layer 240, thereby more widely diffusing the light.

The reflection layer 240 may contain at least one of metal and metal oxide that are a reflection material. For example, the reflection layer 240 may contain metal or metal oxide having a high reflectance, such as aluminum (Al), silver (Ag), gold (Au), and titanium dioxide ($TiO_2$). In this case, the reflection layer 240 may be formed by depositing or coating the metal or the metal oxide on the substrate 210 or by printing a metal ink on the substrate 210. The deposition method may use a heat deposition method, an evaporation method, or a vacuum deposition method such as a sputtering method. The coating method or the printing method may use a gravure coating method or a silk screen method.

The resin layer 230 on the substrate 210 may be formed of a material capable of transmitting light, for example, silicon or acrylic resin. Other materials may be used for the resin layer 230. For example, various types of resin may be used. Further, the resin layer 230 may be formed of a resin having a refractive index of approximately 1.4 to 1.6, so that the backlight unit 200 has a uniform luminance by diffusing light emitted from the light sources 220. For example, the resin layer 230 may be formed of any one material selected from the group consisting of polyethylene terephthalate (PET), polycarbonate (PC), polypropylene, polyethylene, polystyrene, polyepoxy, silicon, acryl, etc.

The resin layer 230 may contain a polymer resin having an adhesion so as to tightly and closely adhere to the light sources 220 and the reflection layer 240. For example, the resin layer 230 may contain an acrylic resin such as unsaturated polyester, methylmethacrylate, ethylmethacrylate, isobutylmethacrylate, normal butylmethacrylate, normal butylmethylmethacrylate, acrylic acid, methacrylic acid, hydroxy ethylmethacrylate, hydroxy propylmethacrylate, hydroxy ethylacrylate, acrylamide, methylol acrylamide, glycidyl methacrylate, ethylacrylate, isobutylacrlate, normal butylacrylate, 2-ethylhexyl acrylate polymer, copolymer, or terpolymer, etc., an urethane resin, an epoxy resin, a melamine resin, etc.

The resin layer 230 may be formed by coating and curing a liquid or gel-type resin on the substrate 210 on which the light sources 220 and the reflection layer 240 are formed. Alternatively, the resin layer 230 may be formed by coating and partially curing a resin on a support sheet and then attaching the resin to the substrate 210.

As shown in FIG. 5, a diffusion plate 245 may be formed on the resin layer 230 to upwardly diffuse the light emitted from the light sources 220. The diffusion plate 245 may be directly attached to the resin layer 230 or may be attached to the resin layer 230 using a separate adhesive member.

A thickness of the backlight unit 200 having the above-described structure and a thickness of each of components constituting the backlight unit 200 may be adjusted so as to efficiently use or direct light to the display panel 100.

More specifically, a total thickness "a" of the backlight unit 200 may be approximately 1.7 mm to 3.5 mm, for example, approximately 2.8 mm. A thickness "b" of the substrate 210 constituting the backlight unit 200 may be approximately 0.2 mm to 0.8 mm, for example, approximately 0.5 mm. A thickness "c" of the reflection layer 240 on the substrate 210 may be approximately 0.02 mm to 0.08 mm, for example, approximately 0.05 mm. Further, a thickness "d" of the light source 220 arranged on the substrate 210 may be approximately 0.8 mm to 1.6 mm, for example, approximately 1.2 mm. The thickness "e" of the resin layer 230 covering the light source 220 may be approximately 0.8 mm to 2.4 mm, for example, approximately 1.3 mm. A thickness "f" of the diffusion plate 245 on the resin layer 230 may be approximately 0.7 mm to 1.3 mm, for example, approximately 1.0 mm.

As the thickness "e" of the resin layer 230 increases, light emitted from the light sources 220 may be more widely diffused. Hence, the backlight unit 200 may provide light having the uniform luminance to the display panel 100. On the other hand, as the thickness "e" of the resin layer 230 increases, an amount of light absorbed in the resin layer 230 may increase. Hence, the luminance of light which the backlight unit 200 provides to the display panel 100 may entirely decrease.

Accordingly, the thickness "e" of the resin layer 230 may be equal to the thickness "d" of the light source 220 or may be equal to or less than 1.5 times the thickness "d" of the light source 220, so that the backlight unit 200 can provide light having the uniform luminance to the display panel 100 without an excessive reduction in the luminance.

Figure 6:
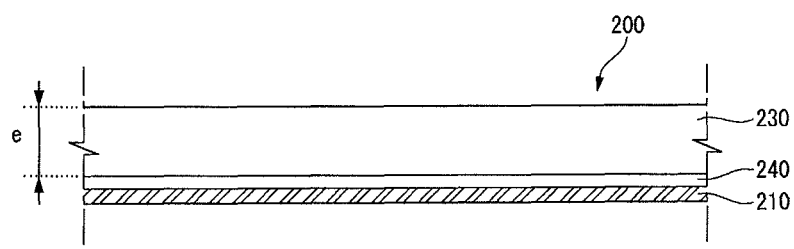

FIG. 6 illustrates a cross-sectional shape of an area (i.e., a non-formation area of the light sources 220) excluding a formation area of the light sources 220 from an entire area of the backlight unit 200. More specifically, FIG. 4 illustrates a cross-sectional configuration obtained by taking a formation area of the light sources 220 along line A-A' of FIG. 34. FIG. 6 illustrates a cross-sectional configuration obtained by taking a non-formation area of the light sources 220 along line B-B' of FIG. 34.

As shown in FIG. 6, the backlight unit 200 may have the structure in which the reflection layer 240 covers an upper surface of the substrate 210 in the non-formation area of the light sources 220. For example, the reflection layer 240 may be formed on the substrate 210 and may have a plurality of holes, into which the light sources 220 may be inserted, at a location corresponding to a formation location of the light sources 220. The light sources 220 may upwardly protrude from the holes of the reflection layer 240 and may be covered by the resin layer 230.

Figure 7:
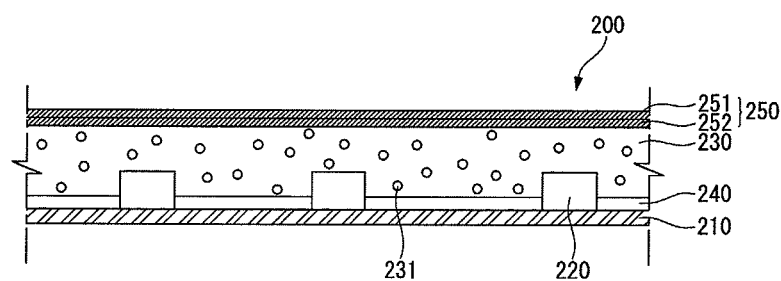
FIG. 7 illustrates a second exemplary configuration of a backlight unit according to an exemplary embodiment of the invention.

FIG. 7 illustrates a second exemplary configuration of the backlight unit according to the embodiment of the invention. As mentioned above, the backlight unit of FIG. 7 or any other figures herein can be the backlight unit 200 of FIG. 3, a backlight unit used in any display device, or a backlight unit for any device that needs the backlight unit, and can also be a light generating device. Structures and components identical or equivalent to those described in the first exemplary configuration of the backlight unit may be designated with the same reference numerals in the second exemplary configuration, and a further description may be briefly made or may be entirely omitted.

As shown in FIG. 7, the plurality of light sources 220 may be mounted on the substrate 210, and the resin layer 230 may be disposed on the substrate 210. The reflection layer 240 may be formed between the substrate 210 and the resin layer 230, more particularly, on an upper surface of the substrate 210.

The resin layer 230 may include a plurality of scattering particles 231. The scattering particles 231 may scatter or refract incident light, thereby more widely diffusing light emitted from the light sources 220.

The scattering particles 231 may be formed of a material having a refractive index different from a formation material of the resin layer 230 so as to scatter or refract the light emitted from the light source 220. More particularly, the scattering particles 231 may be formed of a material having a refractive index greater than silicon-based resin or acrylic resin forming the resin layer 230. For example, the scattering particles 231 may be formed of polymethylmethacrylate (PMMA)/styrene copolymer (MS), polymethylmethacrylate (PMMA), polystyrene (PS), silicon, titanium dioxide ($TiO_2$), and silicon dioxide ($SiO_2$), or a combination thereof. Further, the scattering particles 231 may be formed of a material having a refractive index less than the formation material of the resin layer 230. For example, the scattering particles 231 may be formed by generating bubbles in the resin layer 230. Other materials may be used for the resin layer 230. For example, the scattering particle 231 may be formed using various polymer materials or inorganic particles.

An optical sheet 250 may be disposed on the top of the resin layer 230. The optical sheet 250 may include at least one prism sheet 251 and/or at least one diffusion sheet 252. In this case, a plurality of sheets constituting the optical sheet 250 are not separated from one another and are attached to one another. Thus, the thickness of the optical sheet 250 or the thickness of the backlight unit 200 may be reduced because of the above structure of the optical sheet 250.

A lower surface of the optical sheet 250 may closely adhere to the resin layer 230, and an upper surface of the optical sheet 250 may closely adhere to the lower surface of the display panel 100, i.e., the lower polarizing plate 140.

The diffusion sheet 252 may diffuse incident light to thereby prevent light coming from the resin layer 230 from being partially concentrated. Hence, the diffusion sheet 252 may further uniformize the luminance of light. Further, the prism sheet 251 may focus light coming from the diffusion sheet 252, thereby allowing the light to be vertically incident on the display panel 100.

In the embodiment of the invention, at least one of the prism sheet 251 and the diffusion sheet 252 constituting the optical sheet 250 may be removed. The optical sheet 250 may further include other functional layers in addition to the prism sheet 251 and the diffusion sheet 252.

The reflection layer 240 may include a plurality of holes at locations corresponding to formation locations of the light sources 220, and the light sources 220 on the substrate 210 underlying the reflection layer 240 may be inserted into the holes.

In this case, the light sources 220 are downwardly inserted into the holes of the reflection layer 240, and at least a portion of each of the light sources 220 may protrude from the upper surface of the reflection layer 240. Because the backlight unit 200 is configured using the structure in which the light sources 220 are respectively inserted into the holes of the reflection layer 240, a fixation strength between the substrate 210 and the reflection layer 240 can be further improved.

Figure 8:
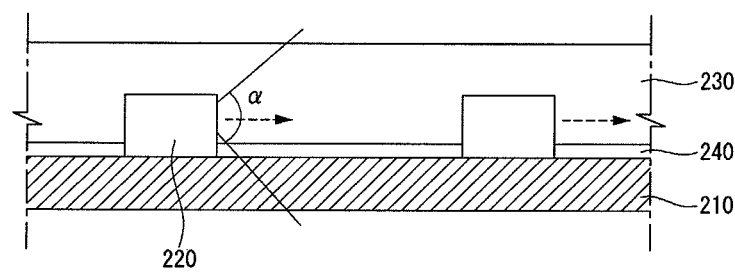
FIG. 8 illustrates a third exemplary configuration of a backlight unit according to an exemplary embodiment of the invention.

FIG. 8 illustrates a third exemplary configuration of the backlight unit according to the embodiment of the invention. Structures and components identical or equivalent to those described in the first and second exemplary configurations may be designated with the same reference numerals in the third exemplary configuration, and a further description may be briefly made or may be entirely omitted.

As shown in FIG. 8, each of the plurality of light sources 220 of the backlight unit 200 has the light emitting part on the side thereof and can emit light in a lateral direction, that is, a direction in which the substrate 210 or the reflection layer 240 extends.

For example, the plurality of light sources 220 may be configured using the side view type LED package. As a result, it is possible to reduce a problem that the light sources 220 are observed as a hot spot on the screen and slim the backlight unit 200. Furthermore, the thin profile of the display device 100 can be achieved because of a reduction of the thickness "e" of the resin layer 230.

In this case, the light sources 220 may emit light having a predetermined orientation angle of α, for example, 90° to 150° about a first direction x (indicated by an arrow). Hereinafter, a direction of light emitted from the light sources 220 is indicated as the first direction x.

In the embodiment of the invention, light is emitted and diffused upwardly from the light sources 220 by forming a pattern on the resin layer 230, and thus the backlight unit 200 can emit light having the uniform luminance.

FIGS. 9 to 14 illustrate a fourth exemplary configuration of the backlight unit according to the embodiment of the invention. Structures and components identical or equivalent to those described in the first to third exemplary configurations may be designated with the same reference numerals in the fourth exemplary configuration, and a further description may be briefly made or may be entirely omitted.

The light sources 220 illustrated in FIGS. 9 to 14 may emit light from the side of the light sources 220 in a lateral direction in the same manner as FIG. 8. Other manners may be used. For example, the light sources 220 may emit light from the top of the light sources 220. e.g., the light may be emitted in an upward direction.

Figure 9:
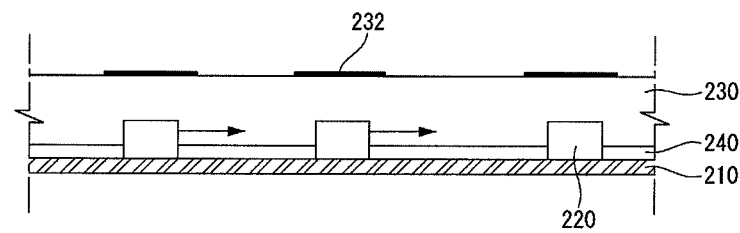
FIGS. 9 to 15 illustrate examples of a fourth exemplary configuration of a backlight unit according to an exemplary embodiment of the invention.

As shown in FIG. 9, a pattern layer including a plurality of first patterns 232 may be formed on the top of the resin layer 230 of the backlight unit 200 including the light sources 220. More specifically, the plurality of first patterns 232 of the pattern layer may be formed on the resin layer 230 at locations corresponding to formation locations of the light sources 220.

For example, the first patterns 232 formed on the top of the resin layer 230 may be a pattern capable of reflecting at least a portion of light emitted from the light sources 220.

The first patterns 232 on the resin layer 230 may prevent an increase in a luminance of light in an area adjacent to the light sources 220, and thus the backlight unit 200 may provide light having the uniform luminance.

In other words, the first patterns 232 are formed on the resin layer 230 at the locations corresponding to the formation locations of the light sources 220 and selectively reflect light emitted upward from the light sources 220, thereby reducing the luminance of light in the area adjacent to the light sources 220. The light reflected by the first patterns 232 may be diffused in a lateral direction.

More specifically, the light emitted upward from the light sources 220 is diffused in the lateral direction by the first patterns 232, and at the same time is reflected downward. The light reflected by the first patterns 232 is again diffused in the lateral direction by the reflection layer 240, and at the same time is reflected upward. In other words, the first patterns 232 may reflect 100% of incident light. Alternatively, the first patterns 232 may reflect a portion of the incident light and may transmit a portion of the incident light. As above, the first patterns 232 may control the transfer of light passing through the resin layer 230 and the first patterns 232. As a result, the light emitted from the light sources 220 may be widely diffused in the lateral direction and other directions as well as the upward direction, and thus the backlight unit 200 may emit the light having the uniform luminance.

The first patterns 232 include a reflection material such as metal. For example, the first patterns 232 may include metal having a reflectance of 90% or more such as aluminum, silver, and gold. For example, the first patterns 232 may be formed of a material capable of transmitting 10% or less of incident light and reflecting 90% or more of the incident light.

In this case, the first patterns 232 may be formed by depositing or coating the above-described metal. As another method, the first patterns 232 may be formed through a printing process using a reflection ink including a metal, for example, a silver ink in accordance with a previously determined pattern.

Further, the first patterns 232 may have a color having a high brightness, for example, a color close to white so as to improve a reflection effect of the fist patterns 232. More specifically, the first pattern 232 may have a color having a brightness greater than the resin layer 230.

The first patterns 232 may contain metal oxide. For example, the first patterns 232 may include titanium dioxide ($TiO_2$). More specifically, the first patterns 232 may be formed by printing a reflection ink containing titanium dioxide ($TiO_2$) in accordance with a previously determined pattern.

As shown in FIGS. 10 to 14, the formation of the first patterns 232 at the locations corresponding to the locations of the light sources 220 may include the case where a middle portion of the first pattern 232 coincides with a middle portion of the light source 220 corresponding to the first pattern 232 as shown in FIG. 9 and the case where the middle portion of the first pattern 232 is spaced from the middle portion of the corresponding light source 220 by a predetermined distance.

Figure 10:
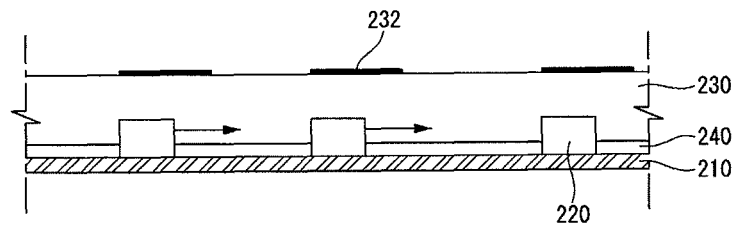

As shown in FIG. 10, the middle portion of the first pattern 232 may not coincide with the middle portion of the light source 220 corresponding to the first pattern 232.

For example, when the light emitting part of the light source 220 faces not the upward direction but the lateral direction and therefore light is emitted from the light source 220 in the lateral direction, a luminance of light emitted from the side of the light source 220 may decrease while the light emitted from the side of the light source 220 travels through the resin layer 230 in a direction indicated by an arrow of FIG. 9. Hence, light in a first area directly adjacent to the light emitting part of the light source 220 may have a luminance greater than light in an area around the light emitting part of the light source 220. Light in a second area adjacent to an opposite direction of the light emitting part may have a luminance less than the light in the first area. Thus, the first pattern 232 may be formed by moving in an emission direction of light from the light source 220. In other words, the middle portion of the first pattern 232 may be formed at a location (slightly) deviated from the middle portion of the corresponding light source 220 in the light emitting direction.

Figure 11:
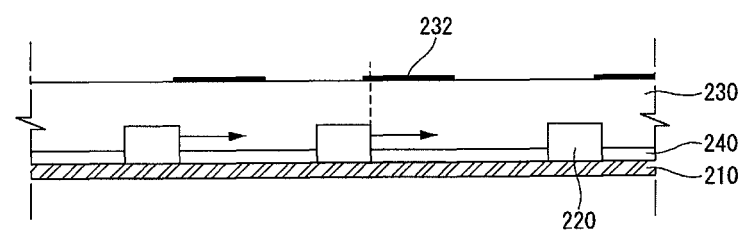

As shown in FIG. 11, the first pattern 232 may be formed at a location deviated further than the first pattern 232 illustrated in FIG. 10 toward the light emitting direction. In other words, a distance between the middle portion of the first pattern 232 and the middle portion of the corresponding light source 220 in FIG. 10 may be longer than a distance between the middle portion of the first pattern 232 and the middle portion of the corresponding light source 220 in FIG. 8. For example, the light emitting part of the light source 220 may overlap or be aligned with a left end portion of the first pattern 232.

Figure 12:
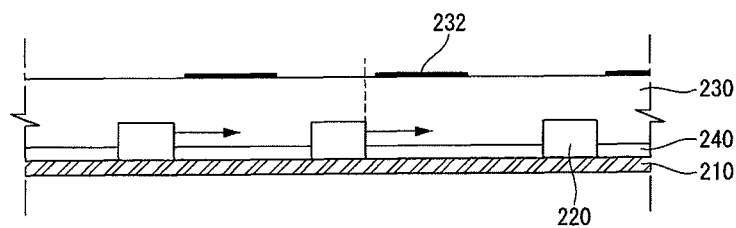

As shown in FIG. 12, the first pattern 232 may be formed at a location deviated further than the first pattern 232 illustrated in FIG. 10 toward the light emitting direction. In other words, a formation area of the first pattern 232 may not overlap a formation area of the corresponding light source 220. Hence, a left end portion of the first pattern 232 may be separated from the light emitting part of the light source 220 by a predetermined distance.

Figure 13:
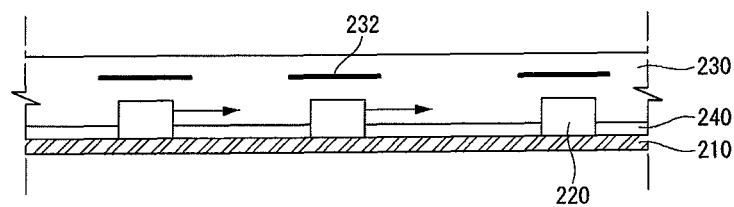

As shown in FIG. 13, the first pattern 232 may be formed inside the resin layer 230. In variation, the middle portion of the first pattern 232 may be formed at a location corresponding to the light source 220 toward the light emitting direction in the same manner as FIGS. 10 to 12.

Figure 14:
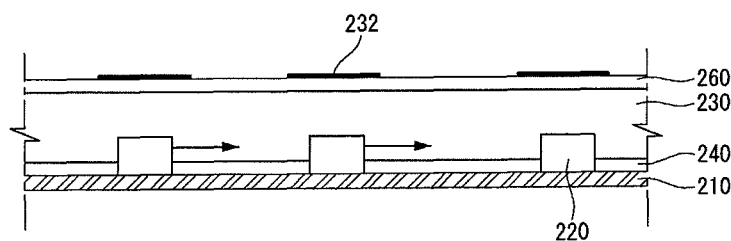

As shown in FIG. 14, the first pattern 232 may be manufactured in a sheet form. In this case, the pattern layer including the plurality of first patterns 232 may be formed on the resin layer 230.

For example, after the plurality of first patterns 232 are formed on one surface of a transparent film 260 through the printing process, etc. to form the pattern layer, the pattern layer including the transparent film 260 may be stacked on the resin layer 230. More specifically, a plurality of dots may be printed on the transparent film 260 to form the first patterns 232.

Figure 15:
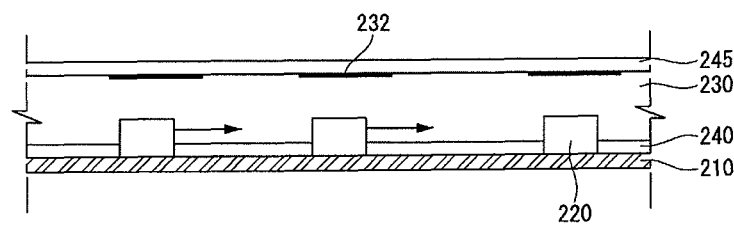

As shown in FIG. 15, the plurality of first patterns 232 may be formed on one surface of the diffusion plate 245 illustrated in FIG. 5. In this case, the first patterns 232 may be coated on one surface of the diffusion plate 245, and the diffusion plate 245 may be formed on the resin layer 230 so that the first patterns 232 contact the resin layer 230.

As a percentage of a formation area of the first pattern 232 increases, an aperture ratio may decrease. Hence, the entire luminance of light which the backlight unit 200 provides to the display panel 100 may decrease. The aperture ratio may indicate the size of an area of the resin layer 230 that is not occupied by the first pattern 232.

Thus, the aperture ratio of the pattern layer including the first patterns 232 may be equal to or greater than 70%, so as to prevent the degradation of the image quality resulting from an excessive reduction in the luminance of light provided to the display panel 100. That is, the percentage of the area of the resin layer 230 occupied by the first pattern 232 is equal to or less 30% of the total area of the resin layer 230.

FIGS. 16 to 19 are top views of the backlight unit for illustrating examples of an arrangement of the first patterns 232 formed in the backlight unit according to the embodiment of the invention. As described above, the first patterns 232 may be formed at a location generally corresponding to the light sources 220. In these figures, although the light sources 220 may not be fully visible from the top since they may be disposed below the first patterns 232, the light sources 220 are drawn merely to illustrate their locations with respect to the first patterns 232.

Figure 16:
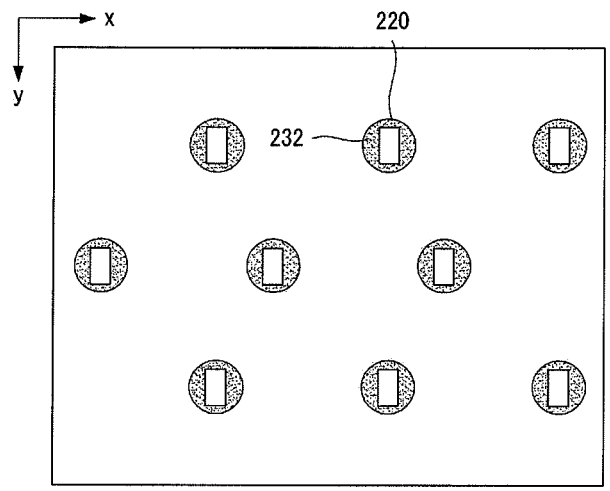
FIGS. 16 to 19 illustrate examples of an arrangement of a first pattern of a backlight unit according to an exemplary embodiment of the invention.

As shown in FIG. 16, each first pattern 232 may have a circle shape or an oval shape around a formation location of the corresponding light source 220. Other shapes, colors, and/or sizes may be used for the first pattern 232. The middle portion of the first pattern 232 may be formed at a location deviated slightly from the middle portion of the corresponding light source 220 toward the light emitting direction in the same manner as FIGS. 10 to 12.

Figure 17:
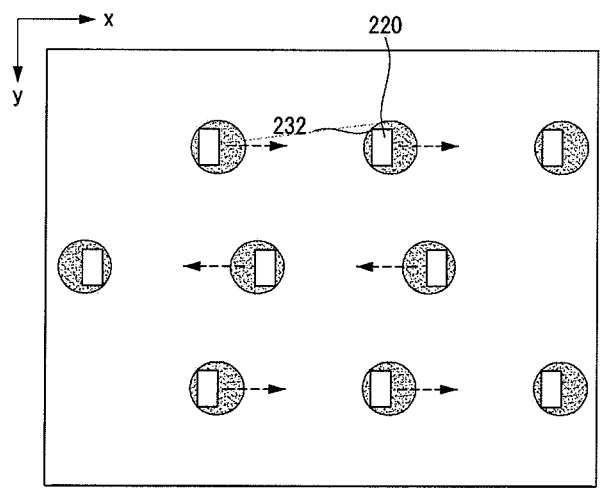

As shown in FIG. 17, the first pattern 232 may be off-centered with respect to the corresponding light sources 220 in the light emitting direction (e.g., an x-axis direction in FIG. 16). Hence, the middle portion of the first pattern 232 may be formed at a location deviated from the middle portion of the corresponding light source 220 toward the light emitting direction by a predetermined distance.

Figure 18:
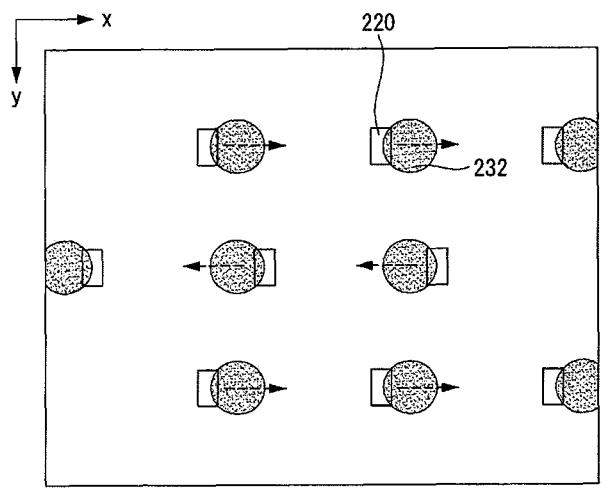

As shown in FIG. 18, the first pattern 232 may be off-centered toward the light emitting direction further than the first pattern 232 shown in FIG. 17. Hence, a portion of a formation area of the light source 220 may overlap a formation area of the first pattern 232.

Figure 19:
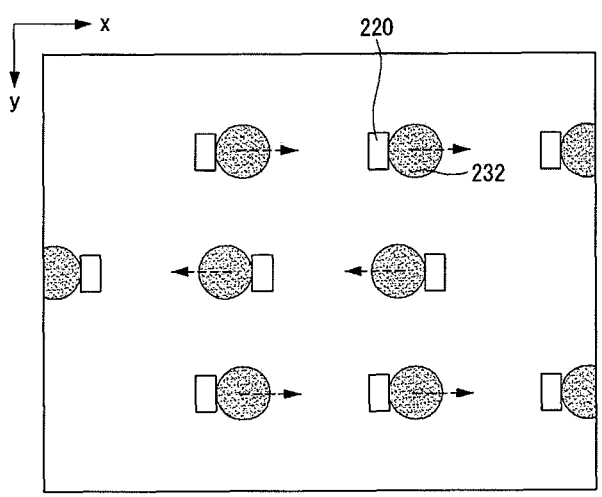

As shown in FIG. 19, the first pattern 232 may be off-centered toward the light emitting direction further than the first pattern 232 shown in FIG. 18 and thus may be positioned outside a formation area of the light source 220. Hence, a formation area of the light source 220 may not overlap or may contact a formation area of the first pattern 232.

FIGS. 20 to 23 illustrate various shapes of each first pattern 232. In FIGS. 20 to 23, the first pattern 232 may be configured by the plurality of dots or regions, and each dot or each region may contain a reflection material, for example, metal or metal oxide.

Figure 20:
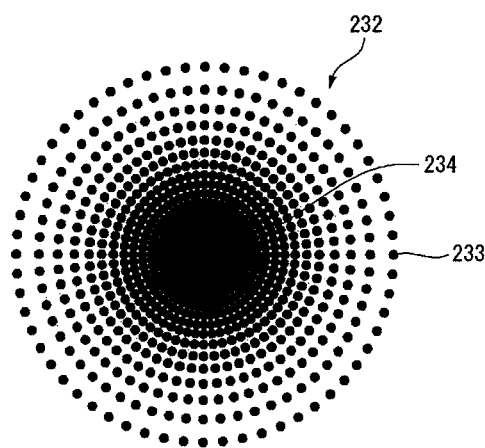
FIGS. 20 to 23 illustrate examples of a shape/configuration of a first pattern according to an exemplary embodiment of the invention.

As shown in FIG. 20, the first pattern 232 may have a circle shape around the formation location of the light source 220. Other shapes such as a diamond may be used. A reflectance of the first pattern 232 may decrease as the first pattern 232 goes from a middle portion 234 of the first pattern 232 to the outside. The reflectance of the first pattern 232 may gradually decrease as the first pattern 232 goes from the middle portion 234 to the outside, because the number of dots or a reflectance of a material forming the first pattern 232 decreases as the first pattern 232 goes from the middle portion 234 to the outside.

Further, as the first pattern 232 extends from the middle portion 234 to the outwardly direction, a transmittance or an aperture ratio of the light may increase. Hence, the formation location of the light source 220, more specifically, the middle portion 234 of the first pattern 232 corresponding to the middle portion of the light source 220 may have a maximum reflectance (for example, the middle portion 234 having the maximum reflectance does not transmit most of light) and a minimum transmittance or a minimum aperture ratio. As a result, the hot spot generated when light is concentrated in the formation area of the light source 220 may be more effectively prevented.

For example, an aperture ratio of the middle portion of the first pattern 232 overlapping the light source 220 may be equal to or less than 5% so as to prevent the generation of the hot spot.

In the plurality of dots 233 constituting the first pattern 232, a distance between the adjacent dots 233 may increase as the first pattern 232 goes from the middle portion 234 to the outside. Hence, as described above, as the first pattern 232 goes from the middle portion 234 to the outside, the transmittance or the aperture ratio of the first pattern 232 may increase while the reflectance of the first pattern 232 decreases.

Figure 21:
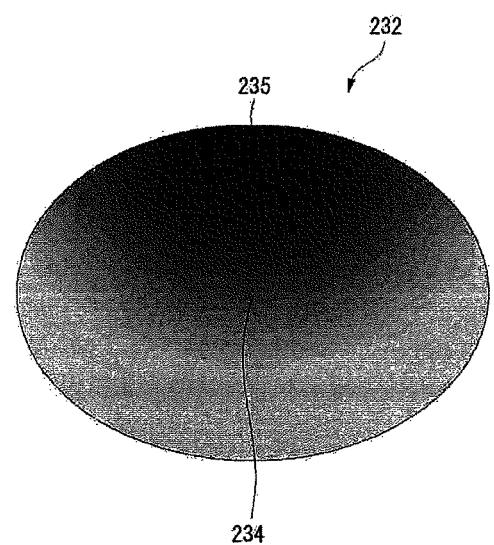

As shown in FIG. 21, the first pattern 232 may have an oval shape. The middle portion 234 of the first pattern 232 may coincide with the middle portion of the corresponding light source 220. Alternatively, the middle portion 234 of the first pattern 232 may not coincide with the middle portion of the corresponding light source 220. In other words, the middle portion 234 of the first pattern 232 may be formed at a location deviated slightly from the middle portion of the corresponding light source 220 toward one direction (for example, a light emitting direction of the corresponding light source 220) in the same manner as FIGS. 10 to 12.

In this case, as the first pattern 232 extends from a portion 237 of the first pattern 232 corresponding to the middle portion of the light source 220 to the outwardly direction, the reflectance of the first pattern 232 may decrease or the transmittance of the first pattern 232 may increase. That is, the portion 237 of the first pattern 232 may be positioned at a location deviated from the middle portion 234 of the first pattern 232 in one direction. The portion 237 of the first pattern 232 may have a maximum reflectance or a minimum transmittance.

Figure 22:
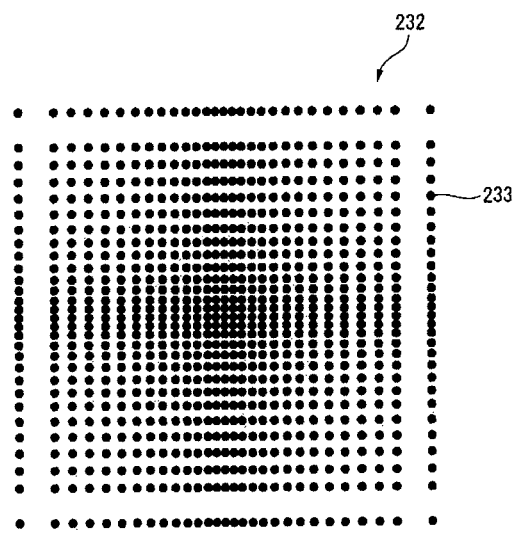
Figure 23:
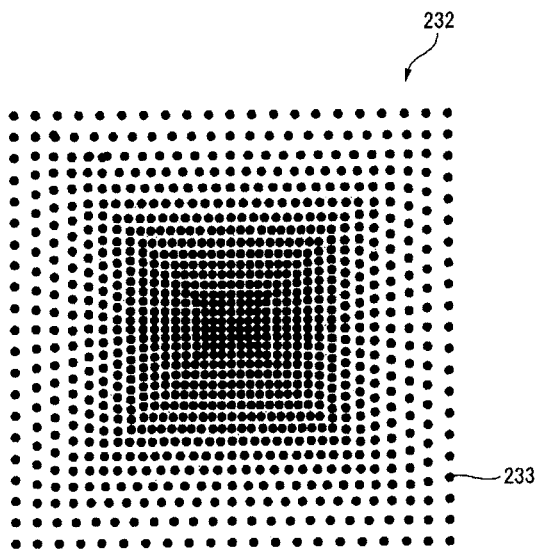

As shown in FIGS. 22 and 23, the first pattern 232 may have a rectangle shape around the formation location of the light source 220. As the first pattern 232 extends from the middle portion to the outwardly, a reflectance of the first pattern 232 may decrease and a transmittance or an aperture ratio may increase.

The first rectangular pattern 232 shown in FIGS. 20 and 21 may have the same characteristics as the first pattern 232 shown in FIGS. 22 and 23. For example, an aperture ratio of the middle portion of the first pattern 232 overlapping the light source 220 may be equal to or less than 5% so as to prevent the generation of the hot spot.

Further, as shown in FIGS. 22 and 23, in the plurality of dots 233 constituting the first pattern 232, a distance between the adjacent dots 233 may increase from the middle portion of the first pattern 232 to the outwardly direction.

In the embodiment of the invention, the first pattern 232 is configured to include the plurality of dots as shown in FIGS. 20 to 23. However, other configurations may be used. The first pattern 232 may have any configuration as long as the reflectance of the first pattern 232 decreases and the transmittance or the aperture ratio of the first pattern 232 increases as the first pattern 232 extends from the middle portion to the outwardly direction.

For example, as the first pattern 232 extends from the middle portion to the outwardly direction, a concentration of a reflection material, for example, metal or metal oxide may decrease. Hence, the reflectance of the first pattern 232 may decrease and the transmittance or the aperture ratio of the first pattern 232 may increase. As a result, the concentration of light in an area adjacent to the light source 220 may be reduced.

Figure 24:
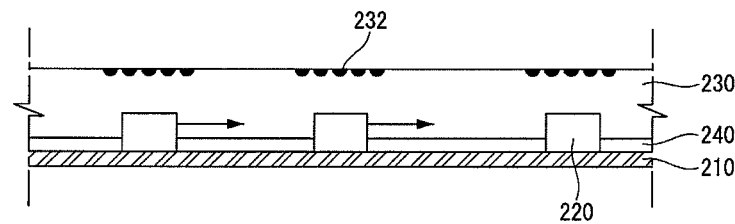
FIGS. 24 and 25 illustrate examples of a fifth exemplary configuration of a backlight unit according to an exemplary embodiment of the invention.
Figure 25:
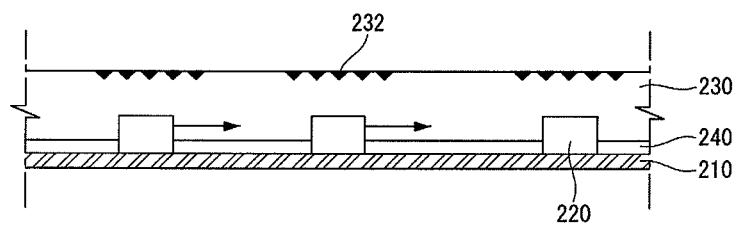

FIGS. 24 and 25 illustrate a fifth exemplary configuration of the backlight unit according to the embodiment of the invention. Structures and components identical or equivalent to those described in the first to fourth exemplary configurations may be designated with the same reference numerals in the fifth exemplary configuration, and a further description may be briefly made or may be entirely omitted.

As shown in FIG. 24, the first pattern 232 may have a convex shape protruding toward the light source 220. For example, the first pattern 232 may have a shape similar to a semicircle. A cross-sectional shape of the first pattern 232 may have a semicircle shape or an oval shape protruding toward the light source 220.

The first pattern 232 having the convex shape may reflect incident light at various angles. Hence, the first pattern 232 may uniformize the luminance of light emitted upward from the resin layer 230 by diffusing more widely light emitted from the light source 220.

The first pattern 232 may include the reflection material such as metal or metal oxide as described above. For example, the first pattern 232 may be formed by forming a pattern on the top of the resin layer 230 by an intaglio method and then filling the intaglio pattern with a reflection material. Alternatively, the first pattern 232 may be formed on the top of the resin layer 230 by printing the reflection material on a film type sheet or attaching beads or metallic particles to the film type sheet and then pressing the film type sheet onto the resin layer 230.

A cross-sectional shape of the first pattern 232 may have various shapes protruding toward the light source 220 in addition to a shape similar to the semicircle shown in FIG. 24. For example, as shown in FIG. 25, the cross-sectional shape of the first pattern 232 may have a triangle shape protruding toward the light source 220. In this case, the first pattern 232 may have a pyramid shape or a prism shape.

Figure 26:
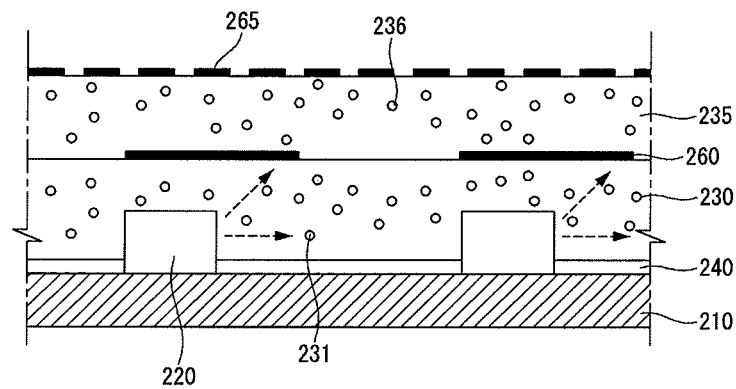
FIG. 26 illustrates a sixth exemplary configuration of a backlight unit according to an exemplary embodiment of the invention.
Figure 27:
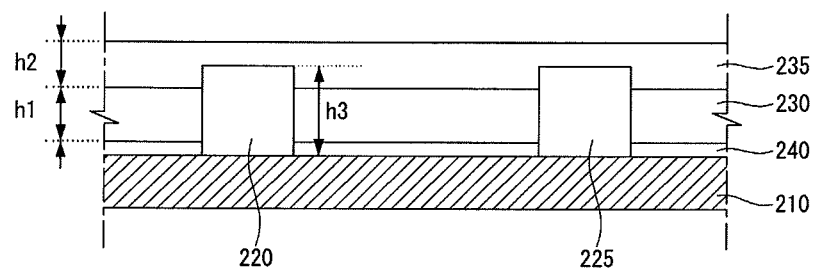
FIGS. 27 and 28 are cross-sectional views for explaining a location relationship between a light source and a reflection layer of a backlight unit according to an embodiment of the invention.

FIGS. 26 and 27 illustrate a sixth exemplary configuration of the backlight unit according to the embodiment of the invention. Structures and components identical or equivalent to those described in the first to fifth exemplary configurations may be designated with the same reference numerals in the sixth exemplary configuration, and a further description may be briefly made or may be entirely omitted.

As shown in FIG. 26, light emitted from the light source 220 may be diffused by the resin layer 230 and may be emitted upward. Further, the resin layer 230 includes the plurality of scattering particles 231 to scatter or refract the upward emitted light, thereby making the luminance of the upward emitted light more uniform.

In the embodiment of the invention, a third layer 235 may be disposed on top of the resin layer 230. The third layer 235 may be formed of the same material as or a different material from the resin layer 230 and may improve the uniformity of the luminance of the light of the backlight unit 200 by diffusing the light emitted upward from the resin layer 230.

The third layer 235 may be formed of a material having a refractive index equal to or different from a refractive index of a material forming the resin layer 230. For example, when the third layer 235 is formed of a material having a refractive index greater than the resin layer 230, the third layer 235 can more widely diffuse the light emitted from the resin layer 230. In contrast, when the third layer 235 is formed of a material having a refractive index less than the resin layer 230, a reflectance of light, which is emitted from the resin layer 230 and is reflected on the bottom of the third layer 235, can be improved. Hence, the third layer 235 may allow the light emitted from the light source 220 to easily travel along the resin layer 230.

The third layer 235 may also include a plurality of scattering particles 236. In this case, a density of the scattering particles 236 of the third layer 235 may be greater higher than a density of the scattering particles 231 of the resin layer 230.

As described above, because the third layer 235 includes the scattering particles 236 having the density greater than the scattering particles 231 of the resin layer 230, the third layer 235 can more widely diffuse the light emitted upward from the resin layer 230, thereby making the luminance of the light emitted from the backlight unit 200 more uniform.

In the embodiment of the invention, the first pattern 232 may be formed between the resin layer 230 and the third layer 235 or inside at least one of the resin layer 230 and the third layer 235.

As shown in FIG. 26, another pattern layer may be formed on the top of the third layer 235. The pattern layer on the third layer 235 may include a plurality of second patterns 265.

The second patterns 265 on top of the third layer 235 may be reflection patterns capable of reflecting at least a portion of light emitted from the resin layer 230. Thus, the second patterns 265 may further uniformize the luminance of light emitted from the third layer 235.

For example, when the light upward emitted from the third layer 235 is concentrated in a predetermined portion and is observed as light having a high luminance on the screen, the second patterns 265 may be formed in a region corresponding to the predetermined portion of the top of the third layer 235. Hence, the second patterns 265 may uniformize the luminance of light emitted from the backlight unit 200 by reducing the luminance of the light in the predetermined portion.

The second pattern 265 may be formed of titanium dioxide ($TiO_2$). In this case, a portion of light emitted from the third layer 235 may be reflected downward from the second patterns 265, and a remaining portion of the light emitted from the third layer 235 may be transmitted.

As shown in FIG. 27, a thickness h1 of the resin layer 230 may be less than a height h3 of the light source 220 or 225. Hence, the resin layer 230 may cover a portion of a lower part of the light source 220, and the third layer 235 may cover a portion of an upper part of the light source 220.

The resin layer 230 may be formed of resin having a high adhesive strength. For example, an adhesive strength of the resin layer 230 may be greater than the third layer 235. Hence, the light emitting part of the light source 220 may be strongly attached to the resin layer 230, and a space between the light emitting part of the light source 220 and the resin layer 230 may not be formed.

In the embodiment of the invention, the resin layer 230 may be formed of silicon-based resin having a high adhesive strength, and the third layer 235 may be formed of acrylic resin. In this case, the refractive index of the resin layer 230 may be greater than the refractive index of the third layer 235, and each of the second and third layers 230 and 235 may have the refractive index of approximately 1.4 to 1.6. Further, a thickness h2 of the third layer 235 may be less than the height h3 of the light source 220.

Figure 28:
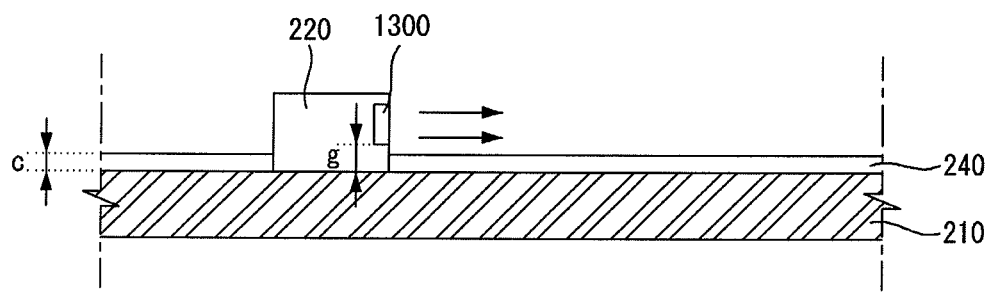

FIG. 28 illustrates a location relationship between the light source 220 and the reflection layer 240 of the backlight unit according to an embodiment of the invention.

As shown in FIG. 28, because the reflection layer 240 is disposed at the side of the light source 220, a portion of light emitted from the light source 220 toward the side of the light source 220 may be incident on the reflection layer 240 and may be lost.

The loss of light emitted from the light source 220 decreases an amount of the light that is incident on the resin layer 230 and then passes through the resin layer 230. Hence, an amount of light incident on the display panel 100 from the backlight unit 200 may decrease. As a result, the luminance of the image displayed on the display device may be reduced.

Each of the light sources 220 may include a light emitting part 222 (e.g., LED) emitting light. The light emitting part 222 may be positioned at a location separated from the surface of the substrate 210 by a predetermined height "g".

The thickness "c" of the reflection layer 240 may be equal to or less than the height "g" of the light emitting part 222. Hence, the light source 220 may be positioned above the reflection layer 240.

Accordingly, the thickness "c" of the reflection layer 240 may be approximately 0.02 mm to 0.08 mm. When the thickness "c" of the reflection layer 240 is equal to or greater than 0.02 mm, the reflection layer 240 may have a light reflectance within a reliable range. When the thickness "c" of the reflection layer 240 is equal to or less than 0.08 mm, the reflection layer 240 may cover the light emitting part 222 of the light source 220. Hence, a loss of light emitted from the light source 220 may be prevented.

Accordingly, the thickness "c" of the reflection layer 240 may be approximately 0.02 mm to 0.08 mm, so that the reflection layer 240 improves an incident efficiency of light emitted from the light source 220 and reflects most of light emitted from the light source 220.

Figure 29:
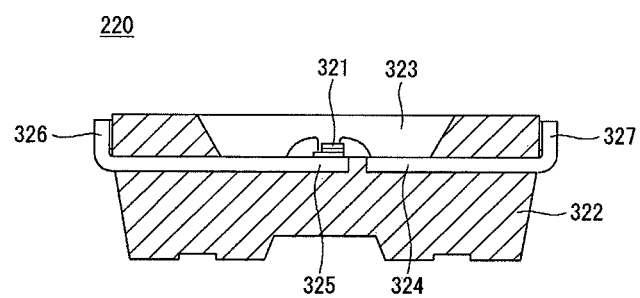
FIGS. 29 to 32 illustrate examples of a structure of a light source of a backlight unit according to an embodiment of the invention.
Figure 30:
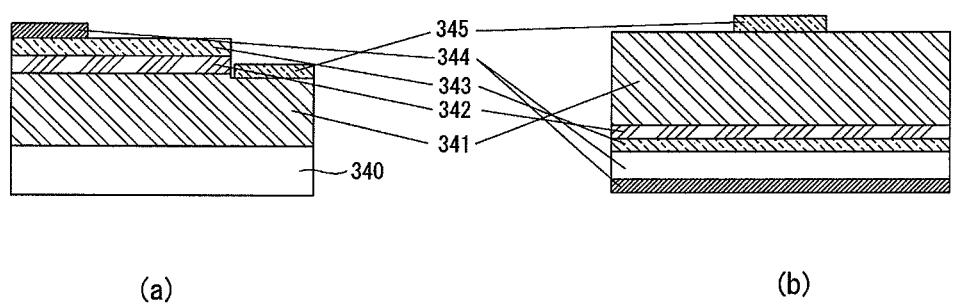
Figure 31:
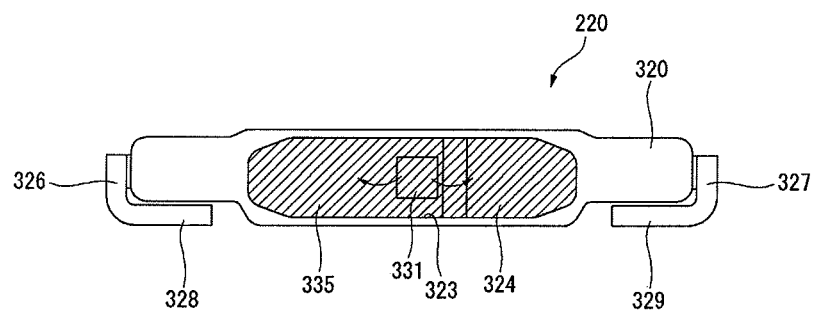

FIGS. 29 to 32 illustrate examples of a structure of the light source of the backlight unit according to an embodiment of the invention. More specifically, FIG. 29 illustrates the structure of the light source when viewed from the side of the light source, and FIG. 31 illustrates a structure of a head part of the light source when viewed from the front of the light source.

As shown in FIG. 29, the light source 220 may include a light emitting element 321, a mold part 322 having a cavity 323, and a plurality of lead frames 324 and 325.

In the embodiment of the invention, the light emitting element 321 may be a light emitting diode (LED) chip. The LED chip may be configured by a blue LED chip or an infrared LED chip or may be configured by at least one of a red LED chip, a green LED chip, a blue LED chip, a yellow green LED chip, and a white LED chip or a combination thereof.

The light emitting element 321 may be classified into a horizontal type light emitting element and a vertical type light emitting element depending on its structure.

FIGS. 30(a) and (b) respectively illustrate an example of a horizontal type light emitting element and a vertical type light emitting element.

As shown in FIG. 30(a), the horizontal type light emitting element may include a substrate 340 formed of silicon or sapphire as a bottom layer. An n-type semiconductor layer 341 may be positioned on the substrate 340 and may be formed of, for example, n-GaN. An active layer 342 may be positioned on the n-type semiconductor later 341 and may be formed of, for example, InGaN. A p-type semiconductor layer 343 may be positioned on the active layer 342 and may be formed of, for example, p-GaN. A p-type electrode 344 may be positioned on the p-type semiconductor layer 343 and may contain at least one of chromium (Cr), nickel (Ni), and gold (Au). An n-type electrode 345 may be positioned on the n-type semiconductor layer 341 and may contain at least one of chromium (Cr), nickel (Ni), and gold (Au).

In another example as shown in FIG. 30(b), the vertical type light emitting element may have the structure in which the p-type electrode 345, the n-type semiconductor layer 341, the active layer 342, and the p-type semiconductor layer 343 are stacked on the n-type electrode 344.

In the light emitting element shown in FIG. 30, when a voltage is applied to the p-type electrode 344 and the n-type electrode 345, holes and electrons are combined on the active layer 342. The light emitting element shown in FIG. 30 may operate by emitting light energy corresponding to a height difference (i.e., an energy gap) between a conduction band and a valence band.

Hereinafter, the embodiment of the invention will be described using the case in which the light source 220 is configured to include, for example, the LED chip 321 as the light emitting element.

The LED chip 321 may be packaged in the mold part 322 constituting a body of the light source 220. For this, the cavity 323 may be formed at one side of the center of the mold part 322. The mold part 322 may be injection-molded with a resin material such as polyphtalamide (PPA) to a press (Cu/Ni/Ag substrate), and the cavity 323 of the mold part 322 may serve as a reflection cup. The shape or structure of the mold part 322 may be changed and is not limited thereto.

Each of the lead frames 324 and 325 may penetrate the mold part 322 in a long axis direction of the mold part 322. Ends 326 and 327 of the lead frames 324 and 325 may be exposed to the outside of the mold part 322. Herein, when viewed from the bottom of the cavity 323 where the LED chip 321 is disposed, a long-direction symmetrical axis of the mold part 322 is referred to as a long axis and a short-direction symmetrical axis of the mold part 322 is referred to as a short axis.

A semiconductor device such as a light receiving element and a protection element may be selectively mounted on the lead frames 324 and 325 in the cavity 323 along with the LED chip 321. That is, the protection device such as a zener diode for protecting the LED chip 321 from electrostatic discharge (ESD) may be mounted on the lead frames 324 and 325 along with the LED chip 321.

The LED chip 321 may attach to any one lead frame (for example, the lead frame 325) positioned on the bottom of the cavity 323, and then may be bonded by wire bonding or flip chip bonding.

Further, after the LED chip 321 is connected to the lead frame 325 in the cavity 323, a resin material may be molded to the mounting region. The resin material includes silicon or an epoxy material, and a phosphor may be selectively added to the resin material. The resin material may be formed in any one form of a flat form in which the surface of the resin material is molded with the same height as the top of the cavity 323, a concave lens form depressed from the top of the cavity 323, and a convex lens form protruding from the top of the cavity 323.

At least one side of the cavity 323 may be inclined, and the inclined side of the cavity 323 may serve as a reflection surface or a reflection layer for selectively reflecting incident light. The cavity 323 may have a polygonal exterior shape and may have other shapes other than a polygonal shape.

As shown in FIG. 31, a head part 320 of the light source 220 corresponding to a light emitting part may include a light emitting part actually emitting light and a non-emitting surface which is a part other than the light emitting part and does not emit light.

More specifically, the light emitting part of the head part 320 of the light source 220 may be formed by the mold part 322 and may be defined by the cavity 323 in which the LED chip 321 is positioned. For example, the LED chip 321 may be disposed in the cavity 323 of the mold part 322, and light emitted from the LED chip 321 may be emitted through the light emitting part surrounded by the mold part 322. Further, the non-emitting surface of the head part 320 of the light source 220 may be a part where the mold part 322 is formed and the light is not emitted.

Further, as shown in FIG. 31, the light emitting part of the head part 320 of the light source 220 may have a shape in which a transverse length is longer than a longitudinal length.

Other shapes may be used for the light emitting part of the head part 320. For example, the light emitting part may have a rectangular shape.

In addition, the non-emitting surface of the light source 220 may be positioned at upper, lower, left, or right side of the light emitting part of the head part 320 of the light source 220.

The ends 326 and 327 of the lead frames 324 and 325 may be first formed to extend to the outside of the mold part 322 and then may be secondly formed in one groove of the mold part 322. Hence, the ends 326 and 327 may be disposed in first and second lead electrodes 328 and 329. Herein, the number of such forming steps and thus formation time may vary.

The first and second lead electrodes 328 and 329 of the lead frames 324 and 325 may be formed to be received in grooves formed at both sides of the bottom of the mold part 322. Further, the first and second lead electrodes 328 and 329 may be formed to have a plate structure of a predetermined shape and may have a shape in which solder bonding is easy performed in surface mounting.

Figure 32:
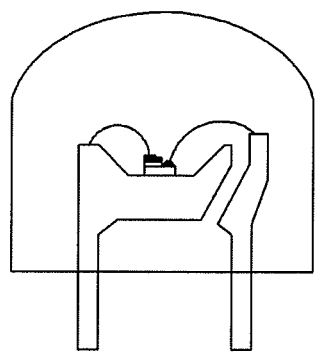
Figure 32:
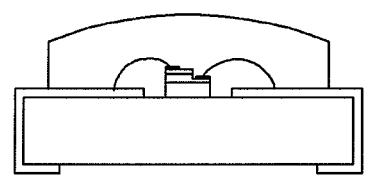
Figure 32:
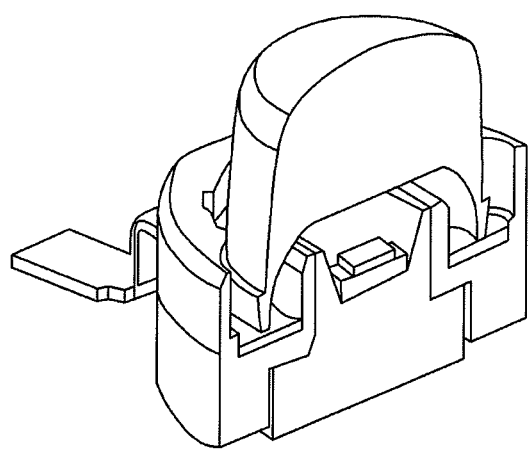

As shown in FIG. 32, the light source 220 may be classified into a lead type light source, a SMD type light source, and a flip-chip type light source depending on a packaging form of the LED chip. The lead type, SMD type, and flip-chip type light sources may be applied to the embodiment of the invention. Other types may be used.

Figure 33:
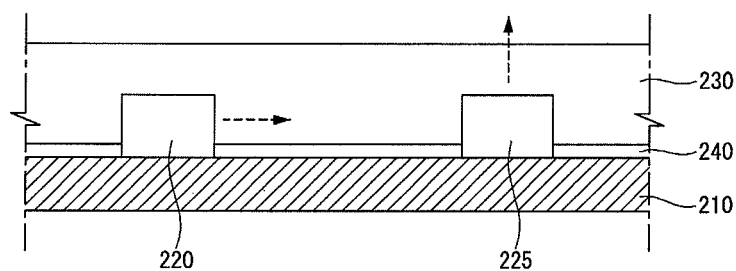
FIG. 33 illustrates a structure of a plurality of light sources of a backlight unit according to an embodiment of the invention.

FIG. 33 illustrates an example of a structure of the light sources of the backlight unit.

As shown in FIG. 33, the first light source 220 and the second light source 225 of the plurality of light sources 220 of the backlight unit 200 may emit light in different directions.

For example, the first light source 220 may emit the light in the lateral direction. For this, the first light source 220 may be configured using the side view type LED package. The second light source 225 may emit the light in the upward direction. For this, the second light source 225 may be configured using the top view type LED package. In other words, the plurality of light sources 220 of the backlight unit 200 may be configured by combining the side view type LED packages and the top view type LED packages.

As described above, because the backlight unit 200 is configured by combining two or more light sources that emit light in different directions, an increase and a reduction in the luminance of light in a predetermined area may be prevented. As a result, the backlight unit 200 may provide light with the uniform luminance to the display panel 100.

In FIG. 33, the embodiment of the invention is described using a case where the first light source 220 emitting the light in the lateral direction and the second light source 225 emitting the light in the upward direction are disposed adjacent to each other as an example, but the invention is not limited thereto. For example, the side view type light sources may be disposed adjacent to each other or the top view type light sources may be disposed adjacent to each other.

FIGS. 34 to 44 illustrate a front shape of a backlight unit including light sources according to a seventh exemplary configuration of the invention. The light sources in these figures can be have any configuration discussed in any of the embodiments discussed herein.

Figure 34:
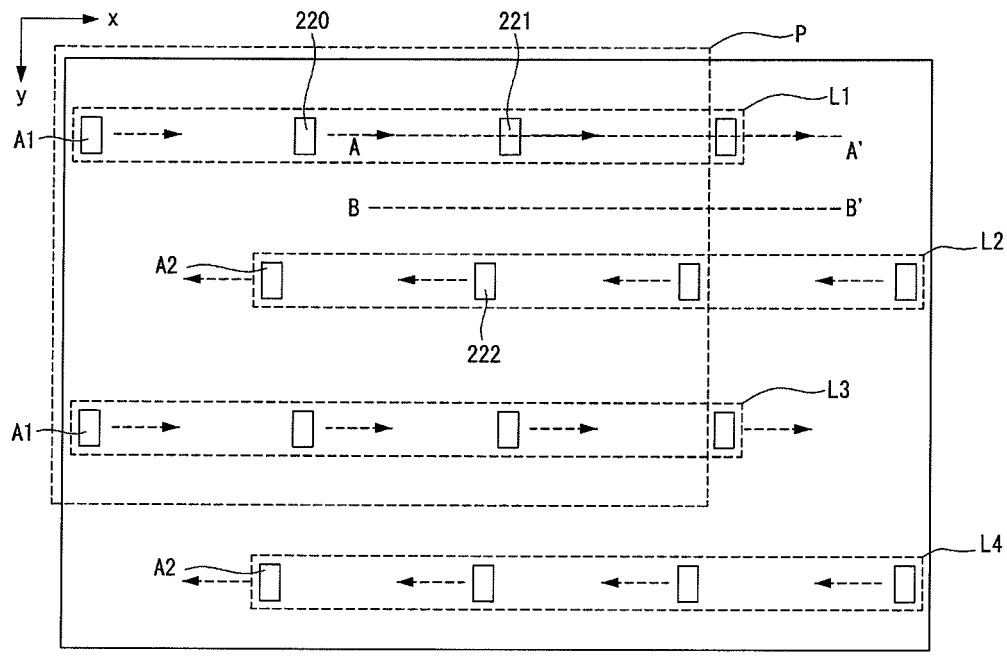
FIGS. 34 to 44 illustrate examples of a front shape of a backlight unit according to a seventh exemplary configuration of the invention.

As shown in FIG. 34, the plurality of light sources of the backlight unit 200 may be divided into a plurality of arrays, for example, a first light source array A1 and a second light source array A2.

Each of the first light source array A1 and the second light source array A2 may include a plurality of light source lines each including light sources. For example, the first light source array A1 may include one or more light source lines L1, L3 each including at least two light sources, and the second light source array A2 may include one or more light source lines L2, L4 each including at least two light sources.

The plurality of light source lines L1, L3 of the first light source array A1 and the plurality of light source lines L2, L4 of the second light source array A2 may be alternately disposed so as to correspond to the display area of the display panel 100.

In the embodiment of the invention, the first light source array A1 may include odd-numbered light source lines each including at least two light sources from the top of the plurality of light source lines, and the second light source array A2 may include even-numbered light source lines each including at least two light sources from the top of the plurality of light source lines.

In the embodiment of the invention, the backlight unit 200 may be configured so that a first light source line L1 of the first light source array A1 and a second light source line L2 of the second light source array A2 are disposed adjacent to each other up and down and the first light source line L1 and the second light source line L2 are alternately disposed, which may be referred to as the lines L3 and L4.

Further, the light source 220 of the first light source array A1 and the light source 222 of the second light source array A2 may emit light in the same direction or in different directions (e.g., opposite direction).

As shown in FIG. 34, the backlight unit 200 may include two or more light sources that emit light in different directions.

For instance, the light sources 220 of the first light source array A1 and the light sources 222 of the second light source array A2 may emit light in different directions. For this, a facing direction of light emitting parts of the light sources 220 of the first light source array A1 face may be different from a facing direction of light emitting parts of the light sources 222 of the second light source array A2.

In one example, the light emitting parts of the first and second light sources 220 and 221 of the first light source array A1 and the light emitting part of the third light source 222 of the second light source array A2 may face in opposite directions. Hence, the first and second light sources 220 and 221 of the first light source array A1 and the third light source 222 of the second light source array A2 may emit light in opposite directions. In this case, each of the light sources of the backlight unit 200 may emit light in the lateral direction and may be configured by using the side view-type LED package. In another example, the light sources 220 and 222 may emit light in different directions excluding the opposite directions.

The plurality of light sources of the backlight unit 200 may be disposed while forming two or more lines. Two or more light sources on the same line may emit light in the same direction. For example, the second light source 221 adjacent to the first light source 220 may emit light in the same direction as the first light source 220, e.g., in the x-axis direction. The light sources adjacent to the third light source 222 may emit light in the same direction as the third light source 222, e.g., in the opposite direction of the x-axis direction.

As described above, the light sources (for example, the first light source 220 and the third light source 222) disposed adjacent to each other in a y-axis direction may be configured so that their light emitting directions are opposite (or different from) to each other. Hence, the luminance of light emitted from the light sources may be prevented from being increased or reduced in a predetermined area of the backlight unit 200.

Further, the light sources of the first light source line L1 of the first light source array A1 and the light sources of the second light source line L2 of the second light source array A2 may not disposed in a straight line in a vertical direction and may be staggered in the vertical and/or horizontal direction. As a result, the uniformity of light emitted from the backlight unit 200 may be improved. For instance, the first or second light source 220 or 221 of the first light source array A1 and the third light source 222 of the second light source array A2 may be disposed adjacent to each other in a diagonal direction.

FIGS. 35 to 42 are diagrams illustrating different examples of an arrangement of light sources which may be used for an area "P" of FIG. 34.

Figure 35:
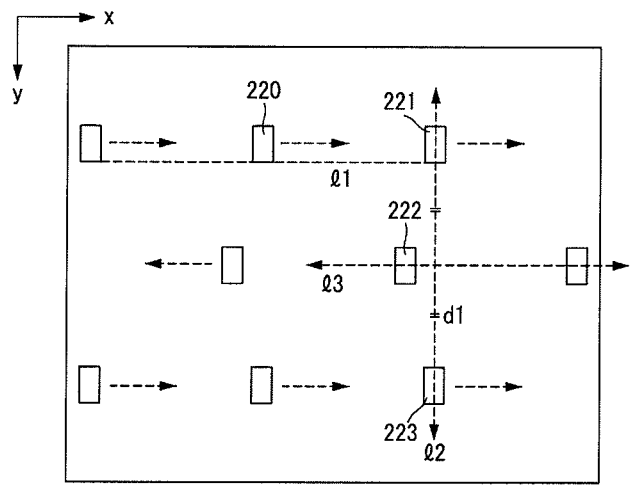
Figure 36:
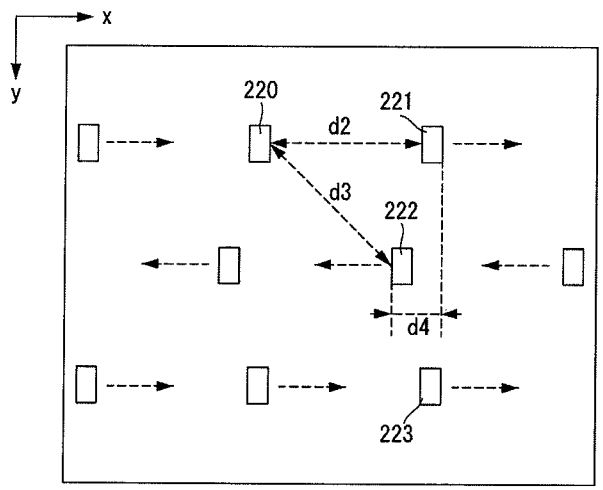

As shown in FIGS. 35 and 36, two vertically adjacent light source lines (for example, the first and second light source lines L1 and L2) respectively included in the first and second light source arrays A1 and A2 may be separated from each other by a predetermined distance.

The first light source array A1 may include the first light source 220 emitting light in one direction and the second light source 221 that is positioned adjacent to the first light source 220 on the same horizontal line l1 as the first light source 220 and emits light in the same direction as the first light source 220. The same horizontal line l1 may be an extension line in the x-axis direction.

The second light source array A2 may include the third light source 222 that emits light in the opposite direction of (or in the different direction from) the light emitting direction of the first light source 220. The third light source 222 may be positioned between the first and second light sources 220 and 221. Further, the third light source 222 and the first light source 220 or the second light source 221 may be positioned on a diagonal line.

A third light source line L3 of the first light source array A1 may be separated from the second light source line L2 of the second light source array A2 by a predetermined distance. The third light source line L3 may include a fourth light source 223 that emits light in the same direction as the second light source 221 and is positioned on a horizontal line l2 along with the second light source 221, where the horizontal line l2 extends in a direction that is perpendicular (or substantially perpendicular) to the light emitting direction of the second light source 221.

The third light source 222 may be positioned between the second and fourth light sources 221 and 223 on a horizontal line l3 bisecting an area having a distance d1 between the second and fourth light sources 221 and 223. Further, the third light source 222 may be positioned adjacent to the horizontal line l2 perpendicular to the second light source 221 in the opposite direction of the light emitting direction of the second light source 221.

A light orientation angle θ from the light source and a light orientation angle θ' inside the resin layer 230 may satisfy the following Equation 1 in accordance with Snell's law.

$$\frac{n1}{n2} = \frac{\sin\theta'}{\sin\theta} \qquad \text{[Equation 1]}$$

Considering that a light emitting portion of the light source is an air layer (having a refractive index n1 of 1) and the orientation angle θ of light emitted from the light source is generally 60°, the light orientation angle θ' inside the resin layer 230 may have a value indicated in the following Equation 2 in accordance with the above Equation 1.

$$\sin\theta' = \frac{\sin 60°}{n2} \qquad \text{[Equation 2]}$$

Further, when the resin layer 230 is formed of an acrylic resin such as polymethyl methacrylate (PMMA), the resin layer 230 has a refractive index of approximately 1.5. Therefore, the light orientation angle θ' inside the resin layer 230 may be approximately 35.5° in accordance with the above Equation 2.

As described with reference to the above Equations 1 and 2, the light orientation angle θ' of the light emitted from the light source in the resin layer 230 may be less than 45°. As a result, a travelling range of light emitted from the light source in the y-axis direction may be less than a travelling range of the light emitted from the light source in the x-axis direction.

Accordingly, because the third light source 222 may be positioned on the horizontal line l3 bisecting the area having the distance d1 between the second and fourth light sources 221 and 223, the luminance of the light emitted from the backlight unit 200 may be uniformized.

As shown in FIG. 36, the first, second, and third light sources 220, 221, and 222 are positioned to be spaced apart from one another by a predetermined distance.

More specifically, the first and second light sources 220 and 221 may be disposed so that a distance between the middle of a light emitting part of the first light source 220 and the middle of a surface opposite a light emitting part of the second light source 221 is a first distance d2. The first and third light sources 220 and 222 may be disposed so that a distance between the middle of the light emitting part of the first light source 220 and the middle of a light emitting part of the third light source 222 is a second distance d3. The second and third light sources 221 and 222 may be disposed so that a horizontal distance between the light emitting part of the second light source 221 and the light emitting part of the third light source 222 is a third distance d4. The third distance d4 is a horizontal/shortest distance between two lines extending from the surfaces (e.g., light emitting surfaces) of the second and third light sources 221 and 222.

The first distance d2 between the middle of the light emitting part of the first light source 220 and the middle of the surface opposite the light emitting part of the second light source 221 may be equal to or less than the second distance d3 between the middle of the light emitting part of the first light source 220 and the middle of the light emitting part of the third light source 222. When the first distance d2 is less than the second distance d3, an overlapping area between light emitted from the first light source 220 and light emitted from the third light source 222 may decrease. Hence, non-uniformity of the luminance may be prevented. Further, because the third distance d4 between the light emitting part of the second light source 221 and the light emitting part of the third light source 222 decreases, a reduction of the luminance in an area between the second light source 221 and the third light source 222 may be prevented.

Figure 37:
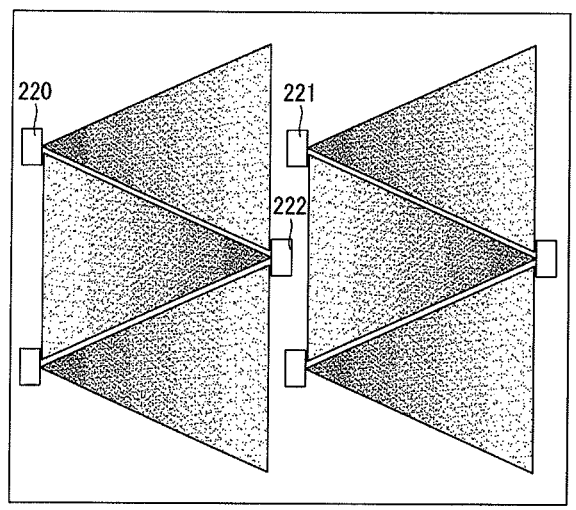

In other words, as shown in FIG. 37, the non-uniformity of the luminance may be prevented by removing or minimizing the overlapping area between the light emitted from the first light source 220 and the light emitted from the third light source 222.

Further, when the first distance d2 is equal to the second distance d3, the size of the overlapping area between the light emitted from the first light source 220 and the light emitted from the third light source 222 may be minimized, and the third distance d4 may be maximized. Namely, the overlap between the light emitted from the first light source 220 and the light emitted from the third light source 222 may be minimized, and the generation of a dark portion in an area between the second and third light sources 221 and 222 may be minimized.

Figure 38:
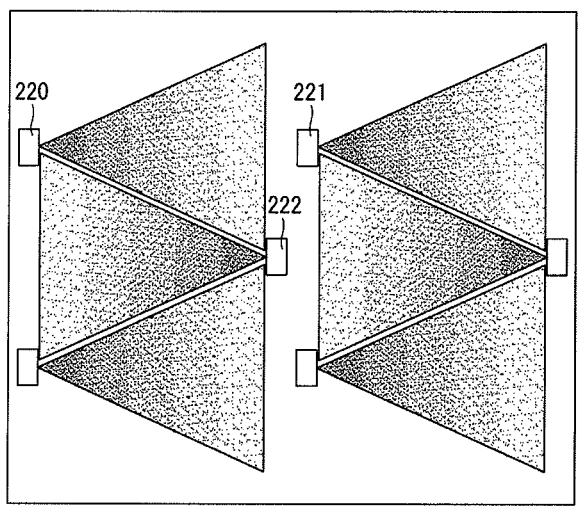

In other words, as shown in FIG. 38, the overlapping area between the light emitted from the first light source 220 and the light emitted from the third light source 222 may be minimized, and a reduction of the luminance in the area between the second and third light sources 221 and 222 may be minimized.

Accordingly, light having the uniform luminance may be emitted from the entire surface of the backlight unit according to the embodiment of the invention.

Figure 39:
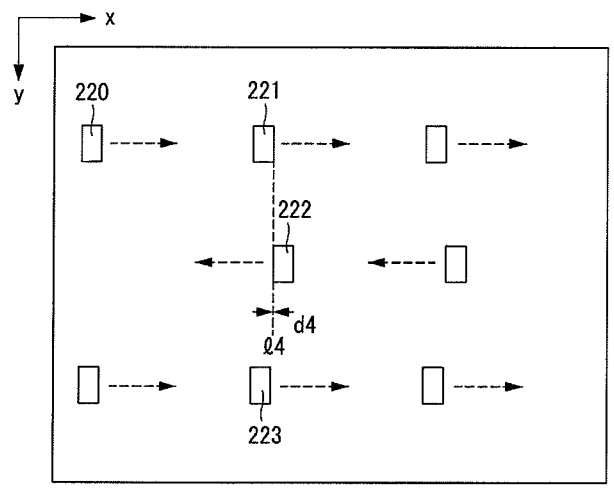
Figure 40:
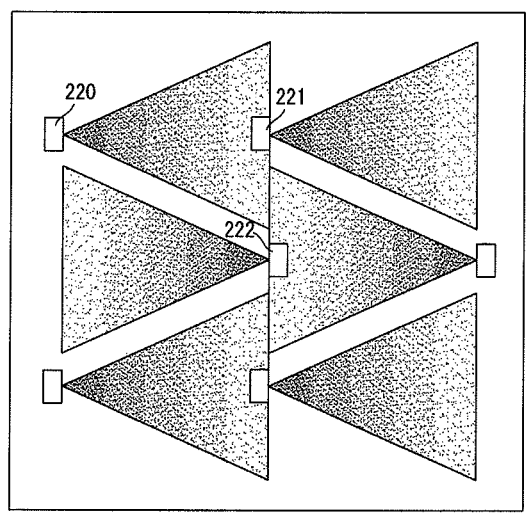

In another example as shown in FIGS. 39 and 40, the second light source 221 and the third light source 222 may be disposed so that the light emitting part (e.g., LED chip) of the second light source 221 and the light emitting part of the third light source 222 are positioned on the same vertical line l4. For instance, the third distance d4 corresponding to a distance between the light emitting part of the second light source 221 and the light emitting part of the third light source 222 may be minimized or zero.

Accordingly, as shown in FIG. 40, a dark portion may be prevented or reduced from being generated between the light emitting part of the second light source 221 and the light emitting part of the third light source 222. As a result, the backlight unit 200 may provide light having the uniform luminance.

In the embodiment of the invention, the substrate 210 on which the light sources of the backlight unit 200 are disposed may be divided into a plurality of substrates.

Figure 41:
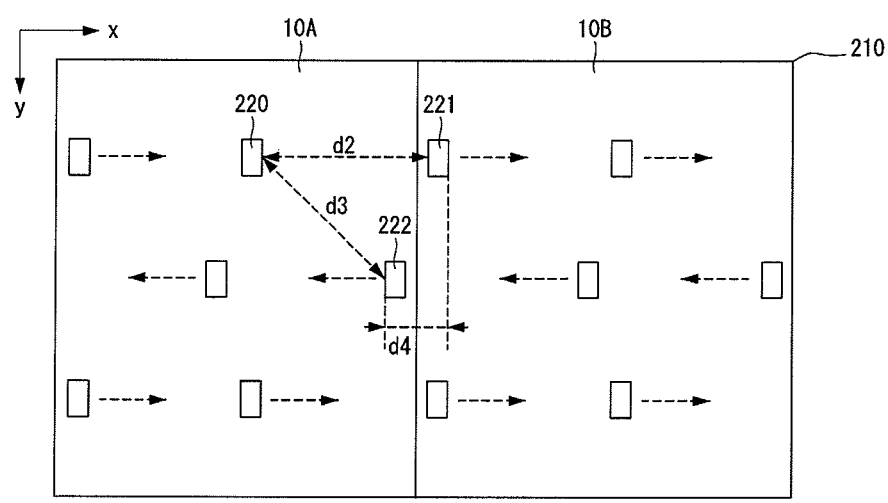
Figure 42:
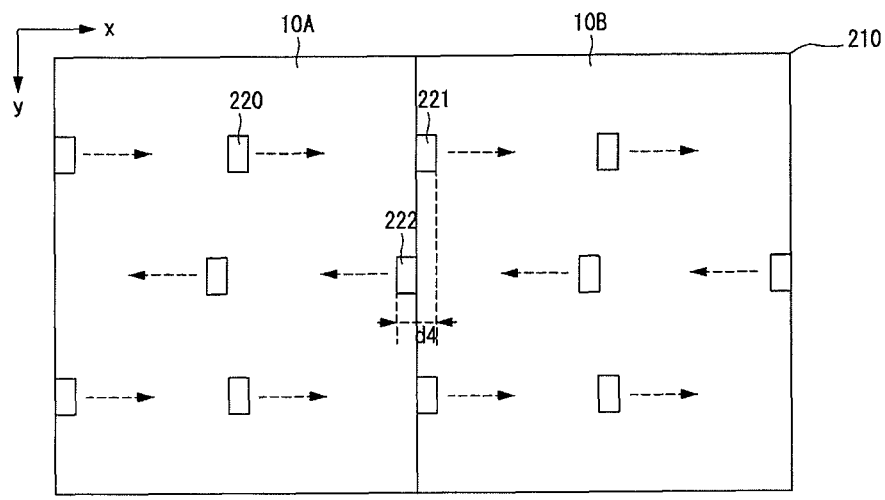

FIGS. 41 and 42 illustrate examples of the backlight unit including the two or more substrates 210.

As shown in FIG. 41, a first optical assembly 10A and a second optical assembly 10B each having the plurality of light sources 220, 221, and 222 may be positioned on the substrate 210 to adhere to each other. The light sources 220, 221, and 222 of the first optical assembly 10A and the light sources 220, 221, and 222 of the second optical assembly 10B may be disposed in the same form.

More specifically, the first optical assembly 10A may include the first light source 220 emitting light in one direction and the third light source 222 that is positioned on a diagonal line between the first and third light sources 220 and 222 and emits light in the opposite (or different) direction of a light emitting direction of the first light source 220. The second optical assembly 10B may include the second light source 221 that is disposed on the same horizontal line as the first light source 220 and emits light in the same direction as the first light source 220.

As described above with reference to, e.g., FIG. 36, in the example of FIG. 41, the first distance d2 between the middle of the light emitting part of the first light source 220 and the middle of the surface opposite the light emitting part of the second light source 221 may be equal to or less than the second distance d3 between the middle of the light emitting part of the first light source 220 and the middle of the light emitting part of the third light source 222.

As shown in FIG. 41, the third light source 222 of the first optical assembly 10A may be positioned to adhere to the side of the first optical assembly 10A, and the second light source 221 of the second optical assembly 10B may be positioned to adhere to the side of the second optical assembly 10B.

In the embodiment of the invention, the third distance d4 between the light emitting part of the second light source 221 and the light emitting part of the third light source 222 may be a sum of a width of the second light source 221 and a width of the third light source 222.

As shown in FIGS. 41 and 42, for example, a width of each of the second light source 221 and the third light source 222 may be approximately 1 mm to 2 mm. Accordingly, in the embodiment of the invention, in the case of the backlight unit including a plurality of optical assemblies, a minimum value of the third distance d4 between the light emitting part of the second light source 221 and the light emitting part of the third light source 222 may be equal to a sum of the width of the second light source 221 and the width of the third light source 222. For instance, the surfaces of the second and third light sources 221 and 222 may be aligned with each other or substantially aligned with each other. In an example, these surfaces may be both the light emitting surfaces or both the non-light emitting surfaces (opposite the light emitting surfaces). In another example, these surfaces may be a light emitting surface of the second or third light source and a non-light emitting surface opposite the light emitting surface of the second or third light source.

Figure 43:
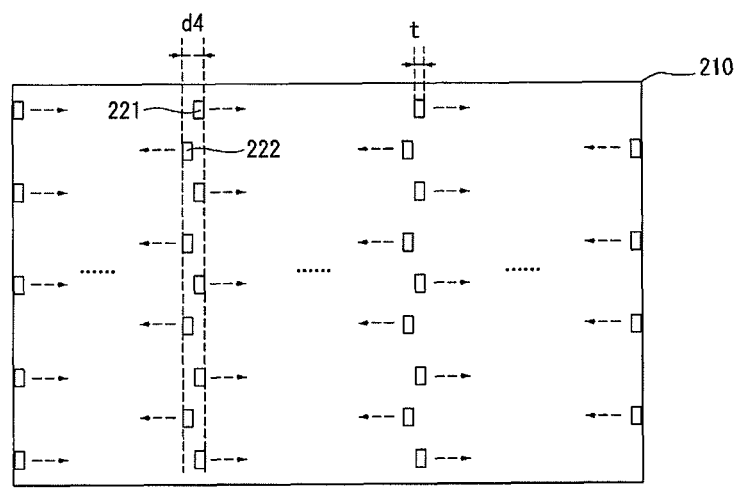
Figure 44:
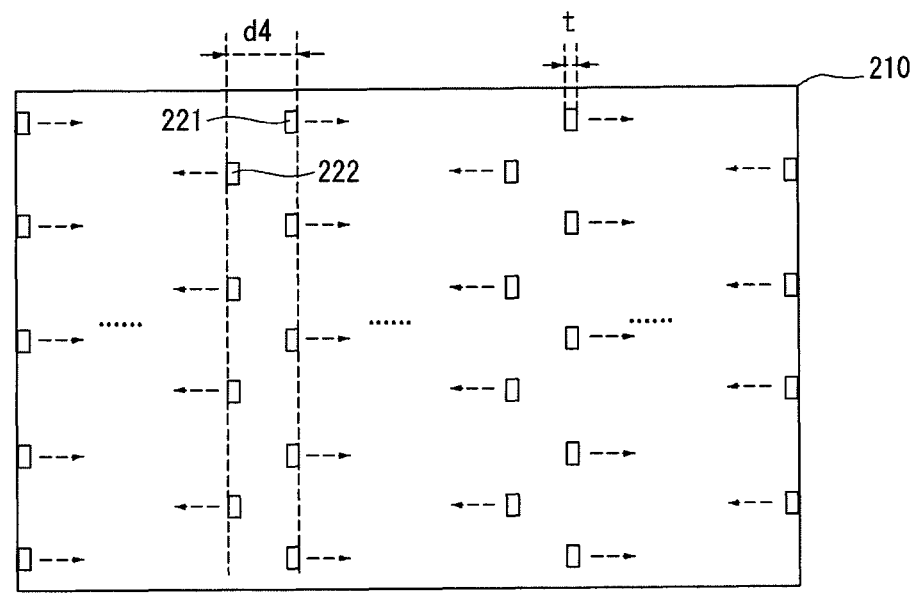

As shown in FIGS. 43 and 44, the third distance d4 between two lines extending from the light emitting part of the second light source 221 and the light emitting part of the third light source 222 may be equal to or greater than 2t, where "t" is a width of the second or third light source 221, 222, further may be equal to or less than ten times the width "t" of the second or third light source 221, 222. Namely, the third distance d4 may be fall in the range of 2t to 10t, preferably 3t to 8t, where t is a width of the second or third light source 221, 222. If the widths of the second and third light sources 221 and 222 are different from each other, then the third distance d4 may be equal to or greater than the sum of these two widths, and equal to or less than ten times the one of the widths.

According to the invention, the width of the light source(s) is advantageously used to allocate the light sources on the substrate because it affects the number of light sources (e.g., LED packages, chips, etc.) that are needed to be provided on a fixed area. By using the width of the light source to determine how closely the light sources may be positioned with each other, the invention can efficiently optimize the effects of the light sources while minimizing the number of light sources used per area of a certain size. Hence, the third distance d4 corresponding to a horizontal distance between the light emitting part of the second light source 221 and the light emitting part of the third light source 222 may be reduced, and a reduction of the luminance in an area between the second light source 221 and the third light source 222 may be prevented.

Accordingly, in the backlight unit according to the embodiment of the invention, the luminance may be prevented from being non-uniform between the first light source 220 and the third light source 222 or between the second light source 221 and the third light source 222. As a result, the backlight unit may provide light having the uniform luminance.

Figure 45:
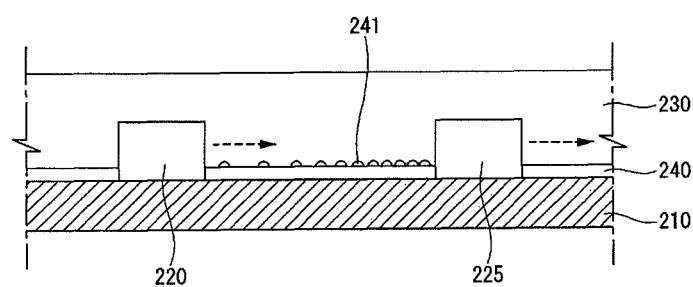
FIGS. 45 and 46 illustrate a structure of a reflection layer of a backlight unit according to an eighth exemplary configuration of the invention.
Figure 46:
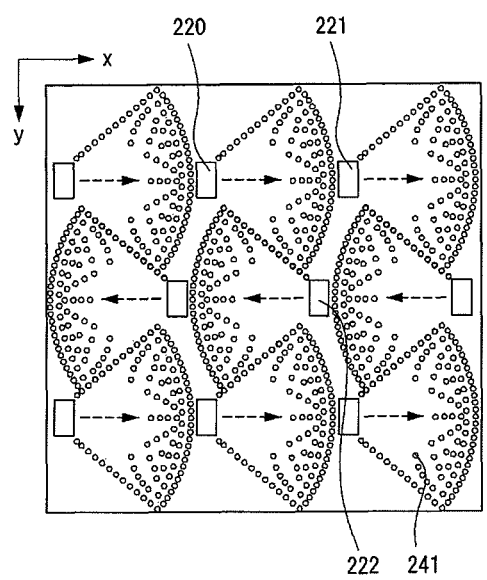

FIGS. 45 and 46 illustrate an eighth exemplary configuration of the backlight unit according to the exemplary embodiment of the invention. Structures and components identical or equivalent to those described in the first to seventh exemplary configurations may be designated with the same reference numerals in the eighth exemplary configuration, and a further description may be briefly made or may be entirely omitted.

As shown in FIG. 45, the backlight unit according to the embodiment of the invention may further include a plurality of diffusion patterns 241 that allow light emitted from the light source 220 on the reflection layer 240 to easily travel to a light source 225 adjacent to the light source 220. The plurality of diffusion patterns 241 may diffuse or refract light emitted from the light source 220.

More specifically, as shown in FIG. 46, the backlight unit 200 according to the embodiment of the invention may further include two or more light sources, each of which emits light in a different direction. For example, the backlight unit 200 may include the first light source 220 and the second light source 221 that emit light in a direction parallel to the x-axis direction (i.e., in a lateral direction). The backlight unit 200 may further include the third light source 222 that is arranged in a direction parallel to the x-axis direction, in which the first light source 220 is arranged, and emits light in the opposite direction of the light emitting direction of the first light source 220. For instance, lines on which the first and second light sources 220 and 221 are arranged and lines on which the third light source 222 is arranged may be arranged to be parallel to each other or to cross one another.

Accordingly, because the light emitting direction of the first and second light sources 220 and 221 is opposite to the light emitting direction of the third light source 222 in the embodiment of the invention, an increase or a reduction in the luminance of light in a predetermined area of the backlight unit 200 may be prevented.

In other words, because even if the light emitting directions of at least two light sources (for example, the light sources 220, 221, and 222) are different from each other, the diffusion patterns 241 are formed between the at least two light sources, the diffusion patterns 241 may diffuse or refract light emitted from the at least two light sources. Hence, the plurality of diffusion patterns 241 may allow the backlight unit 200 to provide light with the uniform luminance.

The diffusion patterns 241 may contain at least one of metal and metal oxide that are a reflection material. For example, the diffusion patterns 241 may contain metal or metal oxide having a high reflectance, such as aluminum (Al), silver (Ag), gold (Au), and titanium dioxide ($TiO_2$). In this case, the diffusion patterns 241 may be formed by depositing or coating the metal or the metal oxide on the substrate 210 or by printing a metal ink on the substrate 210. The deposition method may use a heat deposition method, an evaporation method, or a vacuum deposition method such as a sputtering method. The coating method or the printing method may use a gravure coating method or a silk screen method.

Further, the diffusion patterns 241 may have a color having a high brightness, for example, a color close to white so as to improve a reflection or refraction effect of the diffusion patterns 241.

The diffusion patterns 241 may include a plurality of dots formed of the above material. For example, the diffusion patterns 241 may include a plurality of dots having a circle plane shape, an oval plane shape, or a polygon plane shape.

A density of the diffusion patterns 241 may increase as the diffusion patterns 241 extend from one light source to another light source adjacent to the one light source. For example, a density of the diffusion patterns 241 may increase as the diffusion patterns 241 extend from the first light source 220 to the second light source 221. Hence, a reduction in the luminance of light emitted upward from an area distant from the first light source 220 (e.g., an area around a back surface of the second light source 221) may be prevented. As a result, the luminance of light provided by the backlight unit 200 may be uniformized.

For example, a distance between the two adjacent diffusion patterns 241 each including the dots may increase as the diffusion patterns 241 extend from the light emitting part of the first light source 220 towards the second light source 221. Hence, while light emitted from the first light source 220 travels to the second light source 221, the light is diffused or refracted. As a result, the luminance of the light may be uniformized.

In particular, the diffusion patterns 241 may hardly exist in an area immediately adjacent to a light emitting surface of each of the light sources 220, 221, and 222. Hence, the light emitted from the light sources 220, 221, and 222 is totally reflected by the reflection layer 240 in a non-formation area of the diffusion patterns 241 to travel and is diffused or refracted in a formation area of the diffusion patterns 241. As a result, the luminance of light in the entire area of the backlight unit including the area adjacent to the light sources 220, 221, and 222 may be uniformized.

The third light source 222 is diagonally positioned across the first light source 220 in the light emitting direction of the first light source 220, and the plurality of diffusion patterns 241 may be disposed on a diagonal line between the first light source 220 and the third light source 222 in a line. Because the first and third light sources 220 and 222 emit light in the opposite directions, the luminance of light may increase in an area where light emitted from the first light source 220 and light emitted from the third light source 222 may overlap each other. However, the plurality of diffusion patterns 241 disposed on the diagonal line between the first light source 220 and the third light source 222 may prevent an increase in the luminance of light in the overlapping area of light.

Accordingly, as shown in FIG. 46, a plane shape of the diffusion patterns 241 disposed in the light emitting direction of the first light source 220 may be symmetrical to a plane shape of the diffusion patterns 241 disposed in the light emitting direction of the third light source 222. For example, the plane shape of the diffusion patterns 241 disposed in the light emitting direction of the first light source 220 and the plane shape of the diffusion patterns 241 disposed in the light emitting direction of the third light source 222 may be a fan shape.

The fan-shaped diffusion patterns 241 are disposed considering that an orientation angle of light emitted from the light source is about 120° to efficiently transfer and diffuse the light emitted from the light source. Hence, the entire luminance of light provided by the backlight unit may be uniformized.

FIGS. 47 to 50 illustrate a method of arranging the light sources of the backlight unit according to an exemplary embodiment of the invention. Hereinafter, a description of the elements which have been described above in detail is omitted for simplicity. For example, a description of the resin layer, the optical sheet, the reflection layer, etc. is omitted.

Figure 47:
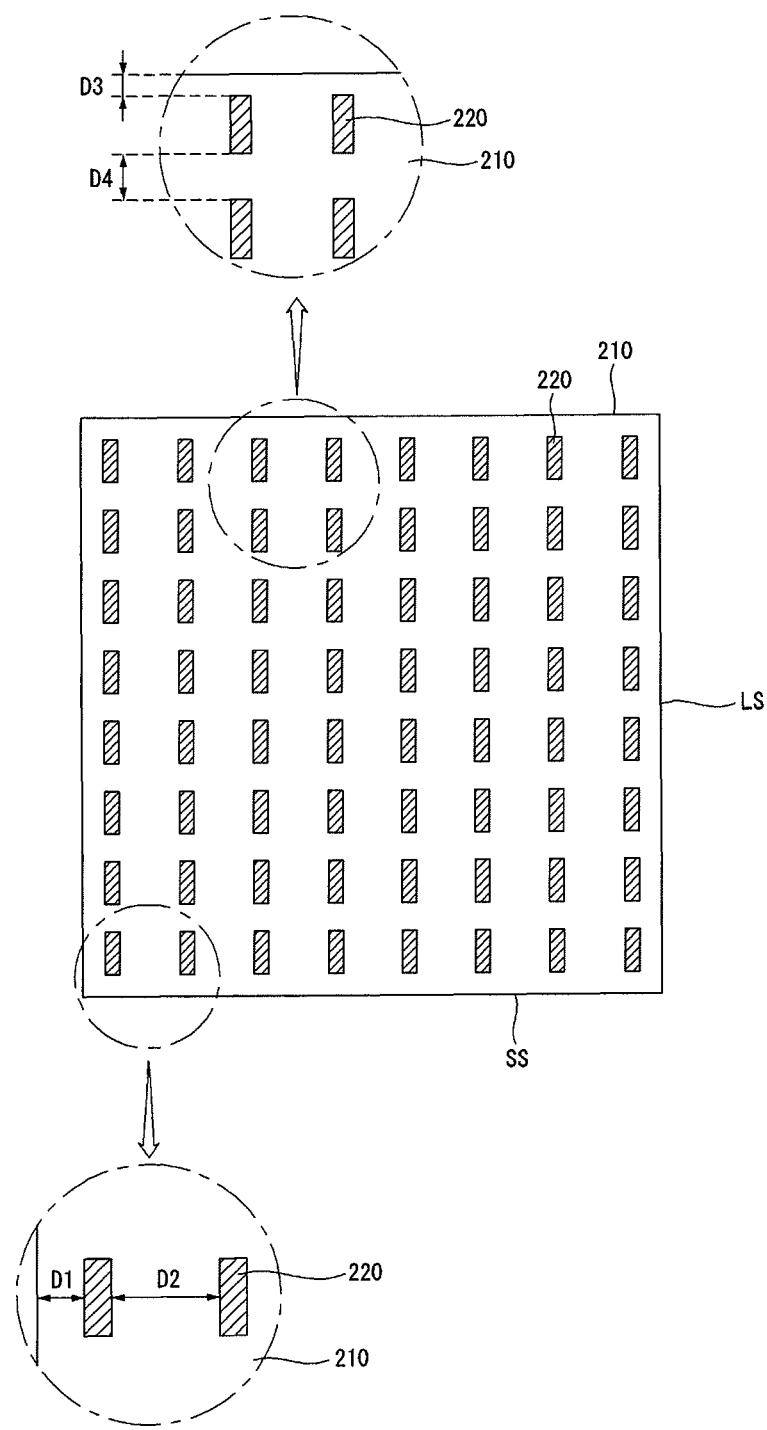
FIGS. 47 to 50 illustrate examples of an arrangement of the light sources of the backlight unit according to an exemplary embodiment of the invention.

As shown in FIG. 47, a light source 220 outermost disposed, from among the plurality of light sources 220 arranged in the substrate 210, preferably may be disposed close to the edge of the substrate 210.

For example, a distance D3 between the outermost light source 220 close to an edge of a short side SS of the substrate 210, from among the plurality of light sources 220, and the short side SS of the substrate 210 may be smaller than a distance D4 between the outermost light source 220 and a light source 220 adjacent to the outermost light source 220, from among the plurality of light sources 220. In other words, the distance D3 between the light source 220 outermost disposed in a direction parallel to a long side LS of the substrate 210, from among the plurality of light sources 220, and an edge (the short side SS) of the substrate 210 may be smaller than the distance D4 between the outermost light source 220 and a light source 220 adjacent to the outermost light source 220, from among the plurality of light sources 220.

Further, a distance D1 between a light source 220 outermost disposed close to a long side LS of the substrate 210, from among the plurality of light sources 220, and an edge of the long side LS of the substrate 210 may be smaller than a distance D2 between the outermost light source 220 and a light source 220 adjacent to the outermost light source 220, from among the plurality of light sources 220. In other words, the distance D1 between the light source 220 outermost disposed in a direction parallel to the short side SS of the substrate 210, from among the plurality of light sources 220, and an edge (the long side LS) of the substrate 210 may be smaller than the distance D2 between the outermost light source 220 and a light source 220 adjacent to the outermost light source 220. For instance, the invention provides D3<D4 and/or D1<D2 in order to provide a more uniform light emission throughout the entire substrate 210. For instance, where the light sources are adjacent to each other, the light illuminated regions may overlap and thus provide sufficient light illuminations, whereas at the edges of the substrate 210, less illuminations may be provided due to the lack of multiple light sources nearby. As a result, the invention arranges the light sources close to the edges of the substrate to minimize such areas where less illuminations are provided.

Figure 48:
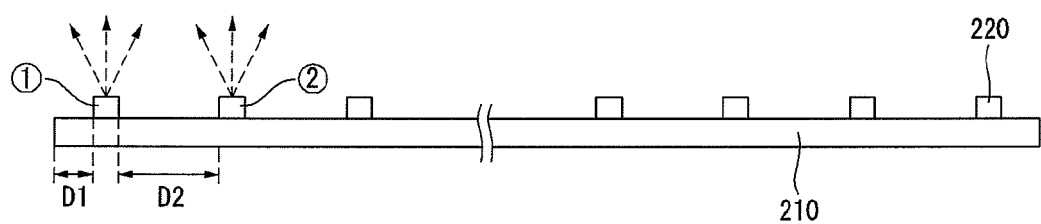

FIG. 48 shows an example of a method in which the light emitting part of a light source 220 is oriented in a direction vertical to the substrate 210 (i.e., a top-view method in which the light source 220 emits light in the direction vertical to the substrate 210). In the top-view method of FIG. 48, it is assumed that a light source 220 disposed on the outermost side of the substrate 210 is a first light source ① and a light source 220 adjacent to the first light source ① is a second light source ②.

In the case in which a distance D1 between the first light source ① and the edge of the substrate 210 is smaller than a distance D2 between the first light source ① and the second light source ② as in the example of FIG. 48, light emitted by the first light source ① may sufficiently reach the edge of the substrate 210. Accordingly, the size of a bezel area may be reduced.

Figure 49:
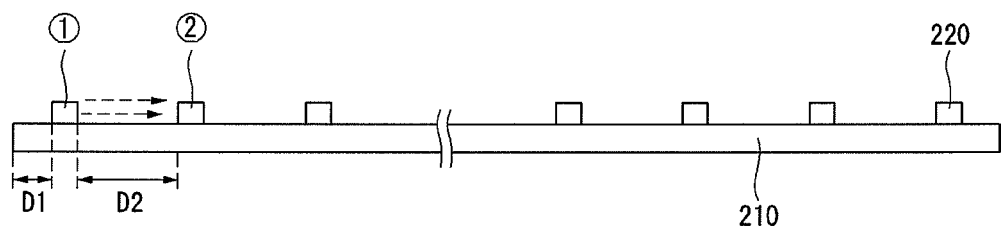

FIG. 49 shows an example of a method in which the light emitting part of a light source 220 is oriented in a direction parallel to the substrate 210 (i.e., a side-view method in which the light source 220 emits light in the direction parallel to the substrate 210). In the side-view method of FIG. 49, it is assumed that a light source 220 disposed on the outermost side of the substrate 210 is a first light source ① and a light source 220 adjacent to the first light source ① is a second light source ②.

In the case in which a distance D1 between the first light source ① and the edge of the substrate 210 is smaller than a distance D2 between the first light source ① and the second light source ② as in the example of FIG. 49, the size of a bezel area not contributing the display of an image may be reduced.

As described above with reference to FIGS. 48 to 49, both in the case in which the light sources 220 are arranged according to the top-view method and the case in which the light sources 220 are arranged according to the side-view method, the size of a bezel area may be reduced.

Figure 50:
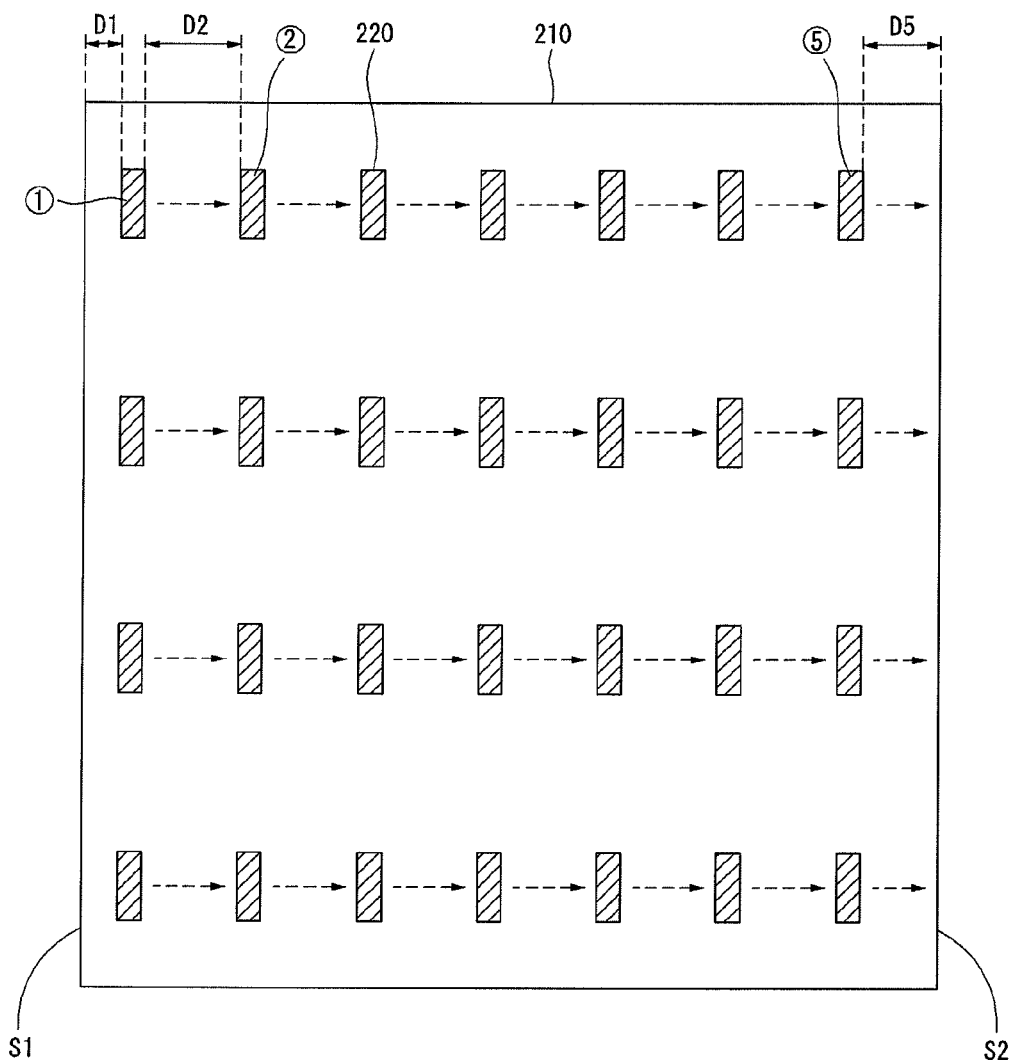

As shown in an example of FIG. 50, each of distances D1 and D5 between each of light sources 220 arranged at the edges on both sides, from among the plurality of light sources 220 arranged in parallel, and the edge of the substrate 210 may be smaller than the distance D2 between two neighboring light sources 220, from among the plurality of light sources 220.

For example, it is assumed that the substrate 210 is arranged such that the plurality of light sources 220 emit light in a direction from a first side S1 of the substrate 210 towards a second side S2 thereof as shown in FIG. 50.

In such a case, the distance D1 between the edge of the first side S1 of the substrate 210 and the first light source ① disposed close to the first side S1 of the substrate 210 may be smaller than the distance D2 between the first light source ① and the second light source ②. Further, the distance D5 between the edge of the second side S2 of the substrate 210 and a fifth light source ⑤ disposed close to the second side S2 of the substrate 210 may be smaller than the distance D2 between the first light source ① and the second light source ②.

Further, the first light source ① emits light in a direction in which it becomes more distant from the edge of the substrate 210 adjacent thereto (i.e., a direction in which the first light source ① is disposed toward the second light source ②, and the fifth light source ⑤ emits light in a direction in which it is disposed toward the edge of the substrate 210 adjacent thereto (i.e., a direction in which the fifth light source ⑤ becomes more distant from the second light source ②). Accordingly, the distance D1 between the first light source ① and the edge of the substrate 210 adjacent thereto can be equal to, but preferably may be smaller than, the distance D5 between the fifth light source ⑤ and the edge of the substrate 210 adjacent thereto.

FIGS. 51 to 56 illustrate another method of arranging the light sources of the backlight unit according to the exemplary embodiment of the invention.

Figure 51:
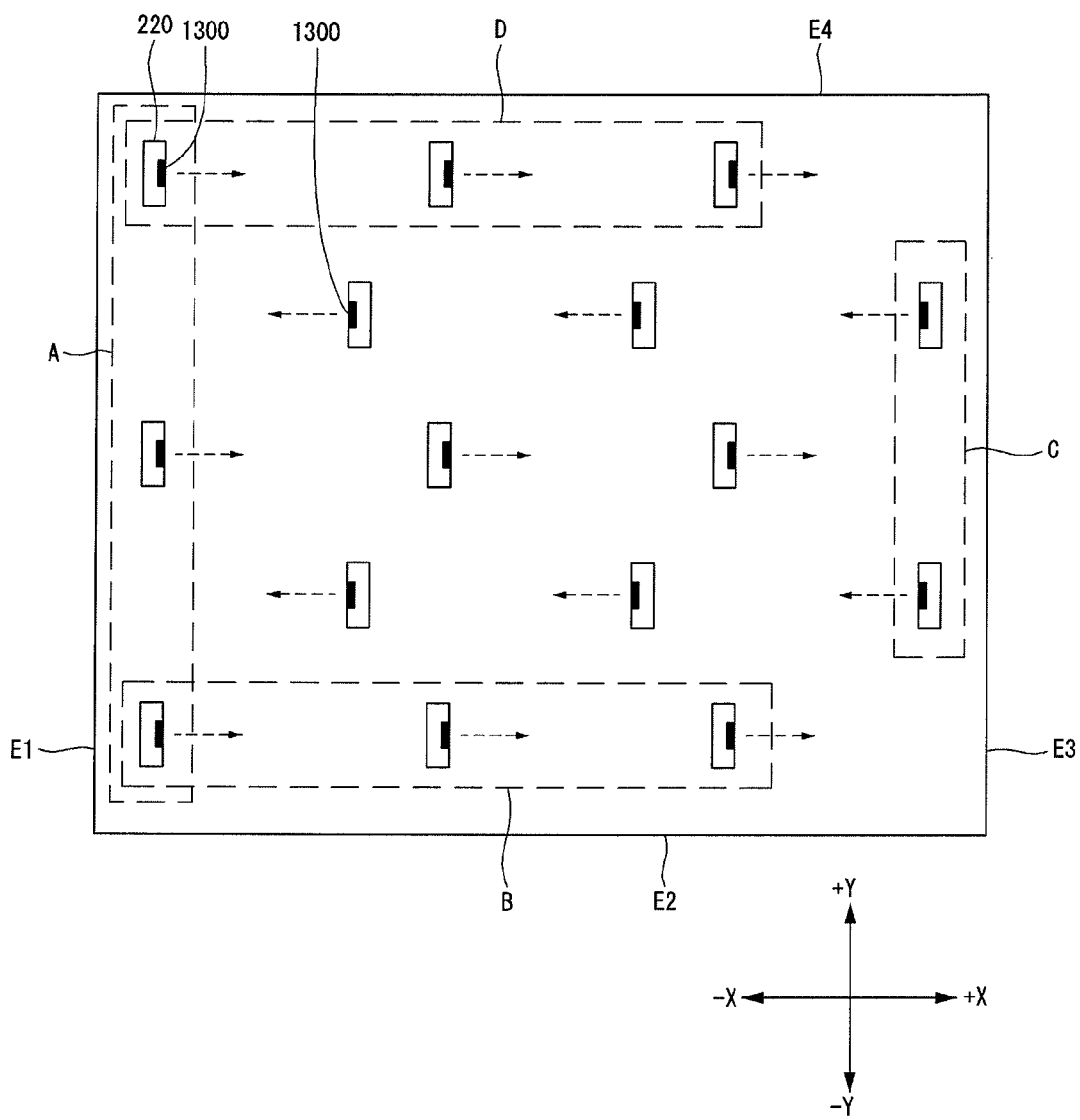
FIGS. 51 to 56 illustrate examples of an arrangement of the light sources of the backlight unit according to an exemplary embodiment of the invention.

As shown in FIG. 51, at least one of the plurality of light sources 220 arranged on the substrate 210 may emit light in a direction different from a direction in which the remaining light sources 220 emit light. For example, at least one of the plurality of light sources 220 may emit light in the left direction (e.g., −X direction) of the substrate 210, and at least one of the remaining light sources 220 may emit light in the right direction (e.g., +X direction) of the substrate 210. The light emitting direction of the light source 220 is not limited to the example shown in FIG. 51.

For example, at least one of the plurality of light sources 220 may laterally emit light in a direction parallel to the +X direction, and at least one of the remaining light sources 220 may laterally emit light in a direction parallel to the −X direction. Further, the light source 220, emitting light in the direction parallel to the +X direction, and the light source 220, emitting light in the direction parallel to the −X direction, may be arranged to be adjacent to each other in the Y-axis direction. That is, as shown in FIG. 51, two specific light sources 220 of the plurality of light sources 220 may be arranged to be adjacent to each other in a diagonal direction. In FIG. 51, a direction in which the light emitting part 1300 (e.g., LED) of the light source 220 is emits light is indicated by an arrow.

Further, as shown in FIG. 51, the plurality of light sources 220 may be arranged to form two or more rows, and two or more light sources 220 arranged in the same row may emit light in the same direction.

If two specific light sources 220 of the plurality of light sources 220 are arranged to have different light emitting directions as described above, a phenomenon in which the luminance of light is concentrated or weakened in a specific area of the backlight unit 200 may be reduced, and so the luminance of light emitted from the backlight unit 200 may become uniform.

Meanwhile, in the case in which two specific light sources 220 are arranged to have different light emitting directions as described above, the outermost light sources 220 may also have different light emitting directions.

For example, as shown in FIG. 51, the outermost light sources 220 (indicated by A) adjacent to a first edge E1 of the substrate 210 may emit light in a direction toward a third edge E3 of the substrate 210, and the outermost light sources 220 (indicated by C) adjacent to the third edge E3 of the substrate 210 may emit light in a direction toward the first edge E1 of the substrate 210.

On the other hand, the outermost light sources 220 (indicated by B and D) adjacent to the second edge E2 and the fourth edge E4 of the substrate 210 may emit light in a direction toward the third edge E3 of the substrate 210.

Here, the first edge E1 and the third edge E3 of the substrate 210 may face each other, and the second edge E2 and the fourth edge E4 may also face each other.

Further, the light sources 220 (indicated by A) and the light sources 220 (indicated by C), outermost disposed in the light emitting direction, may emit light in a direction in which they become more distant from the respective edges E1 and E3 of the substrate 210 adjacent thereto. In such a case, light efficiency may be improved.

In the case in which the outermost light sources 220 (indicated by A) adjacent to the first edge E1 of the substrate 210 emit light toward the third edge E3 of the substrate 210 and the outermost light sources 220 (indicated by C) adjacent to the third edge E3 of the substrate 210 emit light toward the first edge E1 of the substrate 210, light emitted by the outermost light sources 220 (indicated by A and C) may be sufficiently used for an image display. Accordingly, light efficiency may be improved.

In the case in which the light sources 220 emitting light in different directions as described above are arranged in the substrate 210, a distance between the edge of the substrate 210 and the light source 220 outermost disposed may be smaller than a distance between the outermost light source 220 and a light source 220 adjacent to the outermost light source 220.

Figure 52:
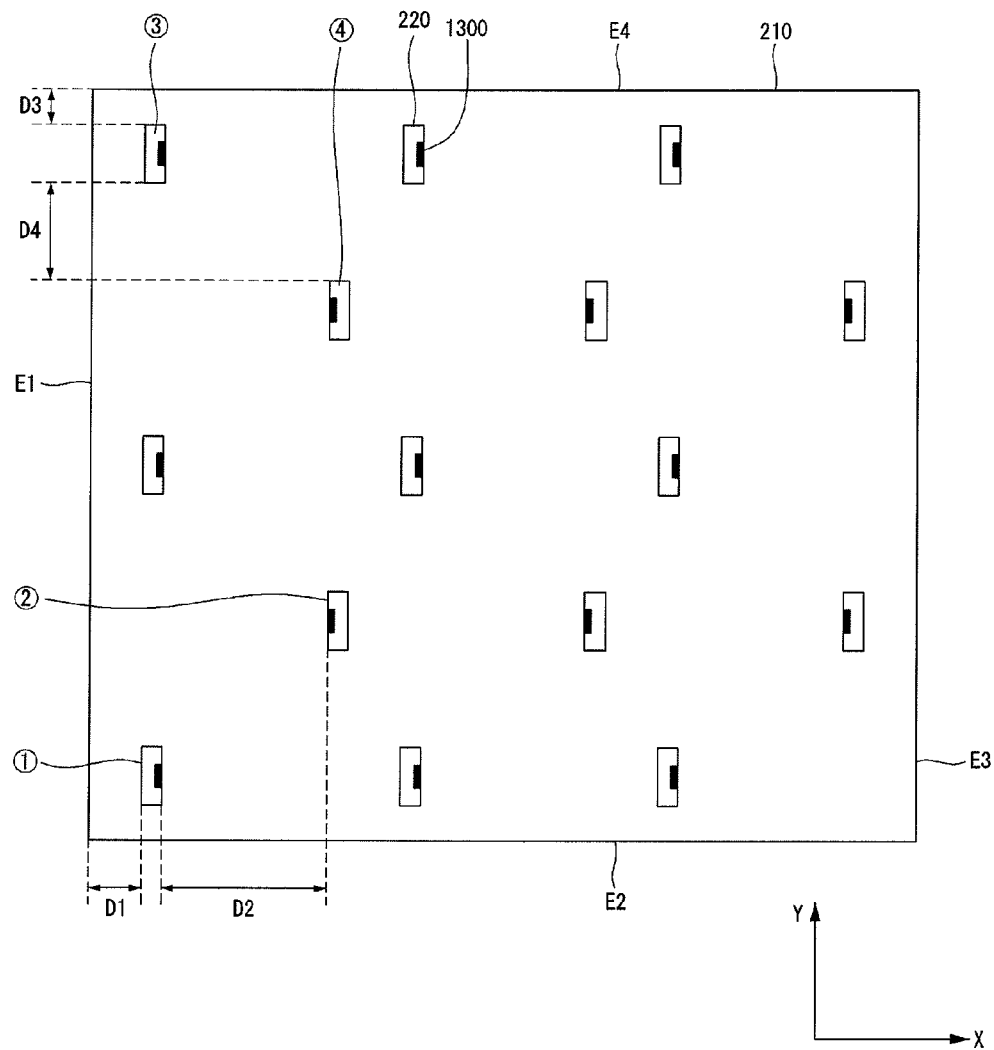

For example, as shown in FIG. 52, it is assumed that a first light source ① is disposed close to a first edge E1, a second light source ② is disposed close to the first light source ①, a third light source ③ is disposed close to a fourth edge E4 adjacent to the first edge E1, and a fourth light source ④ is disposed close to the third light source ③.

In such a case, a distance D1 between the first light source ① and the first edge E1 of the substrate 210 in a horizontal direction (i.e., an X-axis direction) of the substrate 210 may be smaller than a distance D2 between the first light source ① and the second light source ②. Further, a distance D3 between the third light source ③ and the fourth edge E4 of the substrate 210 in a vertical direction (i.e., a Y-axis direction) of the substrate 210 may be smaller than a distance D4 between the third light source ③ and the fourth light source ④.

Figure 53:
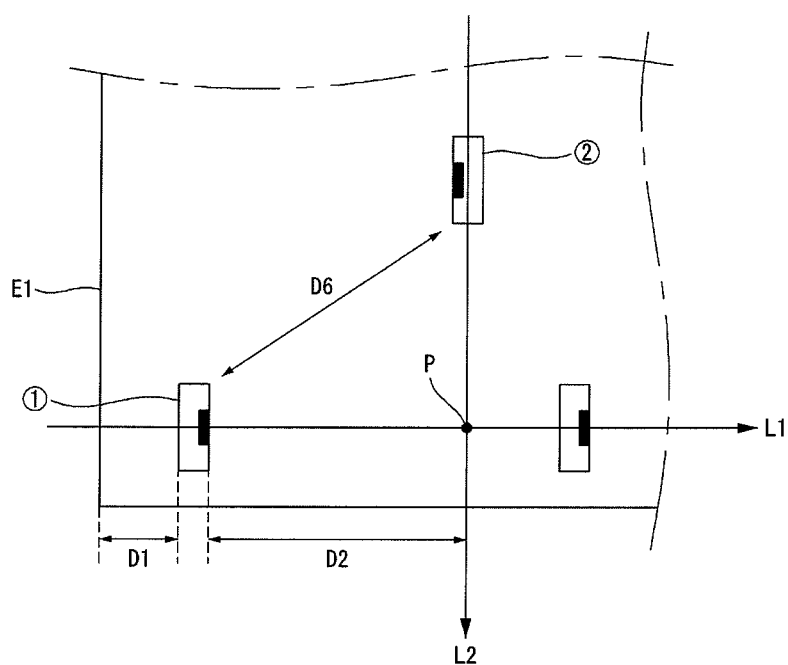

In other words, assuming that a straight line, vertical to an edge (i.e., the first edge E1) of the substrate 210 and passing through the first light source ①, is referred to as a first straight line L1 and a straight line, parallel to the edge (i.e., the first edge E1) of the substrate 210 and passing through the second light source ②, is referred to as a second straight line L2 as in the example of FIG. 53, the shortest distance D1 between the first light source ① and the edge (i.e., the first edge E1) of the substrate 210 may be smaller than the distance D2 between the first light source ① and a point P at which the first straight line L1 meets the second straight line L2. This is because the lines of the first light source ① and the second light source ② are arranged to intersect each other. Further, the shortest distance D1 between the first light source ① and the edge (i.e., the first edge E1) of the substrate 210 may also be smaller than a straight line distance D6 between the first light source ① and the second light source ②. Here, the distance D6 may be measured to be the distance between the middle points of the light emitting surfaces of the first and second light sources ① and ②.

Here, a direction in which the light emitting part 1300 of the first light source ① is oriented and a direction in which the light emitting part 1300 of the second light source ② is are different from each other. The light emitting part 1300 of the second light source ② preferably may be disposed to face the edge (i.e., the first edge E1) of the substrate 210, and the direction in which the light emitting part 1300 of the first light source ① is oriented preferably may be opposite to the direction in which the light emitting part 1300 of the second light source ② is oriented.

In other words, the distance D2 in a direction parallel to a light emitting direction between two neighboring light sources 220 emitting light in opposite directions is larger than the distance D1 between the outermost light source 220 and the edge of the substrate 210 adjacent thereto. As a variation, the distance D2 may be a shortest distance between lines extending from the light emitting surfaces of the first and second light sources ① and ②, or can be the distance as shown in FIG. 53.

Further, as shown in FIG. 52, the distance D1 between the first light source ① and the first edge E1 of the substrate 210 in the horizontal direction (i.e. the X-axis direction) of the substrate 210 may be different from the distance D3 between the third light source ③ and the fourth edge E4 of the substrate 210 in the vertical direction (i.e., the Y-axis direction) of the substrate 210.

Figure 54:
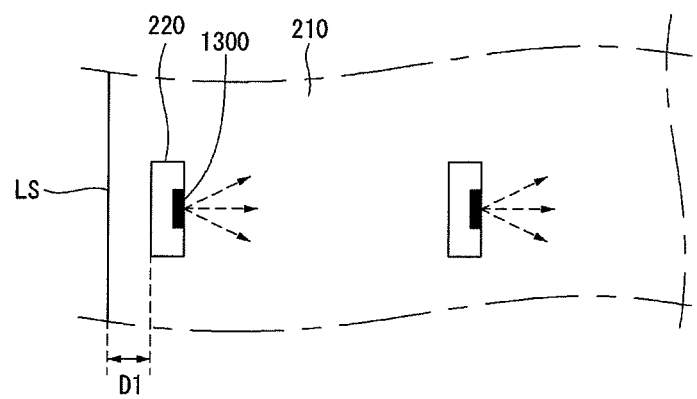
Figure 54:
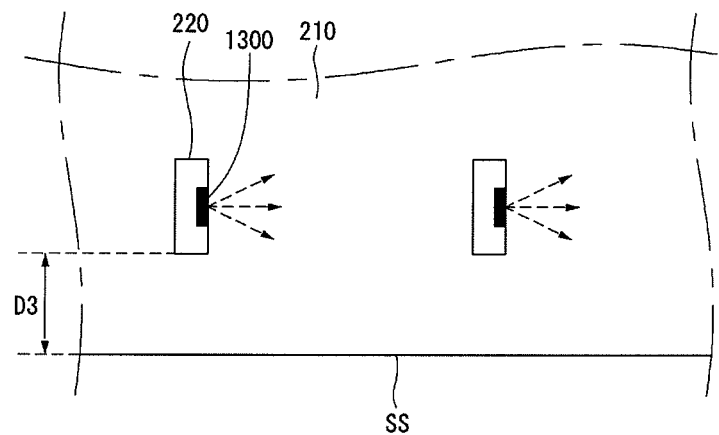

For example, as shown in (a) and (b) of FIG. 54, in the case in which the light emitting surface of the light source 220 emits light in a direction parallel to a short side SS of the substrate 210, a distance D1 between a long side LS of the substrate 210 and a light source 220, disposed close to the long side LS of the substrate 210 in the direction parallel to the short side SS of the substrate 210, may be equal to, but preferably be smaller than, a distance D3 between the short side SS of the substrate 210 and a light source 220 disposed close to the short side SS of the substrate 210.

Since the light source 220 emits light in the direction parallel to the short side SS of the substrate 210, part of light emitted by the light source 220 disposed close to the short side SS of the substrate 210 may reach the short side SS of the substrate 210. Accordingly, even in the case in which the distance D3 between the short side SS of the substrate 210 and the light source 220 disposed close to the short side SS of the substrate 210 is relatively large, the size of a bezel area may be sufficiently small.

On the other hand, since the light source 220 adjacent to the long side LS of the substrate 210 emits light in a direction in which it becomes distant from the long side LS of the substrate 210, the intensity of light reaching the long side LS of the substrate 210 may be relatively weak. Accordingly, to prevent the size of a bezel area from excessively increasing, the distance D1 between the long side LS of the substrate 210 and the light source 220, disposed close to the long side LS of the substrate 210 in the direction parallel to the short side SS of the substrate 210, preferably may be smaller than the distance D3 between the short side SS of the substrate 210 and the light source 220 disposed close to the short side SS of the substrate 210.

Figure 55:
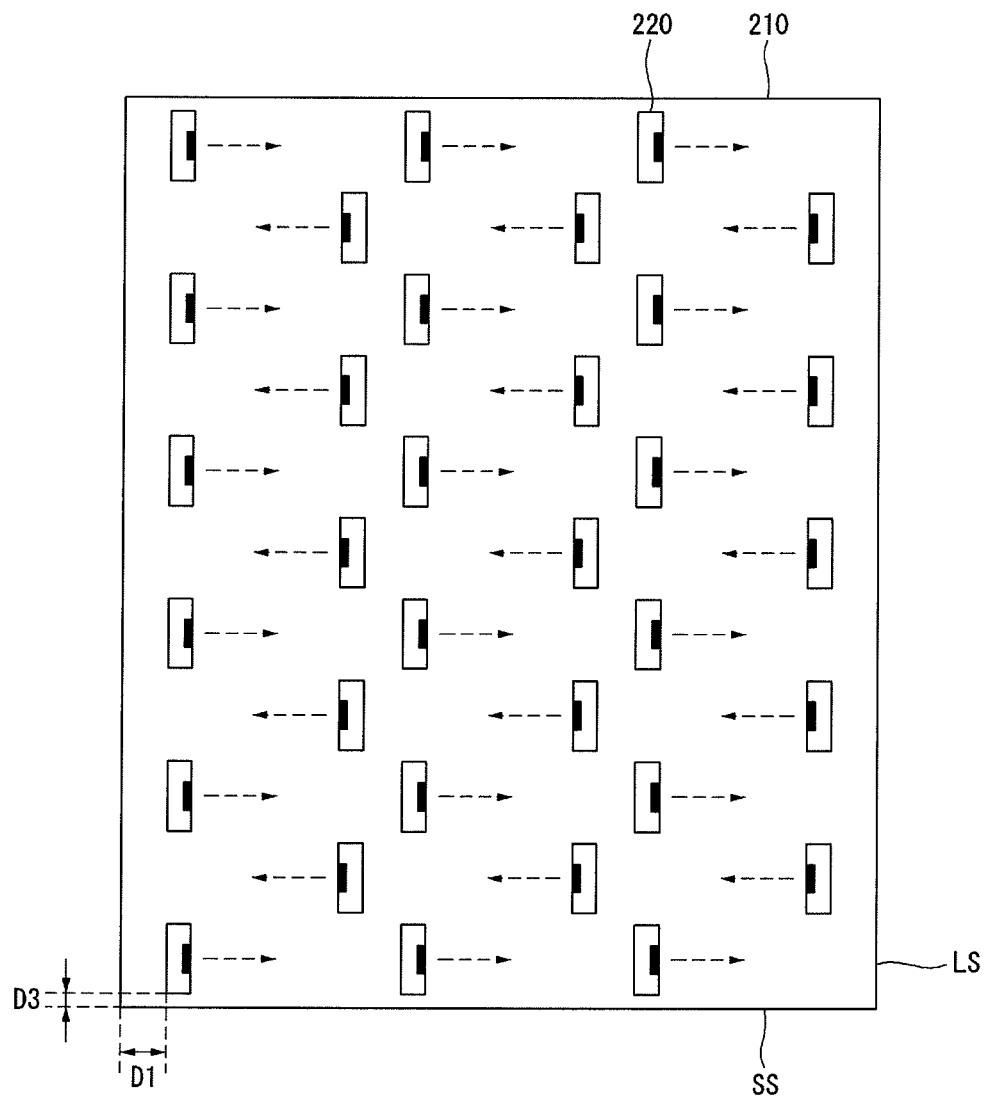

As another example, in the case in which a light source 220 emits light in a direction parallel to a short side SS of the substrate 210 as shown in FIG. 55, a distance D1 between a long side LS of the substrate 210 and a light source 220 disposed at the corner of the substrate 210 may be larger than a distance D3 between the short side LS of the substrate 210 and the light source 220 disposed at the corner of the substrate 210.

Meanwhile, the plurality of light sources 220 preferably may be arranged in a direction in which light emitting parts 1300 are oriented or emit light toward a direction parallel to the short side SS of the substrate 210. Further, the light emitting parts 1300 of light sources 220 adjacent to the long side LS of the substrate 210, from among the plurality of light sources 220, preferably may be arranged to emit light toward a direction in which they become distant from the long side LS of the substrate 210.

Figure 56:
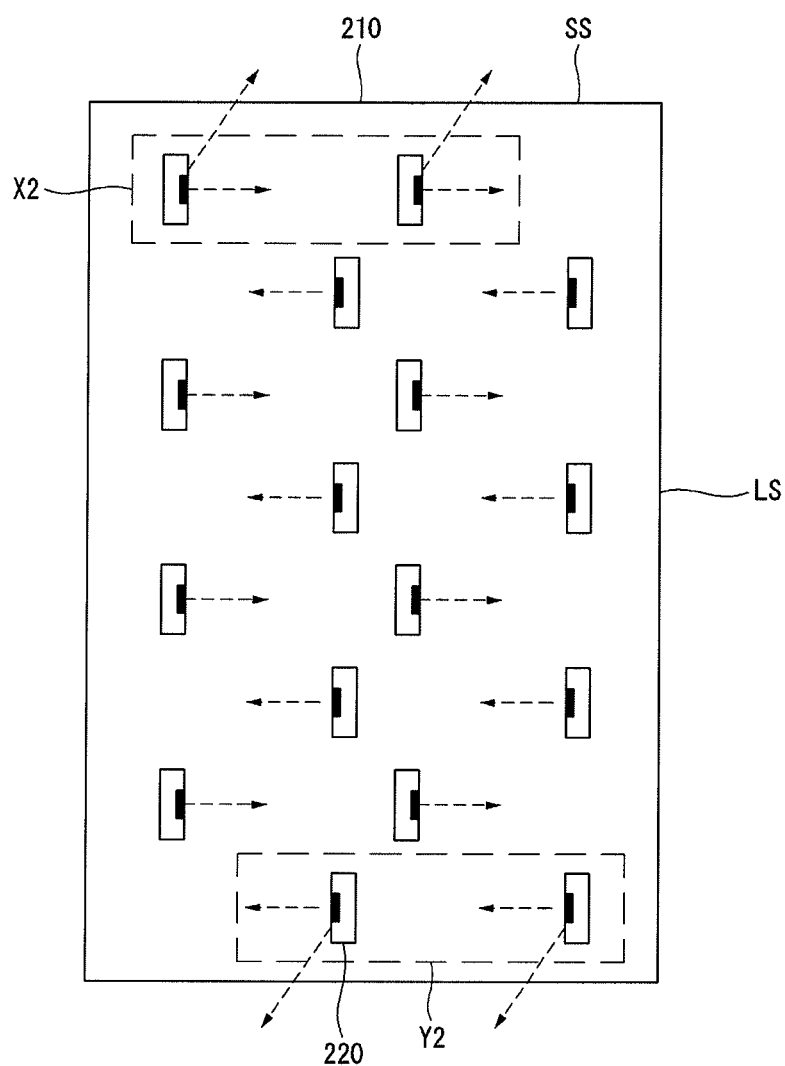

For example, as in the example of FIG. 56, light sources 220 (indicated by X2 and Y2) arranged along the short side SS of the substrate 210 may emit light in the direction parallel to the short side SS of the substrate 210.

If, as in the example of FIG. 56, the light sources 220 (indicated by X2 and Y2) arranged along the short side SS of the substrate 210 are arranged to emit light in the direction parallel to the short side SS of the substrate 210, the number of light sources 220, emitting light in a direction in which the light is deviated from the area of the substrate 210, may be reduced. Accordingly, light efficiency may be improved.

Figure 57:
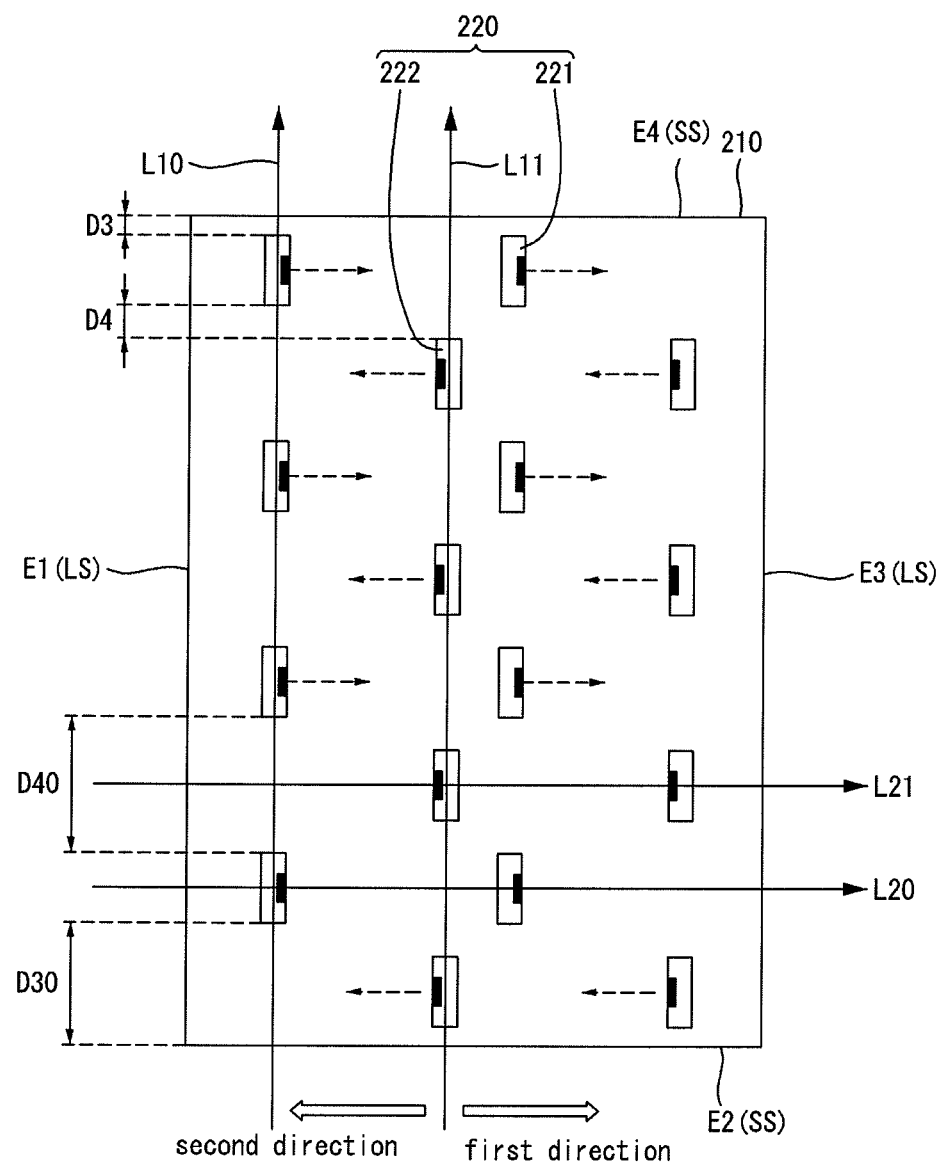
FIGS. 57 and 58 illustrate examples of the number of light sources on the substrate according to an embodiment of the invention.
Figure 58:
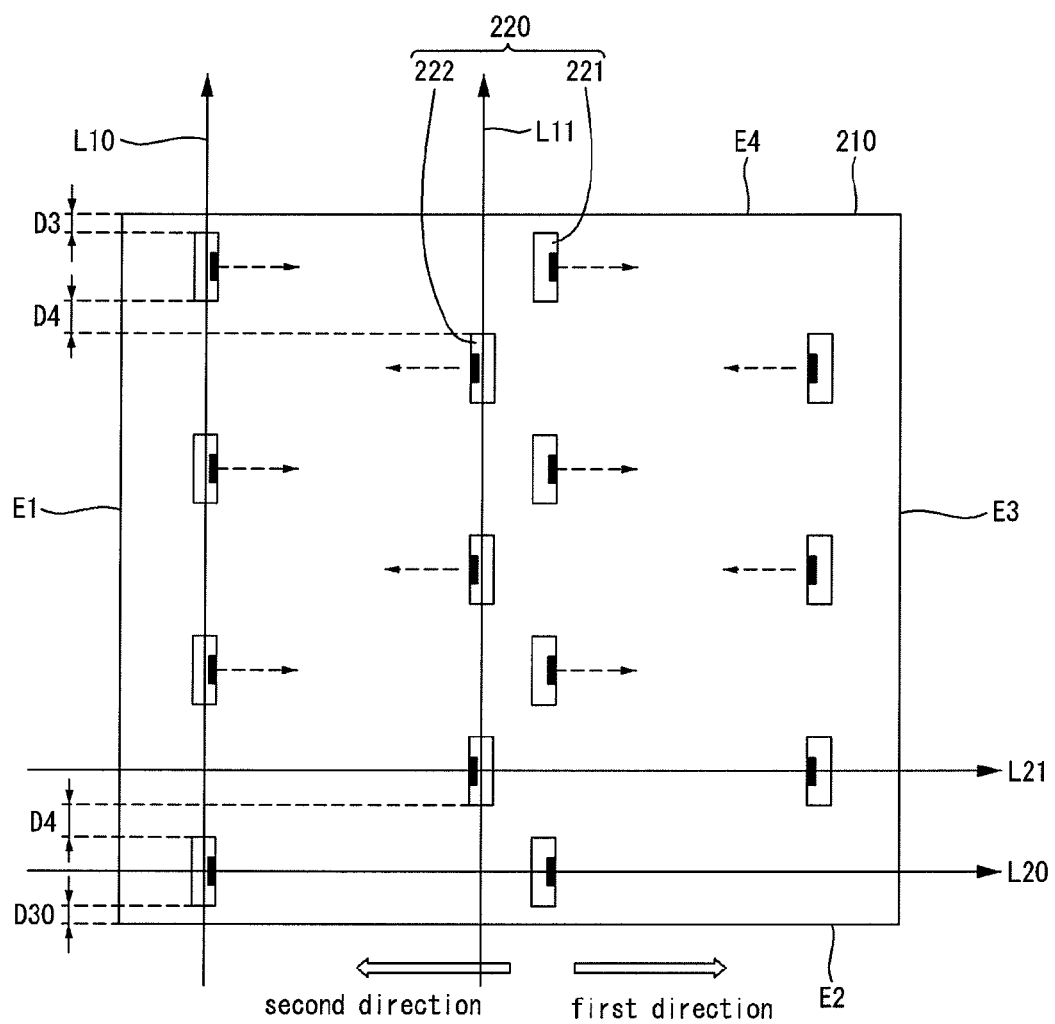

FIGS. 57 and 58 illustrate examples of a number of light sources on the substrate 210. Hereinafter, a description of the elements which have been described above in detail is omitted for simplicity.

As shown in FIG. 57, the plurality of light sources 220 arranged in one substrate 210 may include first light sources 221, emitting light in a first direction, and second light sources 222 emitting light in a second direction opposite to the first direction. For instance, the lines of the first light sources 221 and second light sources 222 may be alternatingly disposed. Further, the number of first light sources 221 may be the same as the number of second light sources 222. For example, the number of first light sources 221 arranged on a tenth straight line L10 may be the same as the number of second light sources 222 arranged on an eleventh straight line L11. Here, the tenth straight line L10 and the eleventh straight line L11 may be parallel to a long side LS of the substrate 210. Further, the number of first light sources 221 arranged on a twentieth straight line L20 may be the same as the number of second light sources 222 arranged on a twenty-first straight line L21. Here, the twentieth straight line L20 and the twenty-first straight line L21 may be parallel to a short side SS of the substrate 210.

In such a case, distances between light sources 220 disposed at respective edges on both sides, among the plurality of light sources 220 arranged in parallel, and the respective edges of the substrate 210 adjacent thereto may be different from each other.

For example, as shown in FIG. 57, a distance D3 between a fourth edge E4 of the substrate 210 and a light source 220 adjacent to the fourth edge E4 of the substrate 210, among the plurality of light sources 220 arranged on the tenth straight line L10, may be different from a distance D30 between a second edge E2 of the substrate 210 and a light source 220 adjacent to the second edge E2 of the substrate 210, among the plurality of light sources 220 arranged on the tenth straight line L10. The distance D30 preferably may be larger than the distance D3. Further, the distance D3 between the fourth edge E4 of the substrate 210 and the light source 220 adjacent to the fourth edge E4 of the substrate 210, among the plurality of light sources 220 arranged on the tenth straight line L10, may be smaller than a distance D4 between two light sources 220 neighboring each other in a direction parallel to a light emitting direction.

Here, the light sources 220 along the line L20 are not outermost light sources 220, and thus the distance D30 may be larger than the distance D4. Further, the distance D30 between the second edge E2 of the substrate 210 and the light source 220 adjacent to the second edge E2 of the substrate 210 may be smaller than a distance D40 between two light sources 220 neighboring each other on the tenth straight line L10.

As another example, as shown in FIG. 58, the number of first light sources 221 may be different from the number of second light sources 222. For example, the number of first light sources 221 arranged on a tenth straight line L10 may be different from the number of second light sources 222 arranged on an eleventh straight line L11. Meanwhile, the number of first light sources 221 arranged on a twentieth straight line L20 may be the same as the number of second light sources 222 arranged on a twenty-first straight line L21.

In such a case, distances between light sources 220 disposed at respective edges on both sides, among the plurality of light sources 220 arranged in parallel, and the respective edges of the substrate 210 adjacent thereto may be substantially the same.

Further, as shown in FIG. 58, a distance D3 between a fourth edge E4 of the substrate 210 and light sources 220 adjacent to the fourth edge E4, among the plurality of light sources 220 arranged on the tenth straight line L10, may be smaller than a distance D4 between two light sources 220 neighboring each other in a direction parallel to a light emitting direction. Further, a distance D30 between a second edge E2 of the substrate 210 and light sources 220 adjacent to the second edge E2, among the plurality of light sources 220 arranged on the tenth straight line L10, may also be smaller than the distance D4 between two light sources 220 neighboring each other in the direction parallel to the light emitting direction.

FIGS. 59 to 73 illustrate examples of a backlight unit and a local dimming method and a method of arranging the light sources in accordance with the local dimming method according to embodiments of the invention. Hereinafter, a description of the elements which have been described above in detail is omitted for simplicity. For example, the light sources 220 described hereinafter may be arranged in the side-view type or the top-view type.

Figure 59:
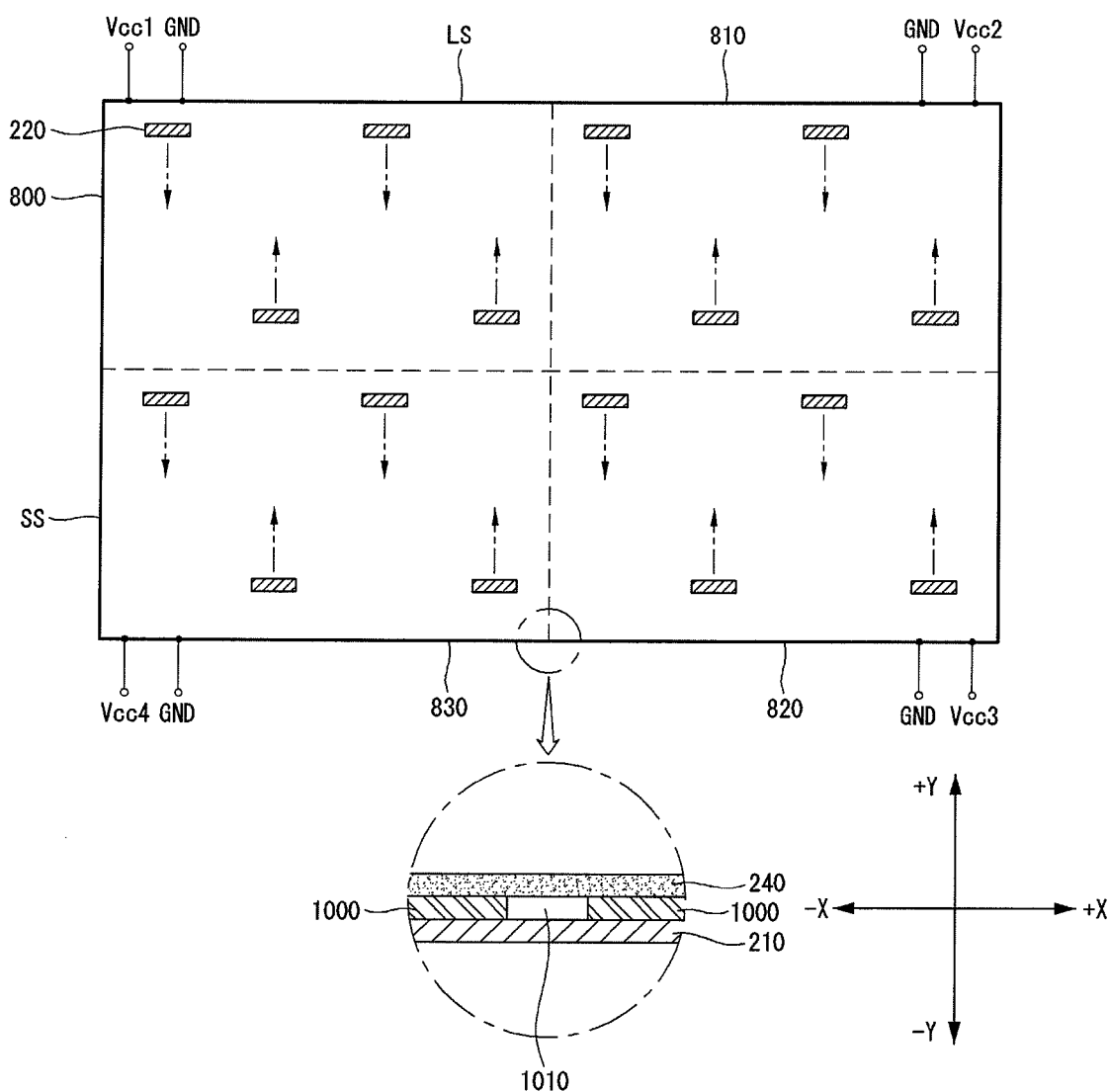
FIGS. 59 to 73 illustrate examples of a local dimming method and a method for arranging the light sources in accordance with the local dimming method according to an embodiment of the invention.

As shown in FIG. 59, the substrate 210 may include a plurality of blocks (light generating blocks) 800 to 830. Here, each of the blocks 800 to 830 may include the plurality of light sources 220. For instance, the substrate 210 may be classified into the plurality of blocks 800 to 830 each including the plurality of light sources 220. Further, each of the blocks 800 to 830 may be electrically driven independently so that any one or more blocks 800 to 830 can be selectively and independently operated and controlled. For instance, in the case in which the substrate 210 is classified into the plurality of blocks 800 to 830, a local dimming driving method may be used. For instance, any one or more blocks 800 to 830 can be selectively and independently turned on/off, or controlled to generate different light intensity for dimming or brightening effects.

In the local dimming driving method, at least one of the plurality of blocks 800 to 830 may be selectively turned off/on. For example, the first block 800 and the third block 820, among the plurality of blocks 800 to 830, may be turned on, while the fourth block 830 of the plurality of blocks 800 to 830 may be turned off. Accordingly, current consumption may be reduced, and the driving efficiency of the backlight unit may be improved. Further, since a dark image may become darker, the contract characteristic of an image may be improved, and the image quality may be improved.

For the purpose of local dimming driving, a driving voltage Vcc may be supplied to each of the blocks 800 to 830. The blocks 800 to 830 include respective Vcc terminals Vcc1 to Vcc4 and respective GND terminals. Since the blocks 800 to 830 may be individually and independently driven as described above, where each of the blocks 800 to 830 may be called a unit block.

Although FIG. 59 is illustrated to include a total of four blocks 800 to 830 in one substrate 210, the number of blocks included in one substrate 210 may be changed. That is, any number of blocks may be provided on one substrate 210 where such blocks can be independently driven. Further, the blocks 800 to 830 may be arranged in an N×M matrix form. Here, the number of N and M may be changed in various ways.

To divide the substrate 210 into the plurality of blocks 800 to 830, a groove 1010 may be formed between the neighboring blocks 800 to 830.

More particularly, an electrode pattern 1000 for supplying the driving voltage to the light sources 220 may be formed in the substrate 210. A reflection layer 240 may be formed on the electrode pattern 1000. Further, the electrode patterns 1000 of the respective blocks 800 to 830 may be electrically split (or insulated) by the groove 1010. That is, the blocks 800 to 830 may be independently driven because the electrode patterns 1000 are split or electrically insulated by the groove 1010. In this configuration, the blocks 800 to 830 are divided by the groove 1010. Further, although not shown, an adhesive layer may be formed in the groove 1010.

Further, the light emitting part of at least one of the plurality of light sources 220 arranged in the substrate 210 may have a different direction from the light emitting part of at least one of the remaining light sources 220. Accordingly, at least one of the plurality of light sources 220 arranged in the substrate 210 may emit light in a direction different from a direction in which at least one of the remaining light sources 220 emits light. The light sources 220, emitting light in different directions, preferably may be arranged in one of the blocks 800 to 830. For example, in one of the blocks 800 to 830, the light emitting part of at least one of the plurality of light sources 220 may emit light in a +Y-axis direction, and the light emitting part of at least one of the remaining light sources 220 may be oriented in a −Y-axis direction of the substrate 210 and it may emit light in the −Y-axis direction. The light emitting direction of the light source 220 is not limited to the example shown in FIG. 59.

Further, the light source 220 having the light emitting part oriented in the +Y-axis direction and the light source 220 having the light emitting part oriented in the −Y-axis direction may be disposed close to each other in an X-axis direction.

Figure 60:
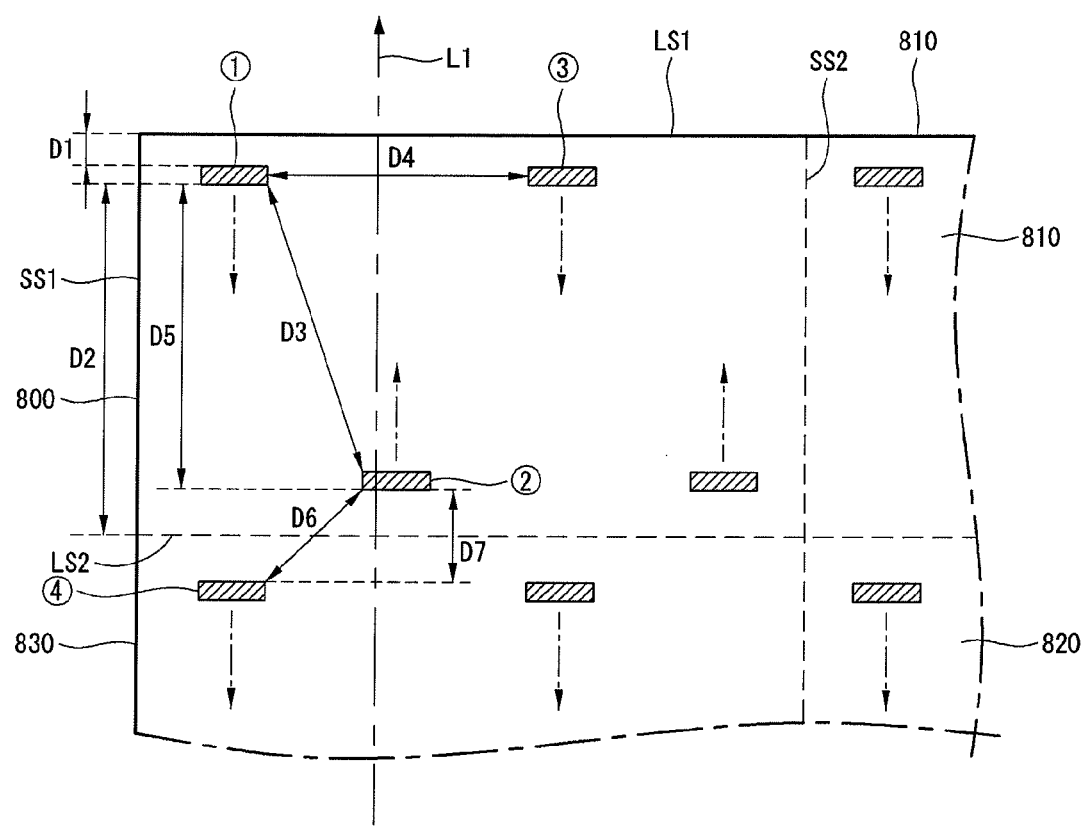

For example, as shown in FIG. 60, two light sources 220 emitting light in different directions may be disposed close to each other in an oblique direction to the light emitting direction of the light source 220. In FIGS. 59 and 60 (and other figures), a light emitting direction of the light source 220 is indicated by an arrow. Here, the light emitting direction is a direction in which the light emitting part of the light source 220 is oriented, e.g., the direction in which the light from the light emitting part of the light source 220 is emitted.

Further, as shown in FIG. 59, the plurality of light sources 220 may be arranged to form two or more rows. Two or more light sources 220 arranged in the same row may emit light in the same direction.

For example, referred to FIG. 60, a first light source ①and a third light source ③, among the plurality of light sources 220 arranged in a first block 800 of the substrate 210, may emit light in the same direction, and a second light source ② among the plurality of light sources 220 arranged in the first block 800 may emit light in a different direction from the first light source ①and the third light source ③. Further, the first light source ①and the third light source ③may be disposed close to each other in a direction to intersect the light emitting direction, and the second light source ②may be disposed in an oblique direction to the light emitting direction of the first light source ①and the third light source ③. Here, from a viewpoint of a direction vertical to the light emitting direction of the light source 220, it may be seen that the second light source ②is disposed between the first light source ①and the third light source ③. In other words, a first straight line L1, passing through the second light source ②and vertical/perpendicular to a long side LS1 of the first block 800, may pass through between the first light source ①and the third light source ③.

As described above, when two specific light sources 220 have different light emitting directions and the two light sources 220 emitting light in the different directions are arranged in parallel in the oblique direction, a phenomenon in which the luminance of light is concentrated or weakened in a specific area may be reduced, and so the luminance of light may become uniform. That is, the occurrence of a hot spot phenomenon may be prohibited.

Further, the light emitting directions of the first light source ①and the third light source ③may be oriented toward the second light source ②, and the light emitting direction of the second light source ②may be oriented toward the first light source ①and the third light source ③. Accordingly, a distance D4 between the first light source ①and the third light source ③, laterally arranged in parallel on the basis of their light emitting directions, may be relatively small. Further, a distance D5 between the first light source ①and the second light source ②, arranged to face each other on the basis of their light emitting directions, or a distance between the third light source ③and the second light source ②may be relatively large. Accordingly, the distance D5 may be larger than the distance D4. Alternatively, the distance D4 between the first light source ①and the third light source ③may be smaller than a straight line distance D3 between the first light source ①and the second light source ②.

Further, the plurality of light sources 220 included in each of the blocks 800 to 830 may emit light toward a central area of each of the blocks 800 to 830. For example, the light emitting parts of the plurality of light sources 220 in each of the blocks 800 to 830 may be oriented toward the central area of each of the blocks 800 to 830. Here, the central area of each of the blocks 800 to 830 does not refer to the center thereof, but may refer to an approximate middle area thereof.

More particularly, as shown in FIG. 60, the first light source ①, among the plurality of light sources 220 arranged in the first block 800, may be disposed close to the first long side LS1 of the first block 800 and the second light source ② thereof may be disposed close to a second long side LS2 of the first block 800 which faces the first long side LS1 of the first block 800, on the basis of a direction parallel to a direction in which the light emitting parts of the light sources 220 are oriented.

For example, a distance D1 between the first light source ①and the first long side LS1 of the first block 800 may be smaller than a distance D2 between the first light source ① and the second long side LS2 of the first block 800, on the basis of the direction parallel to the direction in which the light emitting parts of the light sources 220 are oriented. Further, a distance between the second light source ② and the first long side LS1 of the first block 800 may be larger than a distance between the second light source ② and the second long side LS2 of the first block 800, on the basis of the direction parallel to the direction in which the light emitting parts of the light sources 220 are oriented.

Here, the first long side LS1 of the first block 800 may be said to be an edge of the first block 800 adjacent to the first light source ① on the basis of a direction parallel to a direction in which the light emitting part of the first light source ① is oriented. Further, the second long side LS2 of the first block 800 may be said to be an edge of the first block 800 not adjacent to the first light source ① on the basis of the direction parallel to the direction in which the light emitting part of the first light source ① is oriented. Accordingly, the edge of the first block 800 adjacent to the first light source ① on the basis of the direction parallel to the direction in which the light emitting part of the first light source ① is oriented may refer to the first long side LS1 of the first block 800.

Further, the second long side LS2 of the first block 800 may be said to be an edge of the first block 800 adjacent to the second light source ② on the basis of a direction parallel to a direction in which the light emitting part of the second light source ② is oriented. Further, the first long side LS1 of the first block 800 may be said to be an edge of the first block 800 not adjacent to the second light source ② on the basis of the direction parallel to the direction in which the light emitting part of the second light source ② is oriented. Accordingly, the edge of the first block 800 adjacent to the second light source ② on the basis of the direction parallel to the direction in which the light emitting part of the second light source ② is oriented may refer to the second long side LS2 of the first block 800.

Under the above conditions, the first light source ① may emit light toward the second long side LS2, and the second light source ② may emit light toward the first long side LS1. That is, the first light source ① and the second light source ② emit light toward the central area of the first block 800.

As described above, when the plurality of light sources 220 arranged in each of the blocks 800 to 830 emit light toward the central area of each of the blocks 800 to 830, an independent driving of each of the blocks 800 to 830 may be improved when local dimming driving is performed. Accordingly, when local dimming driving is performed, the efficiency of local dimming driving may be improved.

Further, to improve the efficiency of local dimming driving, the light sources 220 adjacent to the edges of the blocks 800 to 830 preferably may be arranged to emit light in a direction in which they become more distant from the edges of the blocks 800 to 830. For example, the second light source ② may be arranged to emit light in a direction in which it becomes more distant from the second long side LS2 of the first block 800.

As described above, the light sources 220 adjacent to the edges of the blocks 800 to 830 emit light in the direction in which they become more distant from the edges of the blocks 800 to 830. Accordingly, although the shortest distance between the light sources 220 in two neighboring blocks of the blocks 800 to 830 is relatively small, the efficiency of local dimming driving may be sufficiently improved. The shortest distance between the light sources 220 in two neighboring blocks of the blocks 800 to 830 may be smaller than a distance between two neighboring light sources 220 within one of the blocks 800 to 830. For example, in FIG. 60, a distance D6 between the second light source ② of the first block 800, disposed close to the fourth block 830, and the fourth light source ④ of the fourth block 830, disposed close to the first block 800, or a distance D7 between the second light source ② of the first block 800 and the fourth light source ④ of the fourth block 830, disposed in a direction parallel to their light emitting directions, may be smaller than the distance D4 between the third light source ③ and the first light source ① within the first block 800 or the distances D3 and D5 between the first light source ① and the second light source ② within the first block 800.

Meanwhile, the light sources 220 adjacent to the edges of the blocks 800 to 830 emit light in the direction in which they become more distant from the edges of the blocks 800 to 830, which may be referred to that the light sources 220 emit light in a direction in which they become more distant from other neighboring blocks 800 to 830 at the border portion of the blocks 800 to 830.

For example, as in the example of FIG. 60, the first block 800 and the fourth block 830 may be adjacent to each other and extend in a direction parallel to the direction in which the light emitting parts of the light sources 220 in these blocks emit light. Further, light sources (i.e., the second light sources ②) adjacent to the fourth block 830, among the plurality of light sources 220 arranged in the first block 800, and light sources (i.e., the fourth light sources ④) adjacent to the first block 800, from among the plurality of light sources 220 arranged in the fourth block 830, may emit light in opposite directions. The second light sources ② preferably emit light in a direction in which they become more distant from the fourth block 830, and the fourth light sources ④ emit light in a direction in which they become more distant from the first block 800.

More particularly, as shown in FIG. 60, the distance between the fourth block 830 and the second light sources ②, among the plurality of light sources 220 arranged in the first block 800, is smaller than the distance D2 between the first light source ① and the fourth block 830 on the basis of a direction parallel to the direction in which the light emitting parts of the light sources 220 are oriented (e.g., emit light). Accordingly, light sources adjacent to the fourth block 830, among the second light sources ② and the first light sources ① arranged in the first block 800, may become the second light sources ②. Here, the second light sources ② may emit light in a direction in which they become distant from the fourth block 830, and the first light sources ① may emit light toward the fourth block 830. The first light sources ① are more distant from the fourth block 830 than the second light sources ②. Thus, although the first light sources ① emit light toward the fourth block 830, the efficiency of local dimming driving may be maintained at a sufficiently high level.

Meanwhile, in FIG. 60, the first long side LS1 and the first short side SS1 of the first block 800 may be said to be the edges of the substrate 210. On the other hand, the second long side LS2 of the first block 800 may be said to be a border portion of the first block 800 and the fourth block 830, and a second short side SS2 of the first block 800 may be said to be a border portion of the first block 800 and the second block 810.

In other words, from a viewpoint of the first block 800, all the first long side LS1, the second long side LS2, the first short side SS1, and the second short side SS2 may be said to be the edges of the first block 800. Further, from a viewpoint of the substrate 210, the first long side LS1 and the first short side SS1 of the first block 800 may be said to be the edges of the first block 800 or the edges of the substrate 210, but the second short side SS2 of the first block 800 is the border portion of the first block 800 and the second block 810 and the second long side LS2 thereof is the border portion of the first block 800 and the fourth block 830.

Accordingly, at the border portions of the blocks 800 to 830, the light sources 220 may be seen to emit light in a direction in which they become more distant from the border portions of the neighboring blocks 800 to 830.

Advantages of the present invention are described below with reference to FIGS. 61 to 62.

Figure 61:
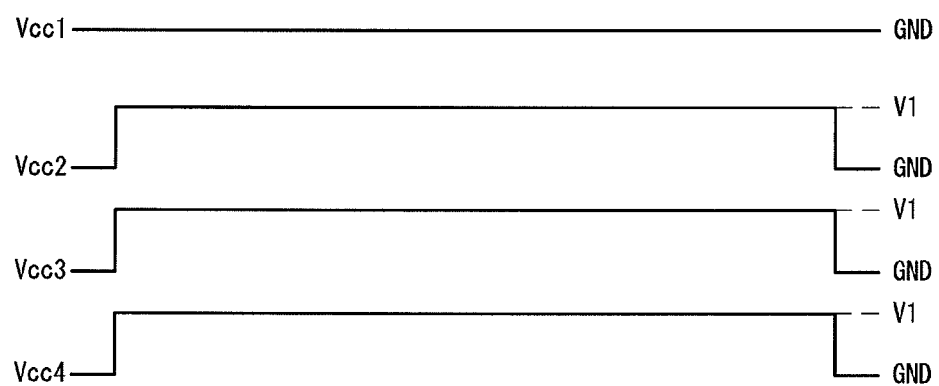
Figure 62:
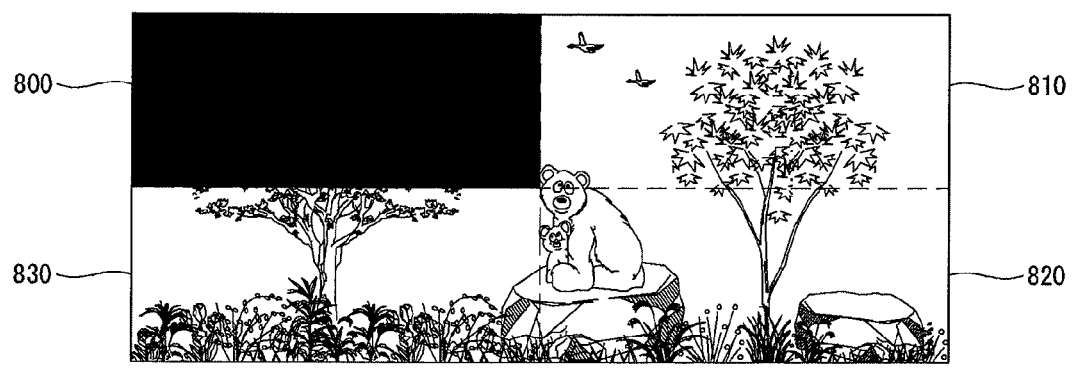

FIG. 61 shows an example of driving signals for local dimming, which may be used in the present invention. For example, as in the example of FIG. 59 or 60, in the case in which one substrate 210 is classified into the first, second, third, and fourth blocks, and the first block is turned off while the remaining second, third, and fourth blocks are turned on, the driving voltage Vcc1 supplied to the first block may be blocked, and the respective driving voltages Vcc2 to Vcc4 may be supplied to the second, third, and fourth blocks.

In this case, the light sources 220 arranged in the second, third, and fourth blocks may be turned on, while the light sources 220 arranged in the first block may be turned off. Accordingly, an image is displayed in an area on a display panel corresponding to the second, third, and fourth blocks, but is not displayed in an area on the display panel corresponding to the first block.

If a driving method, such as that shown in FIG. 61, is applied to the example of FIG. 59, the light sources 220 adjacent to the border portions of the blocks 800 to 830 emit light in a direction in which they become more distant from the border portions of the blocks 800 to 830. As in the example of FIG. 62, the luminance of an area on a display panel corresponding to a first area 800 may be substantially 0. Accordingly, while driving efficiency is improved, the contrast characteristic of an image may be improved according to such local dimming driving. Furthermore, the image quality may be enhanced.

Further, a plurality of the light sources 220 arranged in a specific block preferably may emit light in a direction parallel to short sides, among the edges of the corresponding block. For example, in the case in which one substrate 210 is classified into first, second, third, and fourth blocks 800 to 830 as in the example of FIG. 63, the plurality of light sources 220 arranged in the second block 810 may emit light in a direction parallel to a third short side SS3 or a fourth short side SS4 of the second block 810.

Here, the length of the third short side SS3 and the fourth short side SS4, among the edges of the second block 810, is shorter than the length of a third long side LS3 and a fourth long side LS4, among the edges of the second block 810.

Figure 63:
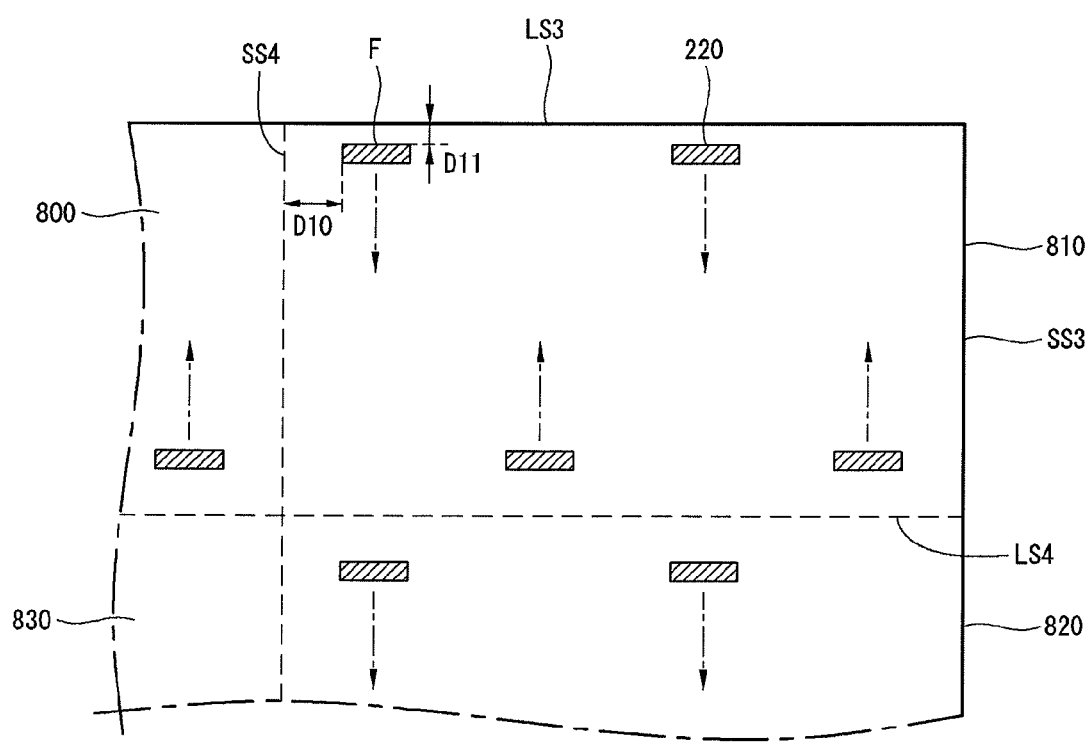
Figure 64:
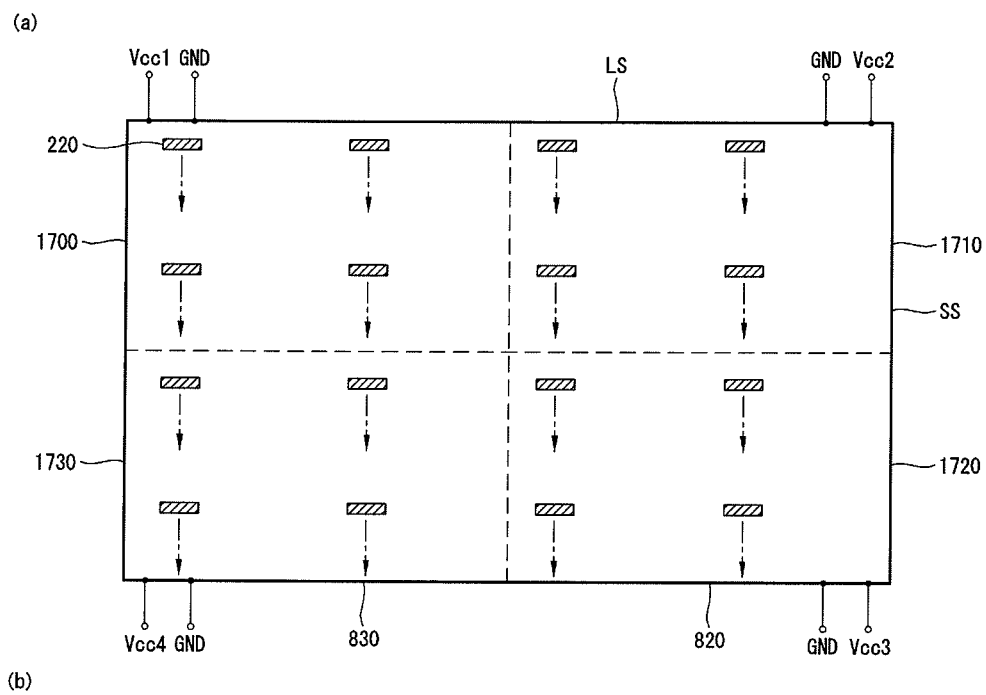
Figure 64:
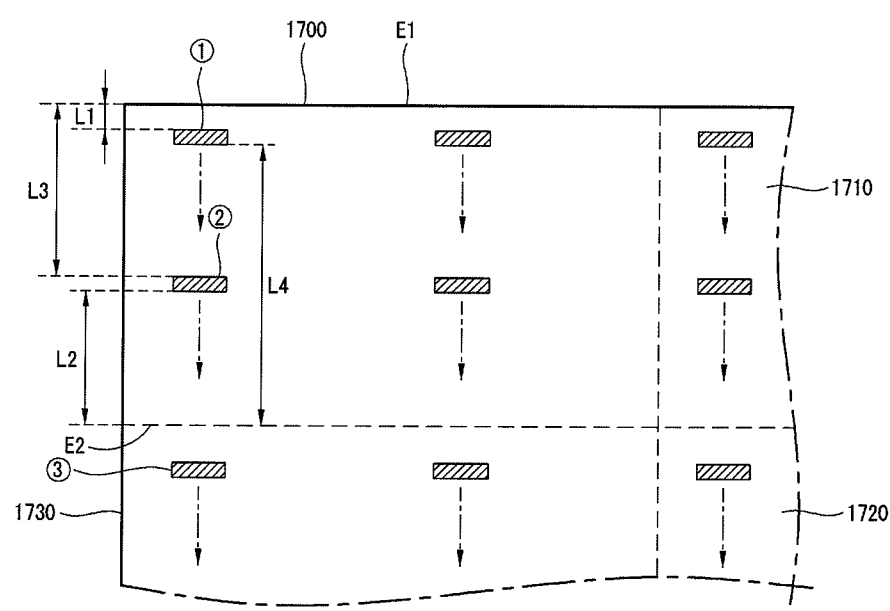

Further, a distance between the short sides of a block adjacent to a specific light source 220 may be different from a distance between the long sides of the corresponding block adjacent to the specific light source 220. For example, as shown in FIG. 63, a distance D10 between a short side (i.e., the fourth short side SS4) of the second block 810 and a light source F adjacent to the first block 800, among the plurality of light sources 220 arranged in the second block 810, is different from a distance D11 between a long side (i.e., the third long side LS3) of the second block 810 and the light source F adjacent to the first block 800. The distance D10 preferably is larger than the distance D11. The reason why the distance D10 is set to be larger than the distance D11 is described below. The light source F adjacent to the first block 800, among the plurality of light sources 220 arranged in the second block 810, emits light toward the fourth long side LS4 of the second block 810. Thus, although the length of the distance D11 is sufficiently small, a possibility that the light emitted by the light source F will invade other neighboring blocks is relatively low, but a possibility that the light emitted by the light source F will invade the neighboring first block 800 is relatively high. Accordingly, the distance D10 preferably is set larger than the distance D11.

In another embodiment, as in the example of FIG. 64(a), the light emitting parts of a plurality of the light sources 220 arranged in the substrate 210 may be arranged substantially in the same direction. In this case, the light emitting directions of the light sources 220 arranged in the substrate 210 may be substantially the same.

Even in this case, light sources 220 adjacent to the edges of blocks 1700 to 1730, which are selectively and independently drivable, preferably may emit light in a direction in which they become more distant from the edges of the blocks 1700 to 1730. Alternatively, the light emitting parts of the light sources 220 preferably may be arranged in a direction in which they become more distant from two neighboring border areas.

For example, as shown in FIG. 64(b), a distance L1 between first light sources ①, among a plurality of the light sources 220 arranged in the first block 1700 of the blocks 1700 to 1730, and a first edge E1 of the first block 1700 is smaller than a distance L4 between the first light sources ① and a second edge E2 facing the first edge E1 of the first block 1700. Here, the first light sources ① may emit light toward the second edge E2.

The first block 1700 may further include second light sources ② configured to emit light in the same direction as the first light sources ① and arranged in parallel to the light emitting direction of the first light sources ①. Here, the second light sources ② may be spaced apart from the second edge E2 by a distance L2 and from the first edge E1 by a distance L3 and may be arranged between the first light sources ① and the second edge E2 of the first block 1700. Further, each of the distances L2 and L3 is larger than the distance L1, and so the second light sources ② may not be said to be disposed close to a specific edge of the first block 1700. Accordingly, although the second light sources ② emit light toward the second edge E2, the efficiency of local dimming driving may be improved when the local dimming driving is performed.

Figure 65:
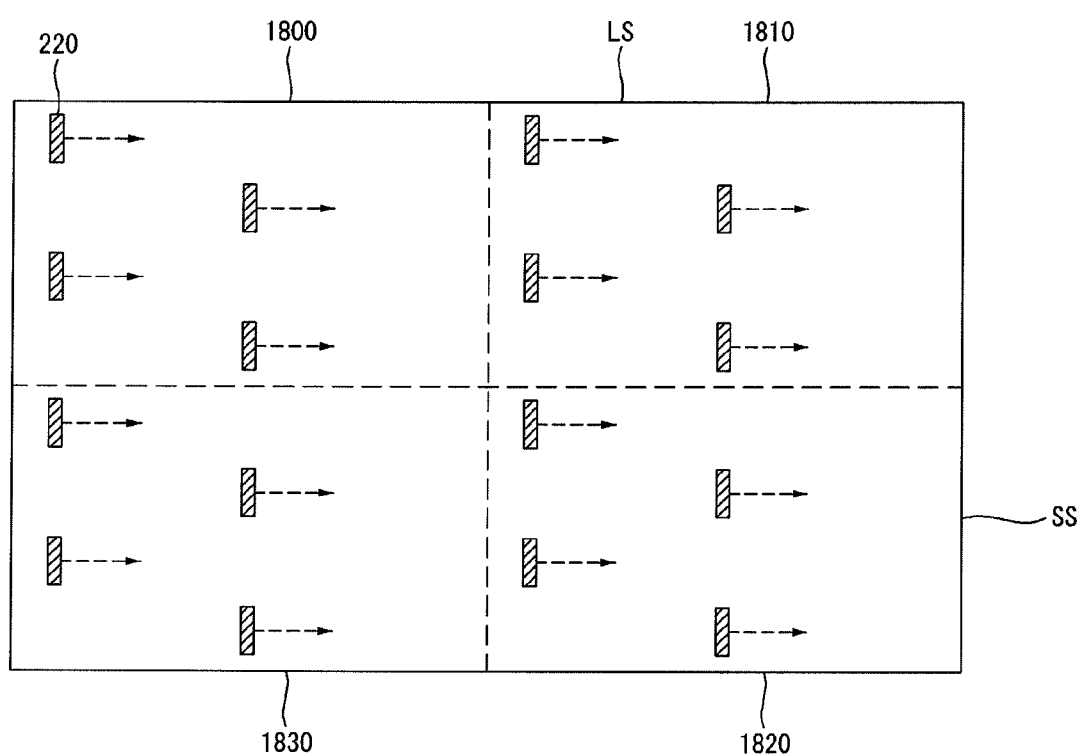

As shown in FIG. 65, the substrate 210 is classified into a plurality of blocks 1800 to 1830, a plurality of the light sources 220 arranged in each of the blocks 1800 to 1830 may emit light in the same direction, and two neighboring light sources of the plurality of the light sources 220 may be arranged in parallel in an oblique direction on the basis of their light emitting directions. Each of the blocks 1800 to 1830 can be selectively and independently driven, e.g., independently turned on/off or dimmed, etc.

Even in this case, the light sources 220 adjacent to edges of the blocks 1800 to 1830 preferably may emit light in a direction in which they become more distant from the edges of the blocks 1800 to 1830.

Further, as in the example of FIG. 65, the plurality of light sources 220 arranged in each of the blocks 1800 to 1830 may emit light in a direction parallel to the long side LS of each of the blocks 1800 to 1830.

Figure 66:
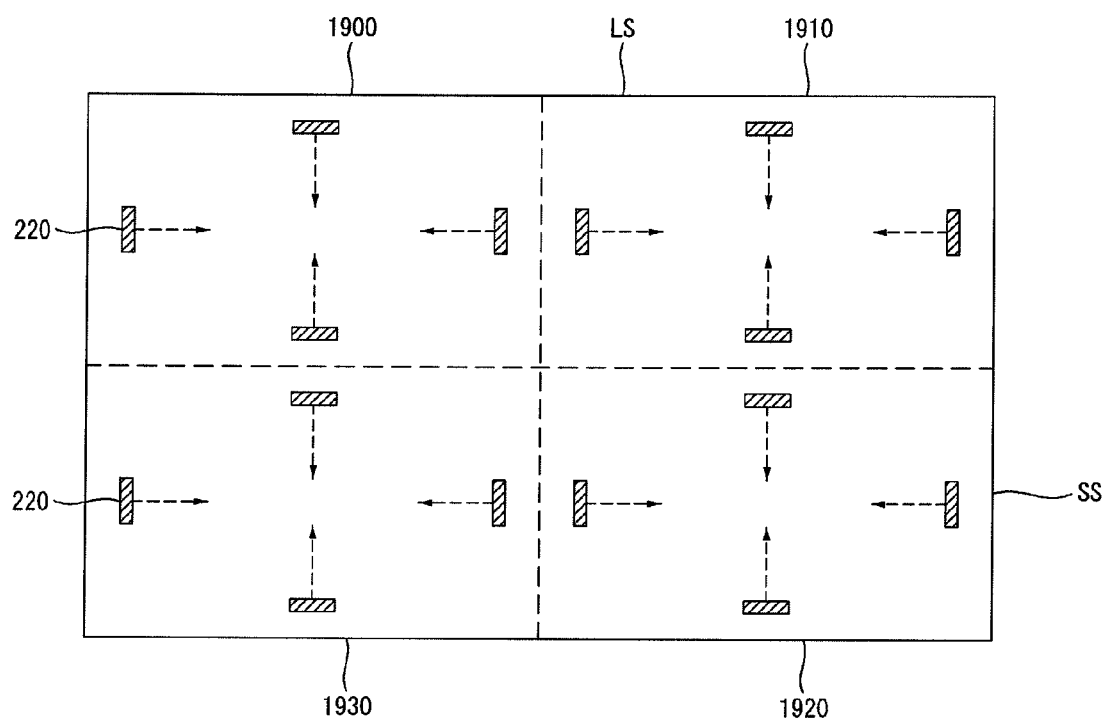

As another embodiment, as in the example of FIG. 66, the substrate 210 may be classified into a plurality of blocks 1900 to 1930, at least one of a plurality of the light sources 220 arranged in each of the blocks 1900 to 1930 may emit light in a first direction (e.g., a +X-axis direction), at least one of the light sources 220 arranged in each block may emit light in a second direction (e.g., a −X-axis direction) opposite to the first direction, at least one of the light sources 220 arranged in each block may emit light in a third direction (e.g., a +Y-axis direction) to intersect the first direction and the second direction, and at least one of the light sources 220 arranged in each block may emit light in a fourth direction (e.g., a −Y-axis direction) opposite to the third direction. Each of the blocks 1900 to 1930 can be selectively and independently driven.

Even in this case, the plurality of light sources 220 arranged in each of the blocks 1900 to 1930 may emit light toward the central area of each of the blocks 1900 to 1930. Further, the light sources 220 adjacent to the edges of the blocks 1900 to 1930 may emit light in a direction in which they become more distant from the edges or border portions of the blocks 1900 to 1930.

Figure 67:
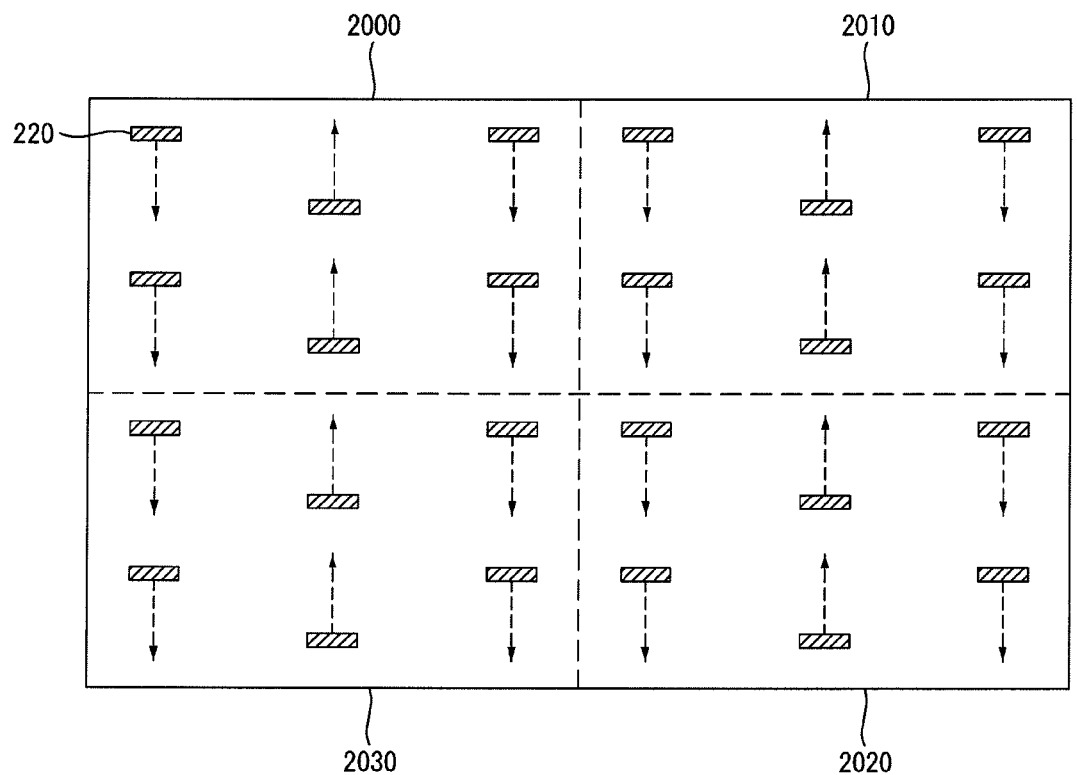

As shown in another example of FIG. 67, an arrangement pattern of the light sources 220 arranged in at least one of a plurality of blocks 2000 to 2030 included in the substrate 210 may be different from that of the light sources 220 arranged in at least one of the remaining blocks 2000 to 2030. For example, the light sources 220 of the first block 2000 and the fourth block 2030 may have substantially the same arrangement pattern, and the light sources 220 of the second block 2010 and the third block 2030 may have substantially the same arrangement pattern. Further, arrangement patterns of the light sources 220 of the first block 2000 and the fourth block 2030 may be different from that of the light sources 220 of the second block 2010 and the third block 2020. Each of the blocks 2000 to 2030 can be selectively and independently driven.

In the case in which two specific blocks are arranged in parallel in a first axial direction, an arrangement pattern of the light sources of the specific two blocks may be symmetrical to the first axis. For example, as shown in FIG. 67, in the case in which the plurality of light sources 220 arranged in the substrate 210 emit light in a direction parallel to the Y axis, the light sources 220 of the first block 2000 and the second block 2010, arranged in parallel to the X-axis direction to intersect the Y axis, may have different arrangement patterns. Here, the arrangement patterns of the light sources 220 of the first block 2000 and the second block 2010 may be symmetrical to the X axis.

Such a case may correspond to a case in which the number of rows of the light sources 220 included in one block is an odd number.

Further, in the arrangement patterns of the light sources 220 of the first block 2000 and the fourth block 2030 which are arranged in parallel to their light emitting directions, a light source 220 adjacent to the fourth block 2030, among the plurality of light sources 220 included in the first block 2000, may emit light in a direction in which it becomes more distant from the fourth block 2030, and light sources 220 adjacent to the first block 2000, among the plurality of light sources 220 included in the fourth block 2030, may emit light in a direction in which they become more distant from the first block 2000.

Figure 68:
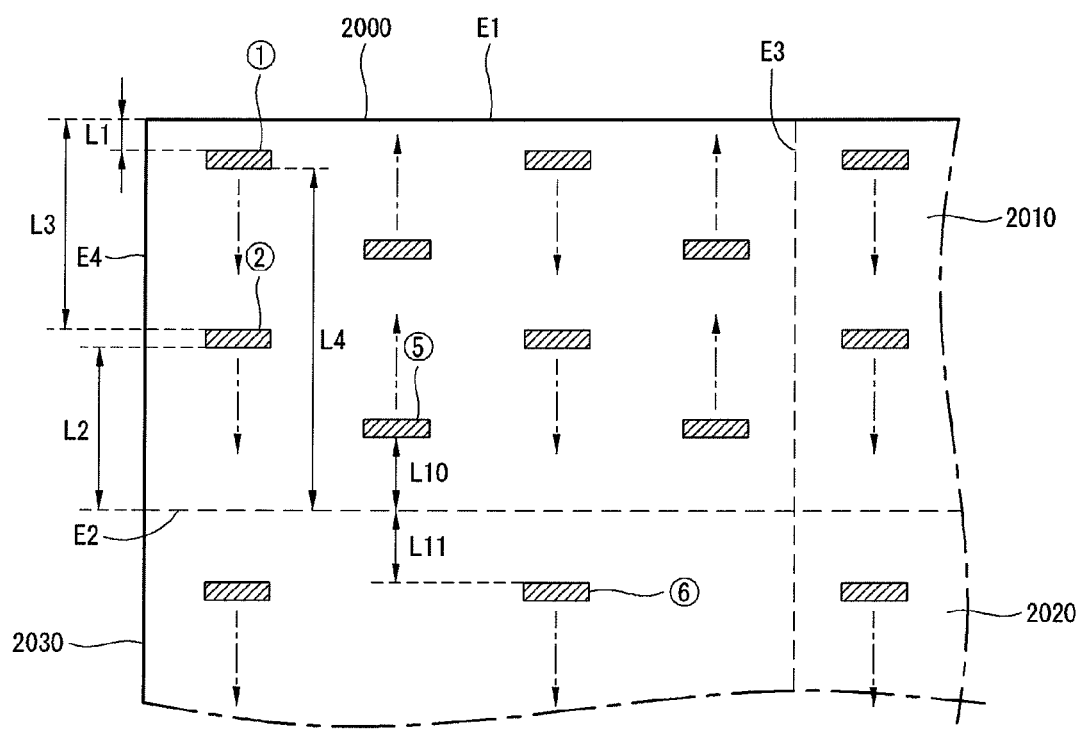

For example, as shown in FIG. 68, a fifth light source ⑤ adjacent to a fourth block 2030, among a plurality of light sources 220 included in a first block 2000, may emit light in a direction in which it becomes more distant from the fourth block 2030. Further, a sixth light source ⑥ adjacent to the first block 2000, among a plurality of light sources 220 included in the fourth block 2030, may emit light in a direction in which they become more distant from the first block 2000.

Further, a first light source ① and a second light source ② configured to emit light toward the fourth block 2030, among the light sources 220 arranged in the first block 2000, are described below. A distance L1 between the first light source ① and a first edge E1 of the first block 2000 is smaller than a distance L4 between the first light source ① and a second edge E2 facing the first edge E1 of the first block 2000. Furthermore, the second light source ② is spaced apart from the second edge E2 by a distance L2 and spaced apart from the first edge E1 by a distance L3 larger than the distance L2. However, the distance L2 between the second light source ② and the second edge E2 is larger than a distance L10 between the fifth light source ⑤ and the second edge E2. Accordingly, when local dimming is performed, the efficiency of local dimming driving may be improved.

Meanwhile, a distance between an edge of the substrate 210 and a light source 220 outermost disposed may be determined by taking a bezel area into consideration.

Figure 69:
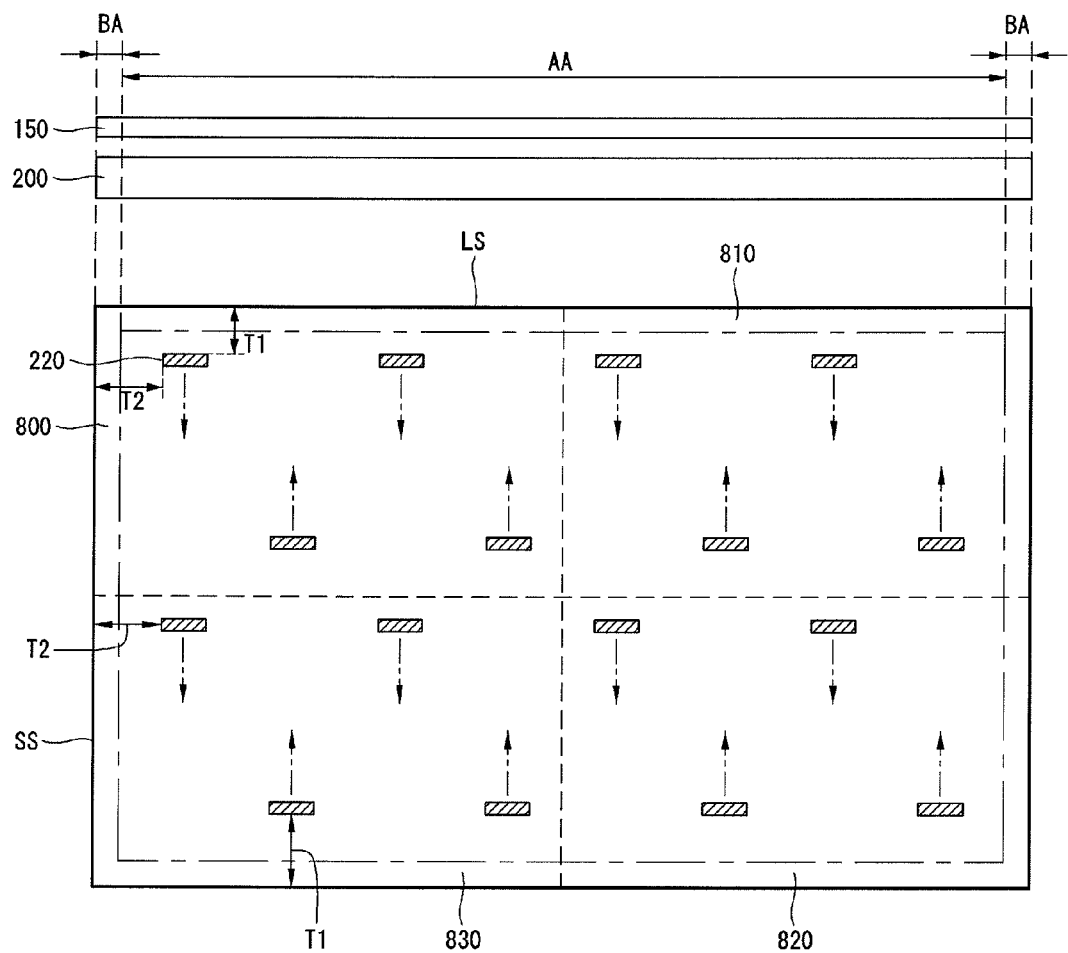

For example, as shown in FIG. 69, a liquid crystal layer 150 may be disposed over a backlight unit 200.

In an active area AA of the liquid crystal layer 150, liquid crystal molecules are rearranged and turned on in response to driving signals supplied to pixel electrodes and common electrodes by a TFT substrate. In a bezel area BA of the liquid crystal layer 150, driving signals are not supplied, and so the liquid crystal molecules may maintain their arrangement state and remain turned off. Accordingly, the active area AA may sufficiently transmit light emitted from the light sources 220 of the backlight unit 200, and so an image may be implemented in the active area AA. On the other hand, the bezel area BA may not transmit light emitted from the light sources 220 of the backlight unit 200.

As described above, in the bezel area BA, light may be blocked by the liquid crystal layer 150. Accordingly, the light sources 220 may be arranged at a specific distance T1, T2 from the edge of the substrate 210.

Here, to prevent dark portions from occurring at the border portion of the bezel area BA and the active area AA and at the central portion of each of the blocks 800 to 830, the distance T1 between outermost light sources 220 and the edge of the substrate 210 in a direction parallel to a direction in which the light emitting parts of the light sources 220 are oriented may be approximately 2 mm to 10 mm, preferably approximately 4.3 mm to 6.1 mm.

Further, to prevent a dark portion from occurring at the border portion of the bezel area BA and the active area AA, the distance T2 between the outermost light sources 220 and the edge of the substrate 210 in a direction vertical/perpendicular to the direction in which the light emitting parts of the light sources 220 emit light may be approximately 3 mm to 12 mm, preferably approximately 5 mm to 9 mm.

Figure 70:
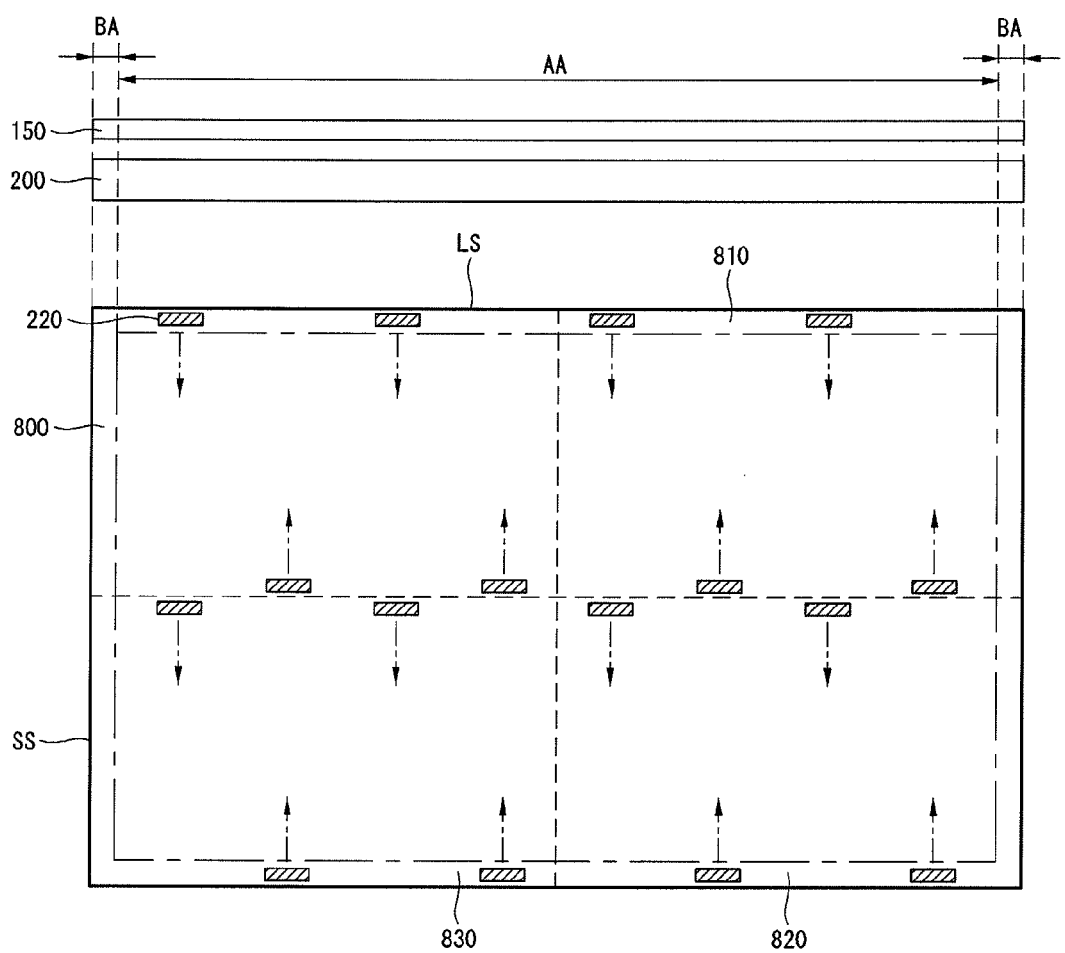
Figure 71:
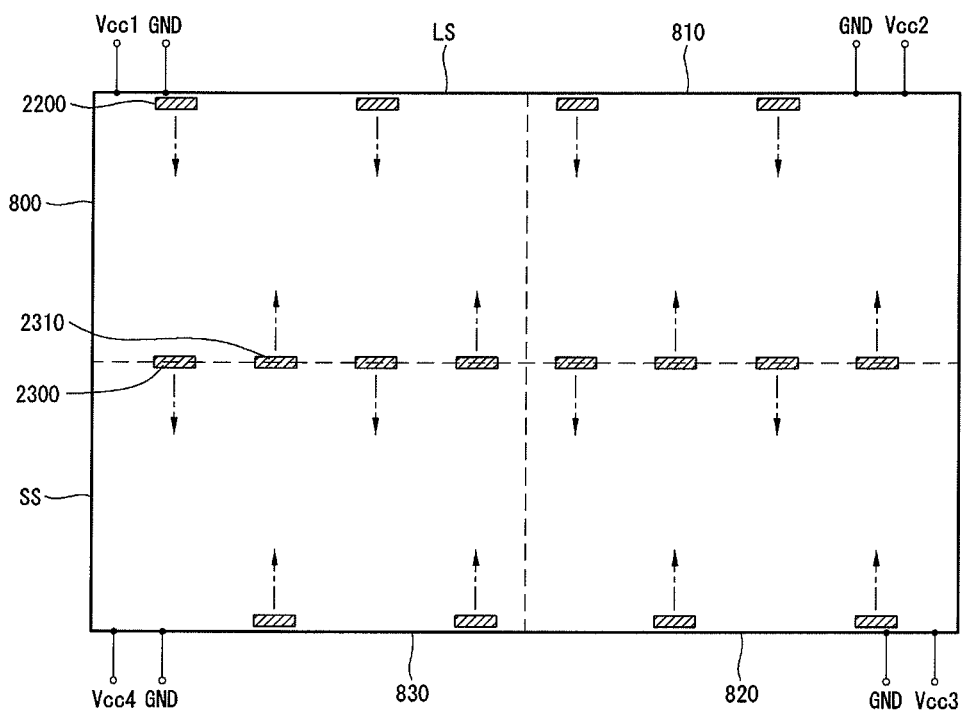
Figure 71:
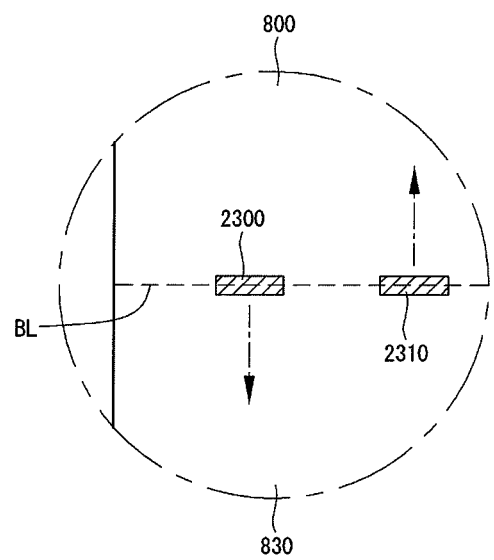

In another embodiment, as in the example of FIG. 70, at least one of a plurality of the light sources 220 may be disposed closer to a border portion between neighboring blocks 800 to 830.

A comparison of the case of FIG. 70 and the case of FIG. 69 is described below. Two light sources 220 included in the first block 800 and two light sources 220 included in the fourth block 830 are arranged closer to a border portion between the first block 800 and the fourth block 830 as compared with the case of FIG. 69.

Further, as in the example of FIG. 70, at least one of the light sources 220 may be arranged in a bezel area BA. From FIG. 70, it may be seen that at least one of the plurality of light sources 220 is arranged in the bezel area BA and emit light toward an active area AA.

Even in this case, the light emitting parts of the light sources 220 arranged in each of the blocks 800 to 830 may be arranged toward a central portion of each of the blocks 800 to 830. Alternatively, the light emitting parts of the light sources 220 may be arranged in a direction in which they become more distant from two neighboring border area.

In further another embodiment, as shown in FIG. 71(a), the light sources 220 included in different blocks may be arranged to overlap each other in a direction to intersect a direction in which the light emitting parts of the light sources 220 emit light.

For example, as shown in FIG. 71(b), the light emitting part of a tenth light source 2310, among the plurality of light sources 220 arranged in a first block 800, may be arranged in a direction in which it becomes more distant from a fourth block 830, and the light emitting part of a twentieth light source 2300, among the plurality of light sources 220 arranged in the fourth block 830, may be arranged in a direction in which it becomes more distant from the first block 800. Further, the tenth light source 2310 and the twentieth light source 2300 may overlap each other in a direction to intersect a direction in which the light emitting parts of the tenth light source 2310 and the twentieth light source 2300 are oriented. In an alternative, the tenth the light sources 2310 and the twentieth light sources 2300 may overlap a border line BL of the first block 800 and the fourth block 830.

Figure 72:
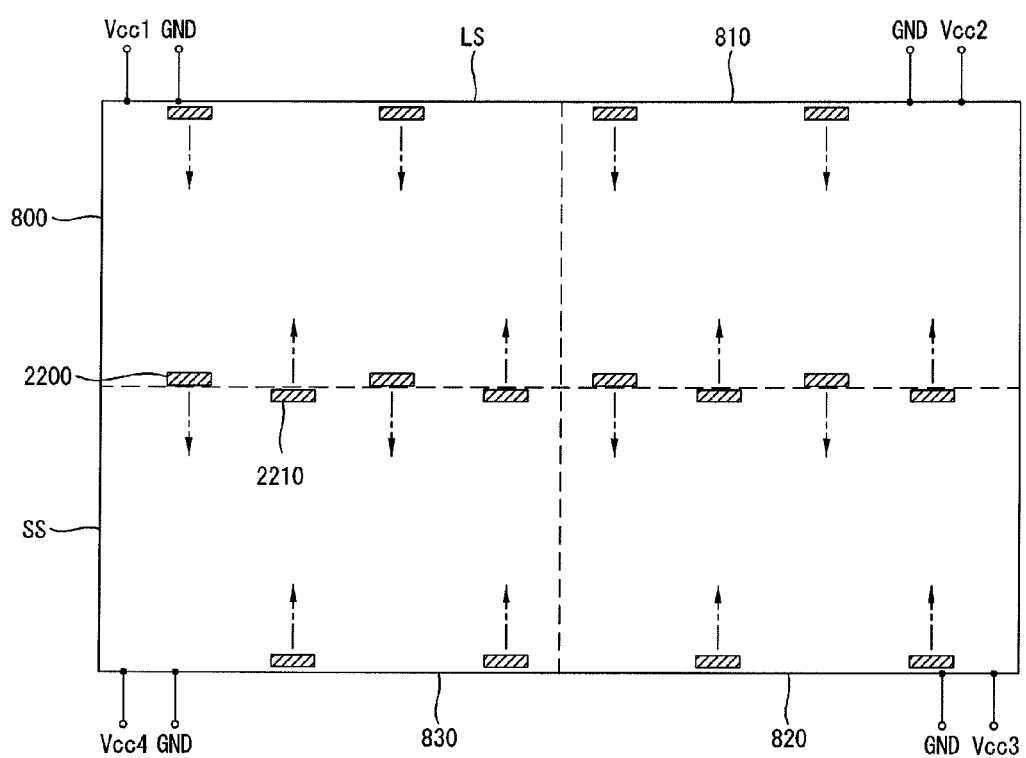

In further yet another embodiment, as shown in FIG. 72, some of the plurality of light sources 220, disposed close to a border area between neighboring blocks of blocks 800 to 830, may emit light toward other neighboring blocks of the remaining blocks 800 to 830.

For example, the light emitting part of an eleventh light source 2200 adjacent to the fourth block 830, from among the plurality of light sources 220 arranged in the first block 800, may be arranged toward the fourth block 830, and the light emitting part of a twenty-first light source 2210 adjacent to the first block 800, among the plurality of light sources 220 arranged in the fourth block 830, may be arranged toward the first block 800.

Figure 73:
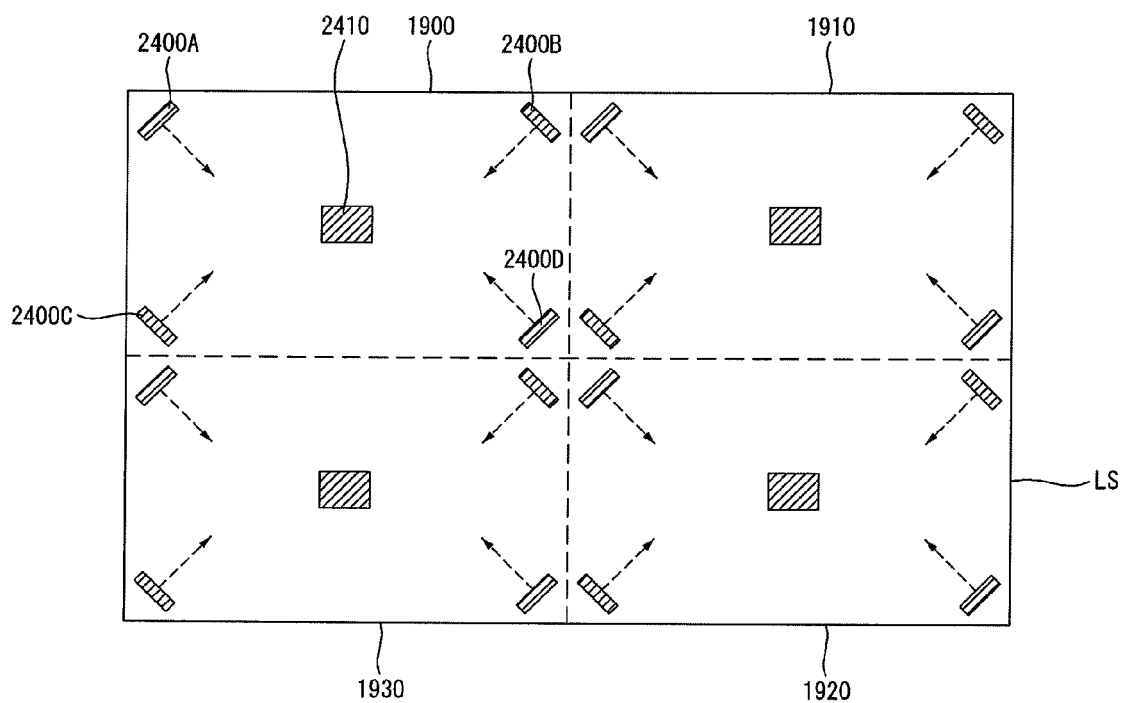
Figure 73:
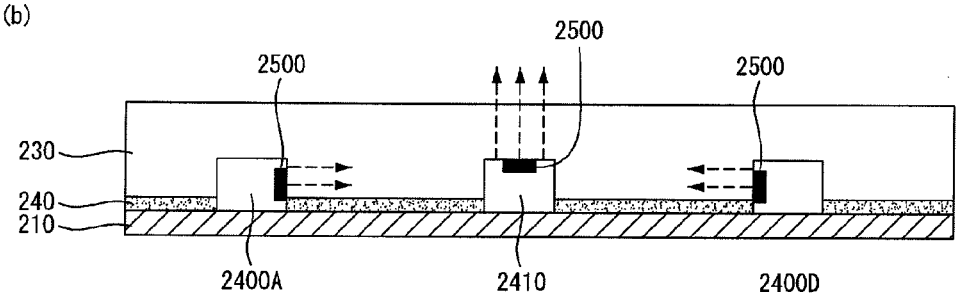

In further yet another embodiment, as shown in FIG. 73, at least one of the plurality of light sources 220 may have a different type from at least one of the remaining light sources 220.

For example, as shown in FIGS. 73(a) and 73(b), thirtieth to thirty-third light sources 2400A to 2400D, among a plurality of light sources arranged in a first block 1900, may have a side-view type in which the light emitting parts of the thirtieth to thirty-third light sources 2400A to 2400D are arranged in a direction parallel to the substrate 210, and a fortieth light source 2410, among the plurality of light sources arranged in the first block 1900, may have a top-view type in which the light emitting part of the fortieth light source 2410 is arranged upward (i.e., a direction to intersect the substrate 210).

Further, the light source of the top-view type may be disposed at the central portion of each of the blocks 1900 to 1930, and the light sources of the side-view type may be arranged so that the light emitting parts thereof are oriented toward the central portion of each of the blocks 1900 to 1930. For example, as shown in FIG. 73(a), the fortieth light source 2410 of the top-view type preferably may be disposed at the central portion of the first block 1900. Further, the thirtieth to thirty-third light sources 2400A to 2400D of the side-view type preferably may be arranged so that the light emitting parts thereof are oriented toward a central portion (e.g., the fortieth light source 2410) of the first block 1900. Even in this case, the efficiency of local dimming driving may be improved.

Figure 74:
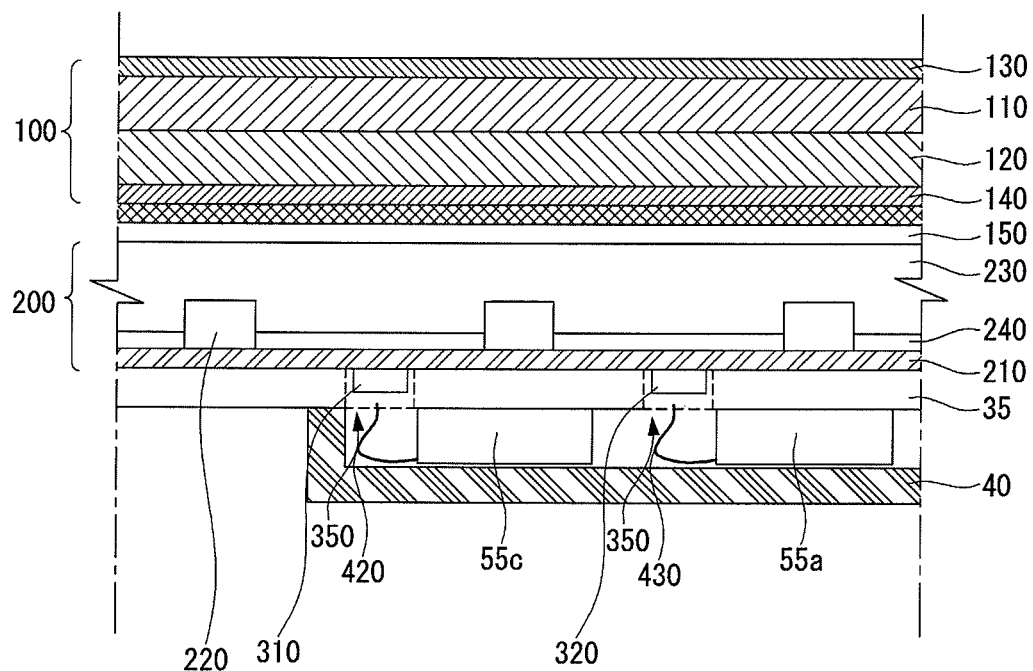
FIG. 74 illustrates a configuration of a display device according to an exemplary embodiment of the invention.

FIG. 74 is a cross-sectional view illustrating a configuration of the display device according to the exemplary embodiment of the invention. Structures and components identical or equivalent to those illustrated in FIGS. 1 to 73 may be designated with the same reference numerals in FIG. 74, and a further description may be briefly made or may be entirely omitted.

As shown in FIG. 74, the display panel 100 including the color filter substrate 110, the TFT substrate 120, the upper polarizing plate 130, and the lower polarizing plate 140 may closely adhere to the backlight unit 200 including the substrate 210, the plurality of light sources 220, and the resin layer 230. For example, an adhesive layer 150 may be formed between the backlight unit 200 and the display panel 100 to adhesively fix the backlight unit 200 to the bottom of the display panel 100.

More specifically, the top of the backlight unit 200 may adhere to the bottom of the lower polarizing plate 140 using the adhesive layer 150. The backlight unit 200 may further include a diffuse sheet, and the diffuse sheet may closely adhere to the top of the resin layer 230. In this case, the adhesive layer 150 may be formed between the diffuse sheet of the backlight unit 200 and the lower polarizing plate 140 of the display panel 100.

Further, the back cover 35 may be disposed on the bottom of the backlight unit 200 and may closely adhere to the bottom of the substrate 210.

The display device may include a display module 20, more particularly a power supply unit 55c for supplying a driving voltage to the display panel 100 and the backlight unit 200. For example, the plurality of light sources 220 of the backlight unit 200 may be driven using the driving voltage received from the power supply unit 55c to emit light.

The power supply unit 55c may be disposed and fixed onto the back cover 35 covering a back surface of the display module 20, so that the power supply unit 55c is stably supported and fixed.

In the embodiment of the invention, a first connector 310 may be formed on a back surface of the substrate 210. For this, a hole 350 for inserting the first connector 310 may be formed in the back cover 35.

The first connector 310 may electrically connect the power supply unit 55c with the light source 220 to allow the driving voltage supplied by the power supply unit 55c to be supplied to the light source 220.

For example, the first connector 310 may be formed on the bottom of the substrate 210 and may be connected to the power supply unit 55c through a first cable 420. Hence, the first connector 310 may be used to transfer the driving voltage received from the power supply unit 55c through the first cable 420 to the light source 220.

An electrode pattern, for example, a carbon nanotube electrode pattern may be formed on top of the substrate 210. The electrode formed on top of the substrate 210 may contact the electrode formed in the light source 220 and may electrically connect the light source 220 with the first connector 310.

Further, the display device may include a driving controller 55a for controlling a drive of the display panel 100 and the backlight unit 200. For example, the driving controller 55a may be a timing controller.

The timing controller may control a driving timing of the display panel 100. More specifically, the timing controller may generate a control signal for controlling a driving timing of each of a data driver, a gamma voltage generator, and a gate driver that are included in the display panel 100 and may supply the control signal to the display panel 100.

The timing controller may synchronize with a drive of the display panel 100 and may supply a signal for controlling driving timing of the light sources 220 to the backlight unit 200, so that the backlight unit 200, more specifically, the light sources 220 operate.

As shown in FIG. 74, the driving controller 55a may be disposed and fixed onto the back cover 35 positioned on a back surface of the display module 20, so that the driving controller 55a may be stably supported and fixed.

In the embodiment of the invention, a second connector 320 may be formed on the substrate 210. For this, a hole 350 for inserting the second connector 320 may be formed in the back cover 35.

The second connector 320 may electrically connect the driving controller 55a with the substrate 210, thereby allowing a control signal output from the driving controller 55a to be supplied to the substrate 210.

For example, the second connector 320 may be formed on the bottom of the substrate 210 and may be connected to the driving controller 55a through a second cable 430. Hence, the second connector 320 may be used to transfer a control signal received from the driving controller 55a through the second cable 430 to the substrate 210.

A light source driver may be formed on the substrate 210. The light source driver may drive the light sources 220 using the control signal supplied from the driving controller 55a through the second connector 320.

The driving controller 55a and the power supply unit 55c may be covered by the driver cover 40 and may be protected from the outside.

The configuration of the display device shown in FIG. 74 is just one embodiment of the invention. Therefore, the location or the numbers of each of the driving controller 55a, the power supply unit 55c, the first and second connector 310 and 320, and the first and second cables 420 and 430 may be changed, if necessary.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A light generating device comprising:
    an array of light source devices disposed on a substrate and including first and second light source devices forming a first line, the first and second light source devices spaced apart from each other with a first distance and configured to emit light in a first direction;
    another array of light source devices disposed on the substrate and including a third light source device forming a second line, the third light source device configured to emit light in a second direction which is different from the first direction,
    the second line being spaced apart from the first line so that the first light source device is spaced apart from the third light source device with a second distance therebetween,
    the second distance being equal to or greater than the first distance; and
    a reflection layer configured to reflect the light emitted from the first and second light source devices,
    wherein a light emitting part of the second light source device and a light emitting part of the third light source device are positioned on a same vertical line that is perpendicular to the first direction.

2. The light generating device of claim 1, wherein the first direction is substantially opposite to the second direction.

3. The light generating device of claim 1, wherein the first distance is measured from a middle point on a surface of the first light source device to a middle point on a surface of the second light source device.

4. The light generating device of claim 3, wherein the surface of the first light source device is a light emitting surface, and the surface of the second light source device is a surface opposite a light emitting surface of the second light source device.

5. The light generating device of claim 1, wherein the second distance is measured from a middle point on a surface of the first light source device to a middle point on a surface of the third light source device.

6. The light generating device of claim 5, wherein the surface of the first light source device is a light emitting surface, and the surface of the third light source device is a light emitting surface.

7. The light generating device of claim 1, wherein the first and second light source devices are disposed along a first side edge of the substrate, and
    a distance from the first side edge of the substrate to one side of the first light source device is less than a distance from another side of the first light source device to a line extending from one side of the third light source device.

8. The light generating device of claim 1, further comprising:
    at least one fourth light source device forming a third line, the fourth light source device configured to emit light in the first direction,
    wherein the third and fourth light source devices are disposed along a second side edge of the substrate,
    the fourth light source device is disposed at a corner area formed by the second side edge and a third side edge of the substrate, and
    a distance from the third side edge of the substrate to one side of the fourth light source device is less than a distance from another side of the fourth light source device to a line extending from one side of the first light source device.

9. The light generating device of claim 1, further comprising:
    a resin layer covering the arrays of light source devices on the substrate; and
    diffusion patterns disposed on the resin layer.

10. The light generating device of claim 9, wherein the diffusion patterns are located to correspond with the light source devices.

11. The light generating device of claim 1, further comprising:
    diffusion patterns disposed on the reflection layer, wherein a configuration of the diffusion patterns changes in a light emitting direction of the light source devices.

12. A light generating device comprising:
    first light source devices disposed on a substrate and spaced apart from each other with a first distance therebetween, the first light source devices forming a first line and configured to emit light in a first direction;
    second light source devices disposed on the substrate and spaced apart from each other with a second distance therebetween, the second light source devices forming a second line and configured to emit light in a second direction which is different from the first direction,
    a width 't' of at least one of the first and second light source devices having the following relationship: $2t \leq d \leq 10t$, where 'd' is a distance between a line extending along a first side of one of the first light source devices and a line extending along a second side of one of the second light source devices;

a reflection layer configured to reflect the light emitted from the first and second light source devices;

a resin layer covering the first and second lines of the light source devices on the substrate; and diffusion patterns disposed on the resin layer, and separately located to correspond with the first and second light source devices.

13. The light generating device of claim 12, wherein the distance 'd' has the following relationship with the width 't': $3t \leq d \leq 8t$.

14. The light generating device of claim 12, wherein the first side of one of the first light source devices and the second side of one of the second light source devices are light emitting surface sides through which the light is emitted.

15. The light generating device of claim 12, wherein the first light source devices are disposed along an edge of the substrate, and a distance from the edge of the substrate to one side of one of the first light source devices is less than a distance from another side of the one of the first light source devices to a line extending from one side of one of the second light source devices.

16. The light generating device of claim 12, wherein the distance 'd' has the following relationship: $2t=d$.

17. A light generating device comprising:

first light source devices disposed on a substrate and spaced apart from each other with a first distance therebetween, the first light source devices forming a first line and configured to emit light in a first direction;

second light source devices disposed on the substrate and spaced apart from each other with a second distance therebetween, the second light source devices forming a second line and configured to emit light in a second direction which is different from the first direction, wherein a light emitting part of one of the first light source devices and a light emitting part of one of the second light source devices are positioned on a same vertical line that is perpendicular to the first direction; and a reflection layer configured to reflect the light emitted from the first and second light source devices.

\* \* \* \* \*